United States Patent
Schlanger

(10) Patent No.: US 9,561,833 B2
(45) Date of Patent: Feb. 7, 2017

(54) VEHICLE WHEEL AXLE ASSEMBLY

(71) Applicant: Raphael Schlanger, Wilton, CT (US)

(72) Inventor: Raphael Schlanger, Wilton, CT (US)

(*) Notice: Subject to any disclaimer, the term of this patent is extended or adjusted under 35 U.S.C. 154(b) by 76 days.

(21) Appl. No.: 14/602,543

(22) Filed: Jan. 22, 2015

(65) Prior Publication Data

US 2016/0214678 A1 Jul. 28, 2016

Related U.S. Application Data

(63) Continuation-in-part of application No. 13/914,490, filed on Jun. 10, 2013, now Pat. No. 9,446,626, which is a continuation-in-part of application No. 12/655,433, filed on Dec. 30, 2009, now Pat. No. 8,485,335.

(60) Provisional application No. 61/204,130, filed on Jan. 2, 2009, provisional application No. 61/965,201, filed on Jan. 27, 2014.

(51) Int. Cl.
  *B62K 25/02* (2006.01)
  *B60B 27/02* (2006.01)

(52) U.S. Cl.
  CPC ............. *B62K 25/02* (2013.01); *B60B 27/026* (2013.01); *B62K 2025/025* (2013.01)

(58) Field of Classification Search
  CPC ..... B60B 27/023; B60B 27/026; B62K 25/02; B62K 25/025; B62K 2025/025
  See application file for complete search history.

(56) References Cited

U.S. PATENT DOCUMENTS

| 4,400,038 A * | 8/1983 | Hosokawa | B60B 27/023 280/288 |
| 7,523,998 B2 * | 4/2009 | Yu | B62K 25/02 301/124.2 |
| 7,722,129 B2 * | 5/2010 | Cusack | B62K 25/02 301/110.5 |
| 9,045,192 B2 * | 6/2015 | Schlanger | B62K 25/02 |
| 2007/0154286 A1 * | 7/2007 | Spahr | B62K 25/02 411/402 |
| 2009/0102276 A1 * | 4/2009 | Mercat | B62K 25/02 301/124.2 |

* cited by examiner

*Primary Examiner* — Kip T Kotter

(57) ABSTRACT

A vehicle wheel axle assembly comprises an axle element with a first outer face and a second outer face and a clamping assembly including a clamping element and a gripping element. The gripping element includes an axially inwardly facing grip face and an axially outwardly facing pressure face. The clamping element includes a helical threaded portion and an axially inwardly facing clamping face. The clamping assembly includes an elastically resilient element to axially bias said grip face to be axially inward and distal from said clamp face. The pressure face is axially inboard of the clamping face. The gripping element is rotatable relative to said clamping element. The clamping element is rotationally coupled to the gripping element by a coupling means at a coupling interface.

50 Claims, 20 Drawing Sheets

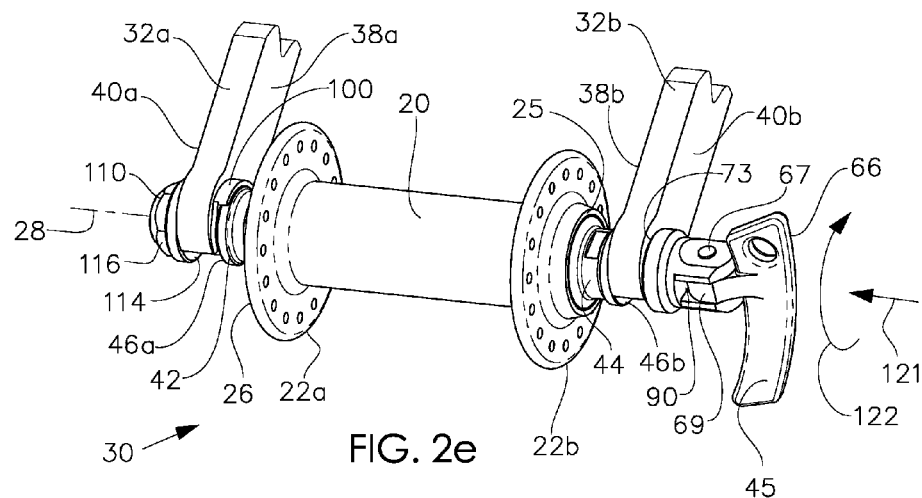
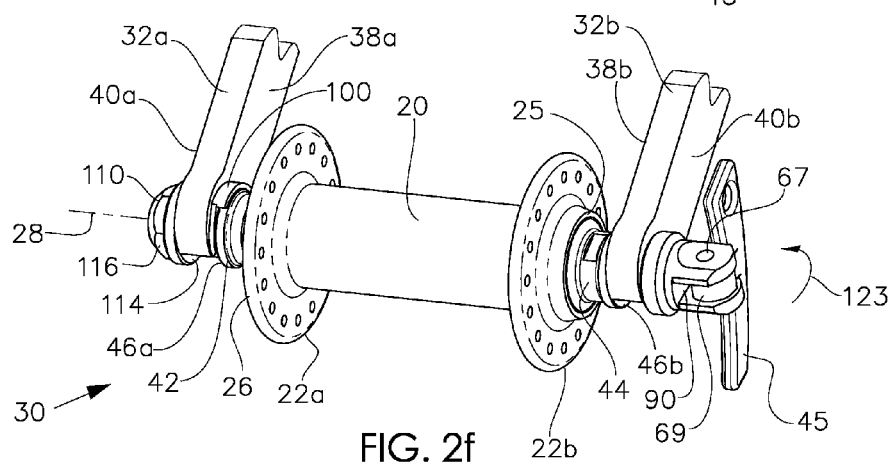
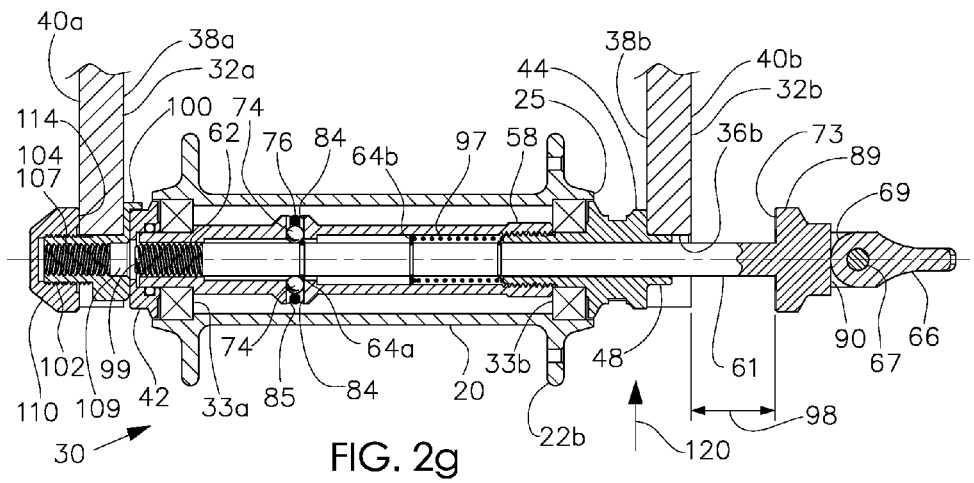

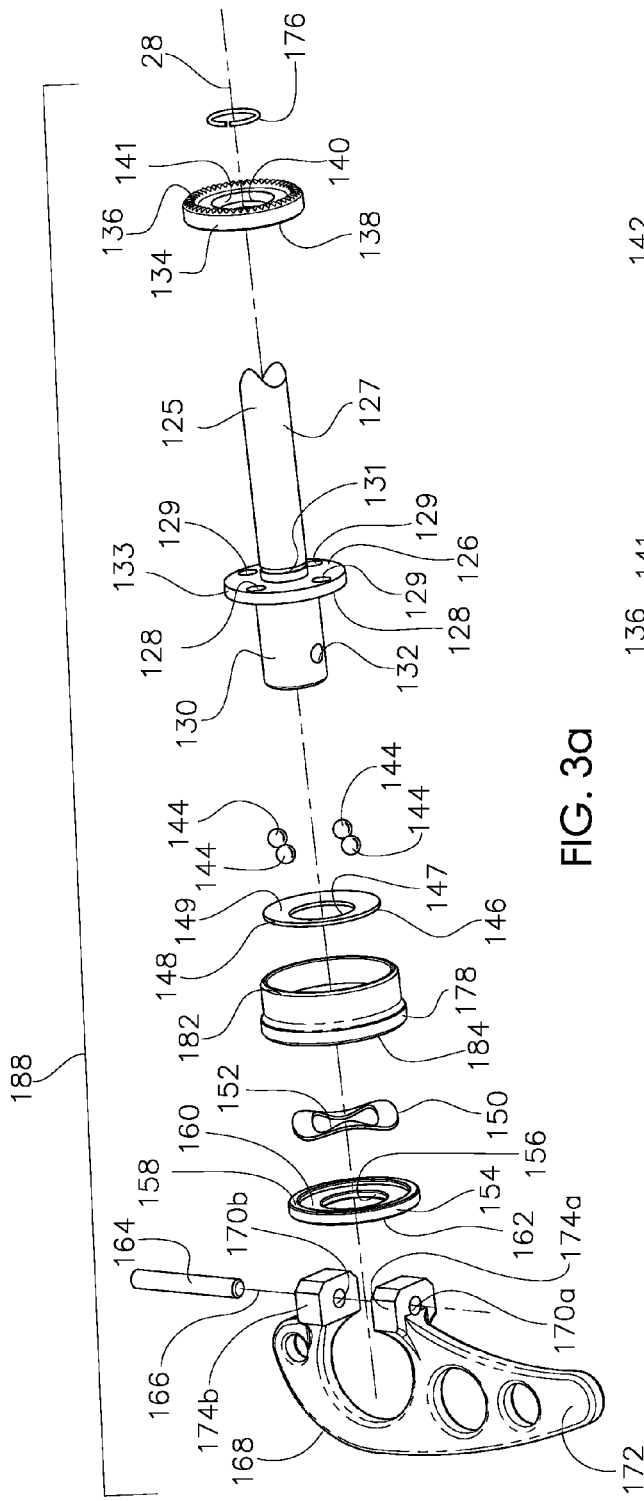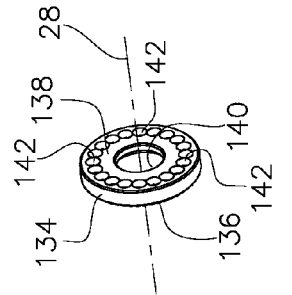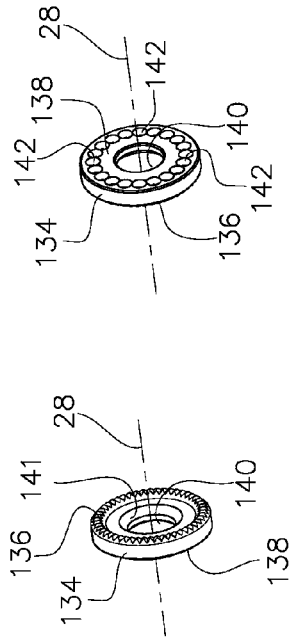
FIG. 3a
FIG. 3b
FIG. 3c

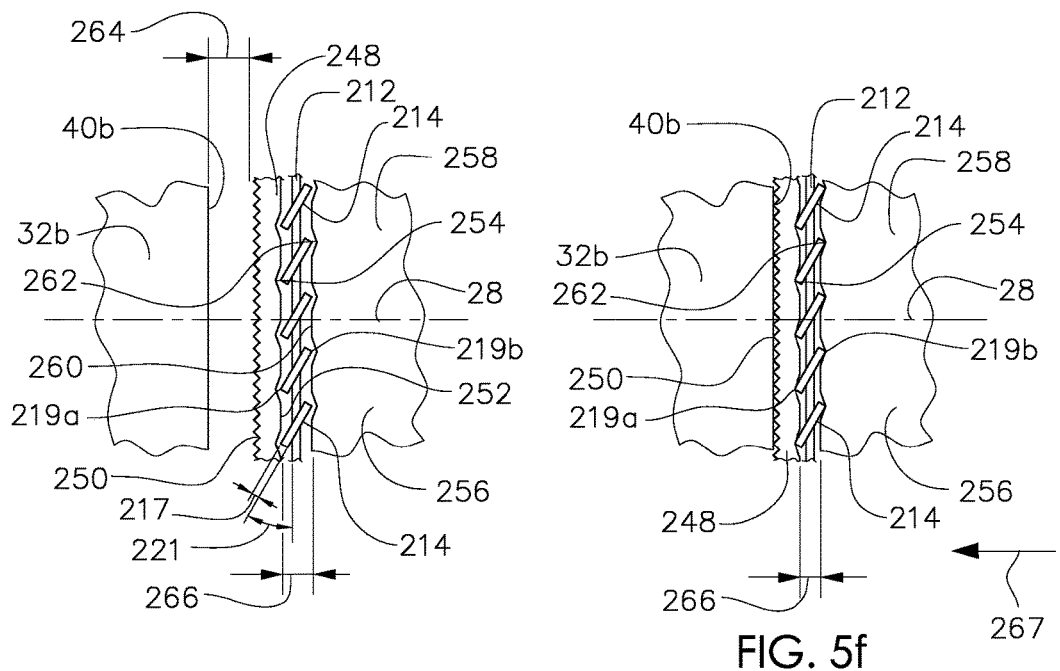
FIG. 5e
FIG. 5f
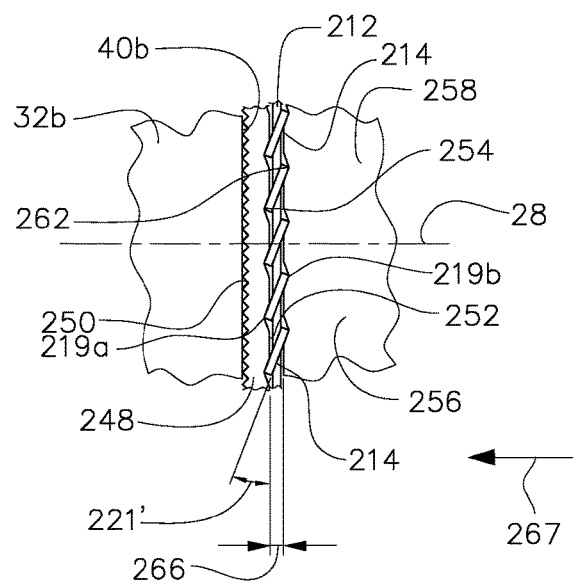
FIG. 5g

VEHICLE WHEEL AXLE ASSEMBLY

CROSS-REFERENCE TO RELATED APPLICATION

This application claims priority of U.S. Provisional Patent Application 61/965,201, filed Jan. 27, 2014 and entitled "VEHICLE AXLE ASSEMBLY".

This application is also a Continuation-In-Part of U.S. patent application Ser. No. 13/914,490 filed Jun. 10, 2013 and entitled VEHICLE WHEEL HUB ASSEMBLY, which is currently pending, and which is a Continuation-In-Part of U.S. patent application Ser. No. 12/655,453 filed Dec. 30, 2009 and entitled TORQUE COUPLING ASSEMBLY, which is currently issued as U.S. Pat. No. 8,485,335.

BACKGROUND

Field of the Invention

The present invention relates to a vehicle wheel axle assembly, particularly including aspects that facilitate the connection between axle of a vehicle wheel and the frame to which the vehicle wheel is mounted. More specifically, the present invention relates to a vehicle wheel axle assembly with a threaded connection to the frame that includes a rotational coupling feature to restrict inadvertent loosening of this threaded connection. The present invention is particularly applicable to a bicycle wheel axle assembly that facilitates the connection between axle of a bicycle wheel and the frame of a bicycle.

Discussion of Prior Art

Heretofore, the prior art threadable axle assemblies for bicycles and similar vehicles (commonly referred to as "through-axles") are designed to work only with frames having "closed dropouts" with enclosed axial apertures to receive this through-axle. This arrangement requires that the through-axle be completely withdrawn from the frame in order to release the wheel from the dropouts. This renders this procedure as time consuming, complex, and clumsy, since the operator must now be able to manage three separate items: the bicycle, the wheel, and the through-axle.

Further, conventional through-axles rely on a generally fine pitch thread for this threadable assembly. This fine pitch arrangement provides good axial clamping to secure the axle assembly to the frame and also has a lower tendency to inadvertently unscrew or loosen. However, this fine pitch also requires many rotations of the through-axle to secure the axle assembly to the frame, which adds significant time the procedure of installing and removing the axle assembly (and wheel) from the frame. In contrast, a coarse pitch thread engagement has a steeper thread helix angle and thus considered a "faster thread" to axially advance the threaded engagement with fewer turns and greater speed than a fine-pitch thread. This rapid tightening/loosening of the through-axle saves precious seconds, particularly in race conditions.

Particularly in bicycle racing conditions, where seconds count, the added time and complexity of conventional through-axle is very problematic for the racer. This problem is significant enough that such through-axle systems have not been widely adopted in bicycle road-racing applications, where the ability to quickly swap out wheels (due to a flat tire, for instance) is particularly critical.

Further still, conventional through-axles commonly do not employ any locking features to restrict any inadvertent loosening or unthreading of this connection. Bicycles commonly experience a high degree of vibration, both on-road and off-road. This may induce the through-axle to loosen during the ride, which may permit the wheel to be wobbly in the frame, resulting in a wobbly connection and a reduction in control. Further loosening may cause the wheel to become inadvertently detached from the frame, a circumstance with potentially disastrous consequences.

Yet further, in the case where conventional slotted dropouts ("open dropouts") are utilized, the through-axle is not captured and proper wheel retention relies solely on the axial clamping between the axle assembly and the dropouts. In such a configuration, an axle that is inadvertently loosened may more easily result in the wheel becoming detached from the frame. As such, it is that much more critical that the axle assembly does not loosen from the frame.

SUMMARY OF THE INVENTION

Objects and Advantages

In accordance with the present invention, it has now been found that the forgoing objects and advantages may be readily obtained.

It is an object of the invention to provide a vehicle wheel axle assembly with a rotationally coupled feature to restrict inadvertent threadable loosening of the axle assembly from the frame. It is a further object for this feature to be simple and intuitive to operate. Further still, it is an objective of this feature to be economical to produce and to have good compatibility with existing frames and dropouts.

The present invention employs a grip washer that is rotationally fixed to the frame upon contact therewith, and a clamping element that is threadable (either directly or indirectly) to the frame. The present invention provides a rotational coupling between the grip washer and the clamping element. Thus, when the grip washer is rotationally fixed to the frame, the clamping element will be impeded from unintended rotation and from unintended unthreading from the frame.

The embodiments of the present invention described hereinbelow provide several examples of how this rotational coupling may effectively be utilized to create an effective rotationally coupled interface between a gripping element (i.e. grip washer) and a clamping element to prevent inadvertent threadable loosening of the clamping element. This rotational coupling may be passively engaged or it may be actively engaged. Further, this rotational coupling may be a locked engagement or it may be a yieldable engagement.

The present invention is particularly applicable to arrangements that utilize a coarse pitch thread engagement. While such thread engagements provide for faster axial clamping of the dropouts, they also provide for faster un-clamping of the dropouts as well. As such, it will require less rotation of the handle or lever to threadably loosen the control shaft and to un-clamp the dropouts. However, the present invention is highly effective at impeding and restricting inadvertent threadable loosening. As such, the present invention serves to maintain the safety and security of a properly secured control shaft while still permitting the speed and convenience of this "fast" thread engagement.

Additionally, it is understood a certain degree of axial compression and settling of the axial stack of the hub assembly components (axle assembly, sleeve assembly, and dropouts) may occur over time. Thus, the hub assembly may inadvertently loosen very slightly from the dropouts due to this axial settling effect. In a prior art assembly, this initial settling serves to relax the threadable assembly in a manner equivalent to a slight loosening of the control shaft as described hereinabove. The present invention, due to its axial resilience and/or due to its rotational coupling, is effective at impeding and restricting any further threadable loosening, even in the case of axial compression and settling of the axial stack of the hub assembly components.

The present invention further describes rotational coupling arrangements that are simple and effective and utilize a minimum of components. Where possible, these arrangements employ inexpensive components that are commonly available at industrial suppliers, including o-rings, belleville washers, and wave washers. As such, these arrangements are also economical to produce.

Further objects and advantages of my invention will become apparent from considering the drawings and ensuing description.

BRIEF DESCRIPTION OF THE DRAWINGS

The present invention will be more readily understandable from a consideration of the accompanying drawings, wherein:

FIGS. 2c-f are perspective views of the embodiment of FIG. 2a, showing the progressive sequential assembly steps involved in assembling and installing the hub assembly to the dropouts;

FIG. 2c shows the adapter and nut first assembled to the left dropout and the hub assembly axially aligned in preparation for assembly with the dropouts, and with the control shaft axially retained in the retracted position;

FIG. 2d shows the hub assembly next positioned between the dropouts, with each axlecap radially nested within its respective adapter or slot, and with the control shaft still in the retracted position;

FIG. 2e shows the hub assembly positioned between the dropouts, with the control shaft next displaced to an axially extended orientation and threadably engaged with the adapter to secure the hub assembly to the dropouts;

FIG. 2f shows the hub assembly as positioned in FIG. 2e, with the handle next pivotally folded;

FIGS. 2g-i are axial cross-sectional views taken along 51-51 of the embodiment of FIG. 2a, showing the progressive sequential steps involved in assembling the hub assembly to the dropouts;

FIG. 2g shows the hub assembly positioned between the dropouts, with the control shaft axially retained in the retracted position, corresponding to the first stage of the assembly sequence described in FIG. 2d;

FIG. 2h shows the hub assembly positioned between the dropouts, with the control shaft axially released and advanced to the pre-assembled position, which corresponds to an intermediate assembly sequence between FIGS. 2d and 2e;

FIG. 2i shows the hub assembly positioned between the dropouts, with the control shaft in an axially extended orientation and threadably engaged with the dropout adapter, and with the handle pivotally folded, corresponding to the assembly sequence described in FIG. 2f;

FIG. 3a is an exploded partial perspective view of a first embodiment of the present invention, including a grip washer and a rotatable clamping flange, and including active locking to selectively lock the clamping flange to the grip washer via a handle;

FIG. 3b is a first perspective view of the grip washer of the embodiment of FIG. 3a;

FIG. 3c is a second perspective view of the grip washer of the embodiment of FIG. 3a;

FIG. 3e is a partial cross section view, taken along 116-116, in an assembly sequence roughly corresponding to the assembly sequence of FIG. 2g, including the right dropout and right axlecap, in a first assembly sequence corresponding to FIGS. 2d and 2h, with the control shaft shown in the retracted position to include a gap between the grip washer and the right dropout;

FIG. 3f is a partial orthogonal view corresponding to the assembly sequence of FIG. 3e;

FIG. 3g is a partial cross section view, taken along 116-116, including the right dropout and right axlecap, with the control shaft next axially extended and threadably assembled to the left dropout (not shown) to create contact between the grip washer and the right dropout and to axially compress the wave washer and to create a first rotational coupling between the grip washer and the control shaft;

FIG. 3h is a partial cross section view, taken along 116-116, in a final assembly sequence roughly corresponding to the assembly sequence of FIGS. 2f and 2i, where the handle is next folded to also axially compress the belleville washer and to also engage the balls with the grip washer to rotationally lock the clamp flange to the grip washer;

FIG. 3i is a partial orthogonal view corresponding to the assembly sequence of FIG. 3h;

FIG. 4b is a perspective view of an axially resilient split washer that may alternatively be substituted for the star washer of FIG. 4a;

FIG. 4d shows the head assembly of FIG. 4c, including the right dropout and right axlecap, in an assembly sequence corresponding to FIGS. 2d and 2h, with the control shaft in the retracted position to include an axial gap between the grip washer and the right dropout;

FIG. 4e shows the assembly of FIG. 4d, including the right dropout and right axlecap, with the control shaft next axially extended and threadably assembled to the left dropout (not shown) to create contact between the grip washer and the right dropout;

FIG. 4f is a cross section view, taken along 117-117, of the embodiment of FIG. 3a, where the control shaft is finally further threadably engaged to the left dropout (not shown) and axially advanced to compress the star washer to create a rotational coupling between the grip washer and the control shaft and to axially clamp the dropout, in an assembly sequence corresponding to that of FIG. 2e;

FIG. 5a corresponds to the assembly sequence of FIG. 4d;

FIG. 5b corresponds to the assembly sequence of FIG. 4e;

FIG. 5c shows the control shaft as next further threadably advanced to partially compress the star washer in the axial direction, in a transitional assembly sequence between that of FIG. 4e and that of FIG. 4f;

FIG. 5d corresponds to the assembly sequence of FIG. 4f;

FIGS. 5e-g are circumferential detail views of an alternate version of the embodiment of FIG. 4a, with the collar, grip washer, and star washer as circumferentially "unrolled" for clarity, showing the progressive sequential steps involved in assembling the hub assembly to the dropouts;

FIG. 5e corresponds to the assembly sequence of FIG. 4d;

FIG. 5f corresponds to the assembly sequence of FIG. 4e;

FIG. 5g shows the control shaft as next further threadably advanced to partially compress the star washer in the axial direction and to create a rotational coupling between the grip washer and the control shaft;

FIG. 7a corresponds to the assembly sequence of FIG. 6a;

FIG. 7b corresponds to a transition between the assembly sequences of FIG. 6a and FIG. 6b;

FIG. 7c corresponds to the assembly sequence of FIG. 6b;

DETAILED DESCRIPTION OF THE INVENTION

Figure 1:
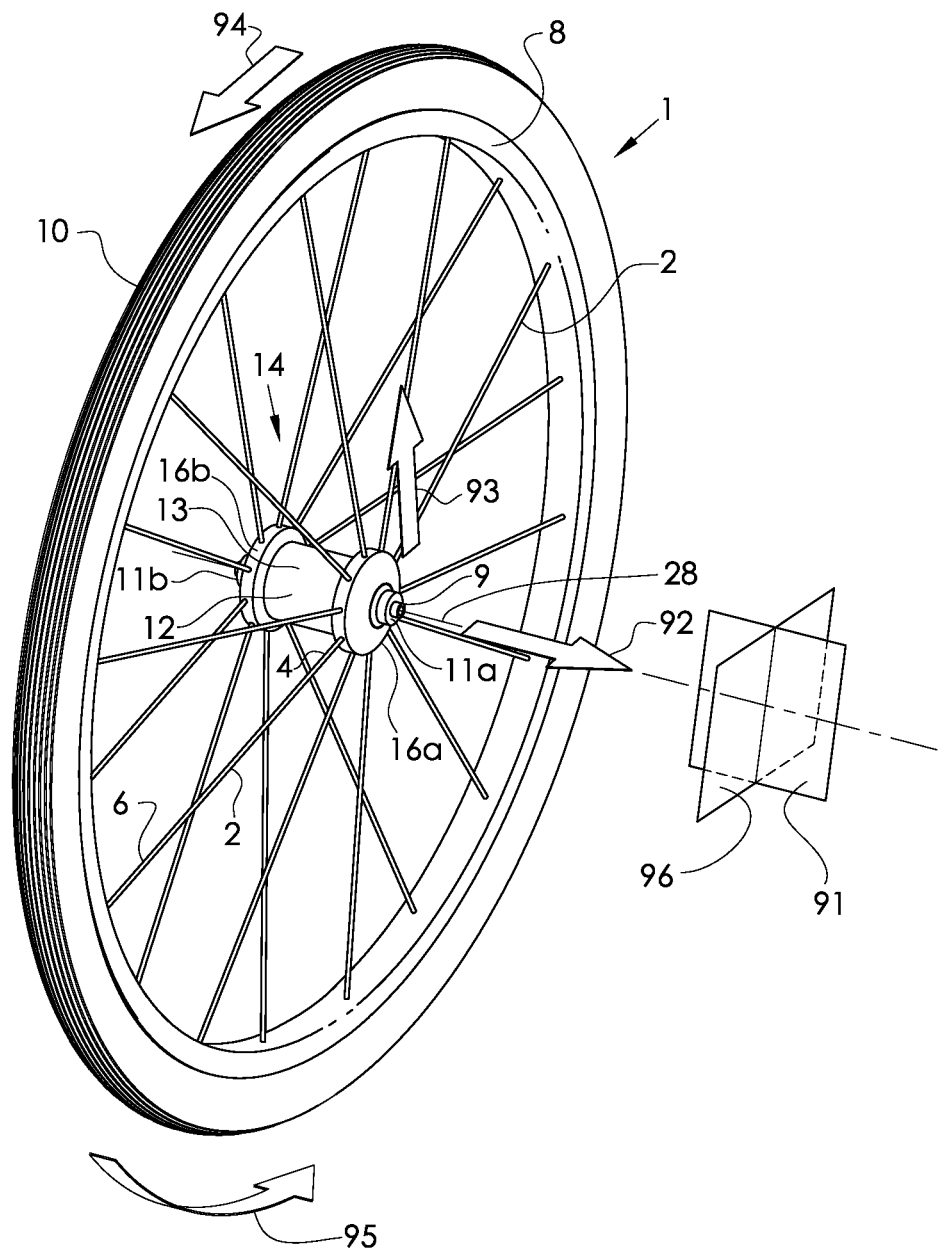
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. The hub assembly 14 includes a rotatable hub shell 12 and a stationary axle 9, with bearings (not shown) to facilitate rotation of the hub shell 12 about the axial axis 28. The hub shell 12 includes a hub body 13 with at least two axially spaced hub flanges 22a and 22b, each of which include a means for connecting with the spokes (not shown). The axle 9 includes end faces 11a and 11b to interface with the dropouts (not shown). The axial axis 28 is the axial centerline of rotation of the bicycle wheel 1. The hub flanges 22a and 22b may be contiguous with the hub shell 12 or may be separately formed and assembled to the hub body 13 portion of the hub shell 12. The spokes 2 are affixed to the hub flanges 22a or 22b at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 91 is a plane that is generally parallel to the axial axis.

In the ensuing descriptions, the term "axial" refers to a direction parallel to the centerline of the axial axis and the term "radial" refers to a direction perpendicular to the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard (or inward) orientation is an orientation that is radially proximal to the axial axis 28 and a radially outboard (or outward) orientation is an orientation that is radially distal to the axial axis 28. An axially inboard (or inward) facing surface is a surface that faces toward the axial midpoint between the two end faces 11a and 11b. Conversely, an axially outboard (or outward) facing surface is a surface that faces away from the axial midpoint between the two end faces 11a and 11b.

While it is most common for the hub shell 12 to rotate about a fixed axle 9, there are some cases where it is desirable to permit the axle 9 to be fixed with the wheel 1 such as the case where the wheel 1 is driven by the axle 9.

For general definition purposes herein, an "integral" joinder or assembly is one that is integrated and may not be easily disassembled at the service temperature without damaging at least one of the components that are joined, or is difficult to disassemble, or is otherwise not meant to be disassembled. This integral joinder involves a joining interface directly between two components. This joining interface is often a welded or adhered interface or some other interface where the two joining surfaces are solidly joined to each other to create a unified structure. Preferably this joining interface is a surface interface, rather than a point or edge interface. The integral joinder is in contrast to a fastened joinder, where such a fastened joinder relies solely on a mechanically interlocked engagement to secure or connect the two components to each other. The term "integral" refers to two portions that are unitary, and/or integrally joined. Further, when two portions are considered "monolithic" with each other, they may be considered to be integrally and monolithically combined as a singular element.

Figure 2A:
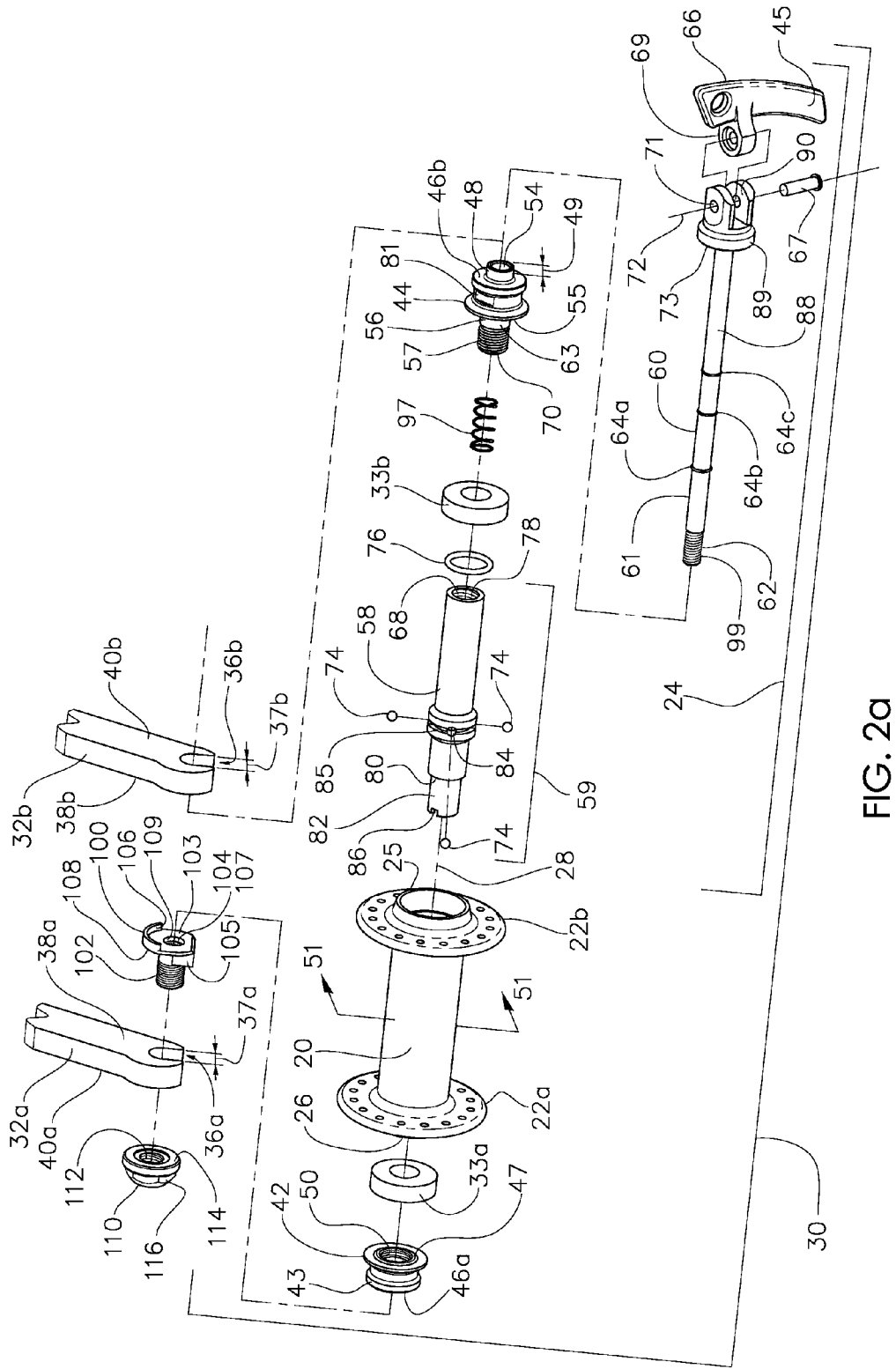
FIG. 2a is an exploded perspective view illustrating the general configuration of a hub assembly with control shaft, to which the present invention is particularly adapted, showing the dropouts of the bicycle frame and a hub assembly, including a control shaft assembly, with detent balls axially retained in the sleeve and a raised detent camming surface of the control shaft.

FIGS. 2a-i describe an exemplary arrangement to which the present invention may be incorporated. A control shaft assembly 60, including a head portion 89 is utilized to secure the hub assembly to the dropouts 32a and 32b of a bicycle frame (not shown). FIG. 2a is an exploded view, showing the individual components of this embodiment.

Referring to FIG. 2a, dropouts 32a and 32b may be considered mounting portions of the bicycle (not shown) and constitute the portion of the frame (not shown) to which the hub assembly 30 is mounted or connected. Dropout 32a includes open slot 36a with slot width 37a, axially inboard face 38a, and axially outboard face 40a. Similarly, dropout 32b includes open slot 36b with slot width 37a, axially inboard face 38b, and axially outboard face 40b. Inboard faces 38a and 38b are axially opposed and face each other, while outer faces 40a and 40b are axially opposed and face away from each other. Slot widths 37a and 37b are sized to accept the corresponding adapter 100 and axle stub 48 respectively. The dropouts 32a and 32b shown here are more typical of the front dropouts of a bicycle frame, but the rear dropouts may be of similar arrangement and it is understood that this design is representative of a wide range of dropout designs, either conventional or unconventional.

The hub assembly 30 includes an axle assembly 24 (and also including axlecap 42) and a hub shell 20. In this case, the axle assembly 24 is generally stationary and fixed to the frame of the bicycle, while the hub shell 20 is rotatable about axial axis 28 and about the axle assembly by means of bearing assemblies 33a and 33b. Bearing assemblies 33a and 33b are shown here as conventional "cartridge" type bearing assemblies, including rolling elements, an inner race and an outer race. The hub shell 20 includes two hub flanges 22a and 22b that are adapted to connect with the first ends of spokes (not shown). Hub shell 20 includes a second end portion 25 axially disposed to be proximal to handle 66 of the control shaft assembly 60 and to outer face 46b, and a first end portion 26 axially disposed to be distal the handle 66 relative to the second end portion 25 and to be axially proximal outer face 46a. The axle assembly 24 includes axlecap 42, axlecap 44, sleeve assembly 59, and control shaft assembly 60. The sleeve assembly 59 includes sleeve 58, detent balls 74, and elastomeric o-ring 76. The control shaft assembly 60 includes the control shaft 61 with snap-rings 64a-c, handle 66, and pivot pin 67. The handle 66 includes a radially projecting lever portion 45 to afford additional tightening torque and leverage when the handle 66 is manipulated by the operator.

Figure 2B:
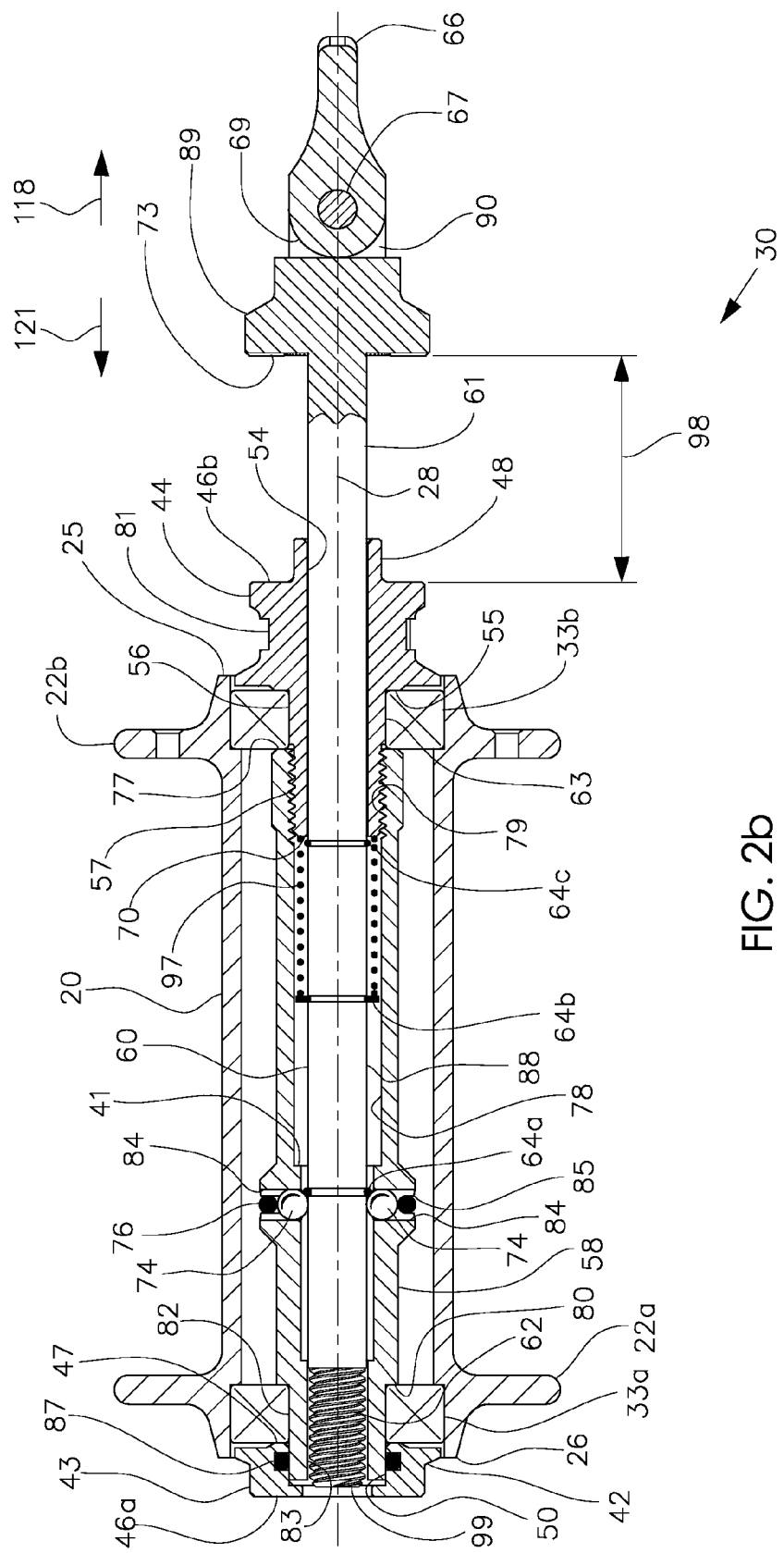
FIG. 2b is an axial cross-sectional view taken along 51-51 of the hub assembly of the embodiment of FIG. 2a, with the control shaft axially retained with the sleeve and positioned in the axially retracted orientation.

For explanation purposes and referring to FIGS. 2a-b, it is understood that an orientation described as "toward the handle" or "handle end" refers to an axial location proximal to the handle 66 and distal the end portion 99. Conversely, an orientation described as "engagement end" refers to an axial location proximal to the end portion 99 and distal the handle 66. The sleeve 58 includes an axial opening 78 therethrough, with internal threads 68 and end face 77 at its handle end. Sleeve 58 also includes shoulder 80, collar 82, and hole 83 at its engagement end that is sized to accept the control shaft 61. Sleeve 58 also includes radial holes 84, each sized to accept a mating detent ball 74 and a circumferential groove 85 that is axially aligned with radial holes 84 and sized to receive and retain the o-ring 76. It is preferable that the o-ring 76 be circumferentially stretched slightly to fit within groove 85. This stretch serves as a radial inward preload to the detent balls 74.

Axlecap 44 includes outer face 46b, shoulder 55, axle stub 48, collar portion 56, end face 70, and an axially extending hole 54 therethrough. Axlecap 44 also includes flats 81 for rotational manipulation with a wrench (not shown). Collar portion 56 includes a threaded portion with external threads 57 to mate with internal threads 68 of the sleeve 58 and a smooth cylindrical portion 63 to pilot the inside diameter of bearing 33b.

Axlecap 42 includes axially extending hole 50 sized to accept collar 82, end face 46a, shoulder 47 and cylindrical alignment surface 43. Outer faces 46a and 46b are generally axially opposed and face away from each other. Holes 50 and 54 constitute the exposed openings of a continuous axial hole that extends through the axle assembly 24 to accept the control shaft 60. The diameter 49 of stub 48 is sized to easily fit within slot 36b and to provide radial positioning alignment between the hub assembly 30 and the dropout 32*b* when it is nested within slot 36*b*.

Adapter 100 includes externally threaded collar 102, flats 105, hole 104, shoulder 108, end face 103, and a concave alignment surface 106. Hole 104 includes a counterbore 109 portion that extends axially from end face 103 through a portion of hole 104 and is of a diameter sized to accept the major diameter of external threads 62 of the control shaft 61. Hole 104 also includes an internally threaded portion with internal threads 107 extending axially outwardly from the base of the counterbore 109 through the remainder of the collar 102. Internal threads 107 are sized to threadably mate with external threads 62 of the control shaft 61. Flats 105 extend from collar 102 and are sized to engage and key with the slot 36*a* and prevent the adapter 100 from rotating with the nut 110 during assembly with dropout 32*a*. The engagement between flats 105 and slot 36*a* also serve to maintain the proper alignment of the adapter 100 about the axial axis 28. Nut 110 includes internally threaded hole 112, end face 114, and flats 116. The adapter 100 is first pre-assembled to dropout 32*b* such that collar 102 and flats 105 are nested within slot 36*a* to extend therethrough, with shoulder 108 axially abutting inboard face 38*a*. Nut 110 is then threaded to adapter 100 with internal threads of hole 112 threadably mated to external threads of collar 102, such that end face 114 is axially abutting outboard face 40*a*. The nut 110 is further threadably tightened and cinched against the adapter 110 by means of a wrench (not shown) engaged to flats 116 to sandwich and grip the dropout 32*a*, with end face 114 bearing and gripping against outboard face 40*a* and shoulder 108 bearing and gripping against inboard face 38*a*.

As shown in FIG. 2*b*, which corresponds to the retracted position of the control shaft assembly 60, detent balls 74 are positioned in their corresponding radial holes 84 with o-ring 76 positioned in circumferential groove 85. O-ring 76 serves to bear against detent balls 74 and to bias them radially inwardly within radial holes 84. Shoulder 80 axially abuts the inner race of bearing assembly 33*a* and end face 77 axially abuts the inner race of bearing assembly 33*b*. Outer races of bearing assemblies 33*a* and 33*b* are radially and axially fixed in the hub shell 20 in the conventional manner as shown. Thus, sleeve 58 is axially fixed relative to the hub shell 20, and the hub shell 20 is rotatable about the sleeve 58 and about the axial axis 28. Axlecap 44 is threadably assembled to the sleeve 58 as shown, with external threads 57 mated to internal threads 79 and with shoulder 55 axially abutting the inner race of bearing assembly 33*b*. End face 77 and shoulder 55 serve to axially sandwich and locate the inner race of bearing assembly 33*b*. Collar portion 56 extends through the inner race of bearing assembly 33*b*. Similarly, collar 82 extends through the inner race of bearing 33*a* and within hole 50 to radially pilot the axle cap 42. Shoulder 80 and shoulder 47 serve to axially sandwich and locate the inner bearing race of bearing assembly 33*a*. The opening 78 of sleeve 58 is stepped from a larger diameter adjacent the handle end for clearance with spring 97 to the smaller diameter of hole 83 adjacent the engagement end for radial piloting of the control shaft 61. Sleeve 58 also includes notches 86 at the engagement end for rotational manipulation with a mating wrench (not shown) about the axial axis 28. The assembled axle assembly 24 preferably provides a fixed axial distance between outer faces 46*a* and 46*b* as is conventional in this respect.

Concentric and coaxial within the sleeve 58 is the control shaft 61, which is both (axially) slideable and rotatable within the sleeve 58 about the axial axis 28. Control shaft 61 includes a shank portion 88 and an enlarged head portion 89. The shank portion 88 includes circumferential snapring grooves 64*a-c* and external threads 62 at its engagement end (end portion 99). The head portion 89 includes a grip face 73, a slot 90 to accept the pivot tab 69 of the handle 66, and a cross hole 71 sized to accept the pivot pin 67. Control shaft 61 includes a shank portion 88 that extends through axlecaps 42 and 44 and sleeve 58 and includes end portion 99 with external threads 62 at its engagement end and three snaprings 64*a*, 64*b*, and 64*c*, each nested and engaged in corresponding circumferential snapring grooves, at specific axial locations along its length. Snapring 64*a* provides a raised detent camming surface relative to the shank portion 88 to interface with detent balls 74 and to provide detent action. Snapring 64*b* provides an axial end stop for compression spring 97, which is positioned between snapring 64*b* and end face 70. Spring 97 serves to axially bias the control shaft 61 toward the engagement end relative to the sleeve 58.

Snapring 64*c* provides an axial displacement limit stop relative to the axle assembly 24. In the case where the control shaft assembly 60 is withdrawn too far in direction 118, the snapring 64*c* will abut end face 70 and limit its travel. A such, snapring 64*c* also serves to insure that the control shaft 61 is positively retained with the axle assembly 24, serving as a convenience to prevent the control shaft assembly 60 from becoming separated from the hub assembly 30. The pivot tab 69 of the handle 66 is assembled to the head portion 89 by first inserting pivot tab 69 into slot 90 and then inserting pivot pin 67 through cross hole 71 such that the handle 66 is engaged to the head portion 89 in a clevis hinge knuckle arrangement. The handle 66 may now be pivoted in direction 123 about the pivot axis 72 relative to the control shaft 61.

FIG. 2*b* shows the assembled hub assembly 30, with the handle 66 assembled to the control shaft 61 by means of pin 67. The handle 66 is shown to be pivoted to its open or unfolded position and is ready for manual manipulation. The bearings 33*a* and 33*b* are assembled to the hub shell 20, with the sleeve 58 positioned with shoulder 80 and end face 77 abutting their respective inner races. Control shaft 61 is extending through hole 54 and with spring 97 constrained between end face 70 and snapring 64*b*. Axlecap 44 is threadably assembled to the sleeve 58 as described above. This threadable assembly may be tightened with the aid of wrenches (not shown) engaged with flats 81 and with notches 86 to axially sandwich the inner race of bearing assembly 33*b*. A portion of collar 82 protrudes through bearing 33*a* to radially pilot the hole 50 of axlecap 42, with o-ring 87 providing a frictionally gripped retaining between the two in the conventional manner.

Detent balls 74 are assembled within their respective holes 84 and advanced radially inwardly therethrough until they lightly contact the shank portion 88. O-ring 76 is then temporarily stretched and expanded and placed in groove 86 such that it circumferentially wraps around the radially outboard portion of the detent balls 74. The stretched o-ring 76 serves as a hoop spring to bias the detent balls 74 radially inwardly within their holes 84. The compression spring 97 surrounds the control shaft 61, with its ends braced between the snapring 64*b* of the control shaft 61 and the end face 70 of the axlecap 44. With the control shaft assembly 60 in the retracted position, as shown in FIGS. 2*b-c*, the compression spring 97 is axially compressed and pre-loaded to provide a bias force to axially shuttle the control shaft assembly 60 in direction 121 towards its extended position as shown in FIGS. 2*e* and 2*i*.

Figure 2C:
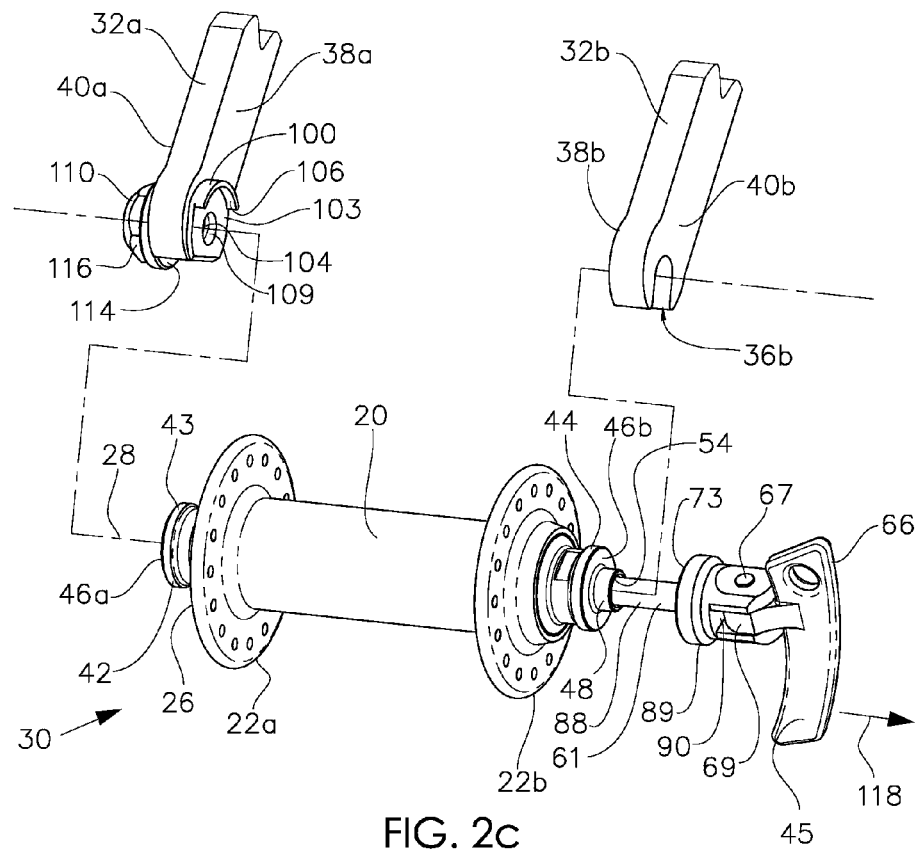

The control shaft 61 is shown in FIGS. 2*b-c* to be in the axially retracted position relative to the sleeve 58 and axle assembly 24. The control shaft assembly 60 has been axially withdrawn toward the handle end in direction 118 until snapring 64c contacts the end face 70 and snapring 64a is on the handle side of detent balls 74. This retracted position causes the spring 97 to be compressed to axially bias the control shaft assembly 60 in direction 121. Snapring 64a provides a radially raised circumferential detent camming surface relative to the shank portion 88 and snapring 64a is biased by the spring 97 in direction 121 to axially press against the detent balls 74. The cam action of the snapring 64a provides a radially outward force to the detent balls 74, inducing them to move radially outwardly within their holes 84. However, the radially inward hoop force of the o-ring 76 against the detent balls 74 serves to counteract this radially outward force and thus maintains the radially inward position of these detent balls 74, thereby creating a linear detent mechanism to restrict the control shaft assembly 60 from advancing in direction 121 and thus maintaining the retracted axial position of the control shaft assembly 60 as shown. In this retracted position, the axial gap 98 between outer face 46b and grip face 73 is considered "open" and is larger than the axial width between inboard face 38b and outboard face 40b of dropout 32b. The interaction between the snapring 64a, the detent balls 74, the holes 84 and the o-ring 76 may be considered as a detent mechanism to retain the axial position of the control shaft assembly 60 relative to the sleeve 58. Additionally, in this retracted position, the end portion 99 of the control shaft assembly 60 are also shown to be slightly axially recessed relative to the outer face 46a, as dictated by the axial positional arrangement of this detent mechanism. It is noted that, in the retracted position, there is a small axial gap between snapring 64c and end face 70, which permits a correspondingly small amount of axially outward over-travel of the control shaft assembly 60 in direction 118.

FIG. 2c shows adapter 100 and nut 110 as firmly assembled to grip the dropout 32a as described hereinabove. Once firmly secured to the dropout 32a, the adapter 100 may be considered as an extension of the dropout 32a. The hub assembly 30 is shown positioned prior to its assembly with the dropout 32b and adapter 100. The handle 66 is in its unfolded and open position. The operator has pulled the handle 66 in direction 118 to insure that the control shaft assembly 60 is in the retracted position, with gap 98 open and expanded and with the engagement end (i.e. end portion 99) of the control shaft 61 recessed from outer face 46a. The handle 66 serves to provide geometry for the operator to easily manipulate and control the control shaft assembly 60 as described herein. The retracted position is maintained, against the axial bias of spring 97, by the axial detent mechanism as described herein. As a convenience and to prevent the operator from retracting the control shaft assembly 60 too far in direction 118, snapring 64c is provided to bear against the end face 70 of the axlecap 44 as a positive axial travel limit stop. It is noted that, as shown in FIGS. 2a-i, the control shaft assembly 60 is axially retained and engaged to the hub assembly 30 such that the control shaft assembly 60 may not be inadvertently removed from the hub assembly 30.

Figure 2D:
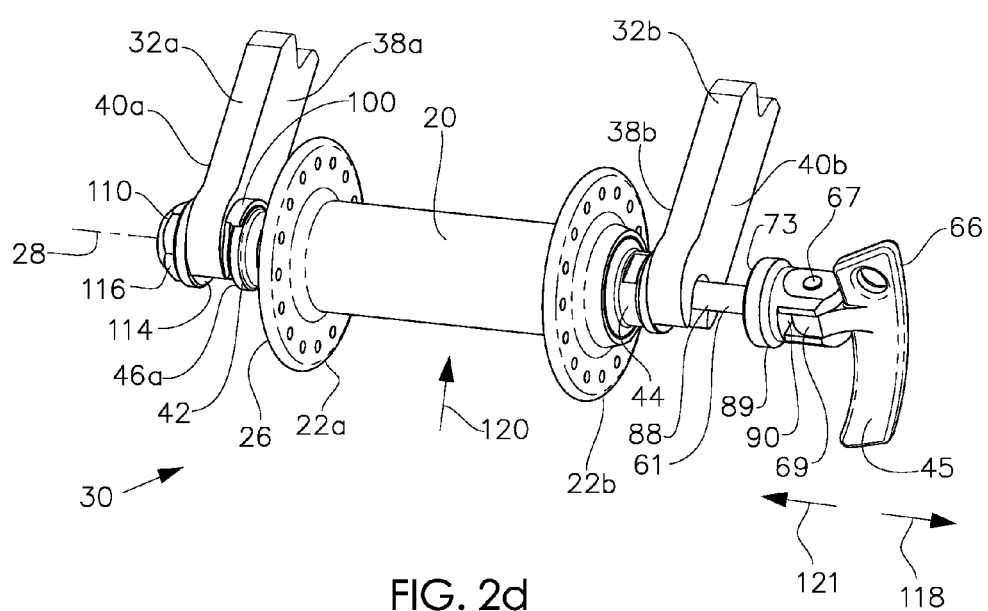

Next, as shown in FIG. 2d, the hub assembly 30 is moved in the generally radial direction 120 relative to the dropouts 32a and 32b such that the stub 48 is radially introduced and then is radially nested within slot 36b in the conventional manner and the cylindrical alignment surface 43 of axlecap 42 is radially nested with alignment surface 106. These nested engagements serve to provide a radial depth stop of the hub assembly 30 relative to the dropouts 32a and 32b.

Outer face 46a is adjoining end face 103 and outer face 46b is adjoining inboard face 38b. The external threads 62 are now radially aligned with internal threads 107. This radial assembly of the control shaft 61 with the dropout 36b is in contrast with conventional through-axle designs, which utilize closed dropouts, necessitating the axial assembly of the through-axle (i.e. control shaft) with the dropout.

Next, as also shown in FIG. 2d, the operator has manually pushed the handle 66 in direction 121 to axially press the control shaft assembly 60 and snapring 64a in direction 121 against the detent balls 74. This additional axial force serves to provide additional camming force between the snapring 64a and the detent balls 74 sufficient radial to overcome the hoop force provided by the o-ring 76. The detent balls 74 are thus cammed to move radially outwardly within holes 84 and allow the snapring 64a and control shaft assembly 60 to axially advance past the detent balls 74 in direction 121. As such, the interaction between snapring 64a and detent balls 74 may be considered as a cam-and-follower interaction, where the snapring 64a serves to provide a camming surface and the detent balls 74 serve as cam followers. Thus the operator may selectively yield and override the detent mechanism to advance the control shaft in direction 121. With the detent mechanism no longer retaining the control shaft assembly 60 in the retracted orientation, the spring 97, the control shaft assembly 60 is axially released and the spring 97 serves to further bias and shuttle the control shaft assembly 60 in direction 121, such that the end portion 99 is now protruding axially outwardly from outer face 46a to enter and engage within counterbore 109. With the end portion 99 now axially overlapping the counterbore 109, the hub assembly 30 is radially aligned and engaged to the dropout 32a. Further, outer faces 46a and 46b are now closely located between end face 103 and inboard face 38b for axial engagement between the hub assembly 30 and the dropouts 32a and 32b. The hub assembly 30 is now in the pre-engaged position and is thus loosely retained to the dropouts 32a and 32b. With the handle 66 in the open position, the lever portion 45 may function as the "wing" of a wingnut to provide manual leverage amplification for rotation of the control shaft assembly 60 about the axial axis 28.

Next, as shown in FIG. 2e, the operator may manually rotate the handle 66 in direction 122, which serves to threadbly engage external threads 62 with internal threads 107 and also advances the control shaft assembly 60 further in direction 121, serving to reduce gap 98 until grip face 73 axially abuts outboard face 40b. Outer face 46a is abutting end face 103 and outer face 46b is abutting inboard face 38b. Further threadable tightening of the handle 66 in direction 122 serves to axially draw end face 103 toward grip face 73, thereby firmly clamping dropout 32b between grip face 73 and outer face 46b and firmly clamping outer face 46a to end face 103. The external threads 62 are functional to threadably connect the hub assembly 30 to the dropouts 32a and 32b. The hub assembly 30 is in the engaged position and is now firmly assembled and installed with the dropouts 32a and 32b. This is considered the installed position of the hub assembly 30 where the hub assembly 30 is firmly clamped and secured to the dropouts 32a ad 32b.

Next, as shown in FIG. 2f, the handle 66 may next be folded and pivoted about pin 67 in direction 123 to its "closed" position to reduce the overall axial width of the hub assembly 30 and to create a more aerodynamic and compact aesthetic appearance. While the capability to fold handle 66 as described herein is not a requirement for proper function of this embodiment, it serves to provide the convenience of a lower profile assembly, as preferred by many cyclists.

The procedure for uninstallation and removal of the hub assembly 30 from the dropouts 32a and 32b is basically the reverse of the assembly sequence just described. For removal, the control shaft assembly 60 is threadably unscrewed via handle 66 until the external threads 62 are disengaged from the internal threads 107. The handle 66 is then withdrawn in axial direction 118 to again yield and override the detent mechanism to advance the control shaft in direction 118 past the detent balls 74 and returning the control shaft assembly 61 to the retracted position as shown in FIGS. 2b-c. The detent mechanism now serves to retain the control shaft assembly 60 in this retracted position. The hub assembly 30 (and its associated wheel) may now be uninstalled or removed in the generally radially outward direction, in a reverse of the procedure described above, to complete the uninstallation and removal procedure.

This linear detent mechanism or detent system serves to temporarily retain the control shaft assembly 60 in the retracted position as a convenience for ease of installation of the hub assembly 30 as it is brought into position between the dropouts 32a and 32b as shown in the transition between FIGS. 2c and 2d. Similarly, this linear detent system serves as a convenience when uninstalling and removing the hub assembly 30 from the dropouts 32a and 32b. When the control shaft assembly 60 is urged in the direction 121 as described, the compression spring 97 serves as a means to axially bias and push the control shaft assembly 60 and external threads 62 toward its axially extended position in the direction 121 (as shown in FIGS. 2d-f), for engagement with the adapter 100. It should be noted that the spring-bias provided by spring 97 as described herein provides a convenience and is not a requisite for the proper functionality of the present invention. Also, the details of the spring-biased detent mechanism described herein are merely a representative design to provide this axial retaining function. A wide range alternative arrangements may be employed to provide similar functionality as dictated by geometric constraints and the desired function.

In addition to being axially shuttled as described, the control shaft 61 has a generally smooth circular cylindrical surface such that, in both the extended and retracted positions, the control shaft assembly 60 may be rotated relative to the sleeve 58 about the axial axis 28. Such rotation is especially beneficial when attempting to threadably engage external threads 62 with internal threads 107. Meanwhile, adapter 100 is axially and rotatably fixed to the dropout 32a of the frame (not shown). Thus, the moveable control shaft assembly 60 of the hub assembly 30 is operative to selectively engage the dropout 32a. In an alternative design, the control shaft assembly 60 may be rotatably keyed to the axle assembly 30 such that it is non-rotatable and may only be axially shuttled.

Figure 2H:
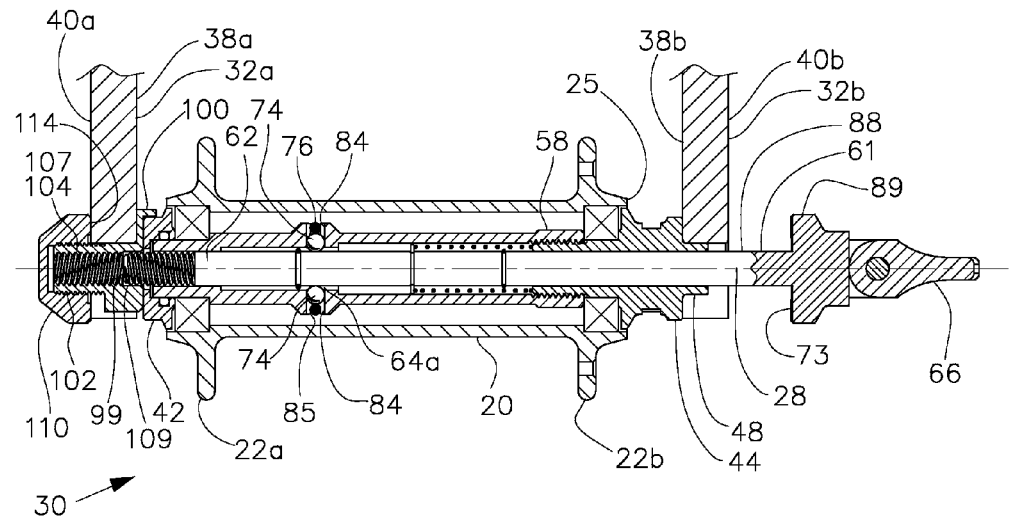
Figure 2I:
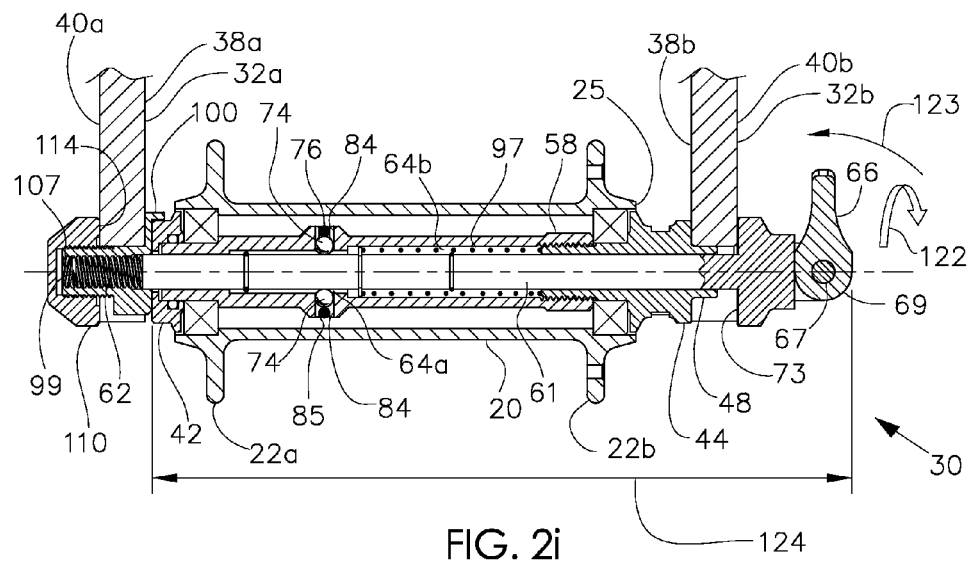

FIG. 2g shows the initial portion of the assembly sequence of FIG. 2d in cross section, with hub assembly 30 (with control shaft assembly 60 in the retracted position therein) moved in the generally radial direction 120 relative to the dropouts 32a and 32b such that the stub 48 is nested within slot 36b and the cylindrical alignment surface 43 of axlecap 42 is radially nested with alignment surface 106. Next, FIG. 2h shows the final portion of the assembly sequence of FIG. 2d in cross section, where the operator has manually pushed the handle in direction 121 to forcibly override the detent mechanism and to axially advance the control shaft assembly 60 and snapring 64a past the spring-loaded detent balls 74. The control shaft assembly 60 is no longer axially restrained by the detent mechanism and is now released to easily advance in direction 121. The spring 97 then serves to further bias and advance the control shaft assembly 60 in direction 121, such that the end portion 99 is now axially overlapping the counterbore 109 and the hub assembly 30 is thereby radially engaged to the adapter 100 and dropout 32a. The control shaft assembly 60 is now in the pre-engaged position.

Finally, FIG. 2i shows the assembly sequence of FIG. 2f in cross section, where the hub assembly 30 is installed and assembled and firmly connected to the dropouts 32a and 32b. The operator has manually rotated the handle 66 in direction 122 to threadbly engage external threads 62 with internal threads and advance the control shaft assembly 60 further in direction 121, serving to axially draw grip face 73 toward end face 103 thereby firmly axially clamping dropout 32b between grip face 73 and outer face 46b and firmly clamping outer face 46a to end face 103. Grip face 73 also serves as an axial travel limit stop to the control shaft assembly 60. The hub assembly 30 is now in the engaged position and is firmly assembled and installed with the dropouts 32a and 32b. The handle 66 has next been folded in direction 123 to reduce the overall axial width 124 of the hub assembly 30 and to create a cleaner and more compact aesthetic appearance. The hub assembly 30 may be removed or uninstalled from the dropouts 32a and 32b in the reverse of the assembly sequence just described in FIGS. 2c-i. Thus, it is shown that, with the aid of the axial detent mechanism just described, the installation and removal of the hub assembly 30 is a simple one-handed procedure that requires only one hand to preassemble the hub assembly 30 (and corresponding wheel (not shown)) and then only one hand to manually manipulate the handle 66 and leaving the other hand free during the entire procedure to steady the bicycle (not shown).

Since it is desirable to allow for fast installation of the hub assembly, it may be preferable to use a "fast" thread form for the threadable engagement between external threads 62 and internal threads 107, rather than a common conventional thread form. One example of a fast thread form is to utilize a single-lead thread form of particularly coarse pitch, such as an acme thread form. Another example of a fast thread form is to utilize a multi-start or multi-helix thread form (also known as a "multiple-lead" thread) such as a two-start thread as is known in industry.

While the detent balls 74 serve to provide an axial retaining means between the sleeve 58 and the control shaft assembly 60, it is noted that the control shaft assembly 60 is freely rotatable at all points in its axial travel. This is a preferred feature, since the control shaft 61 must be rotatable to threadably assemble the external threads 62 with internal threads 107. However, the control shaft assembly 60 may alternatively be rotationally fixed to the sleeve 58 or else the control shaft assembly 60 may employ a rotational detent mechanism relative to the sleeve 58.

While the stub 48 provides a convenient circular cylindrical surface to nest within the geometry of the slot 36b, the stub 48 may alternatively have a wide range of geometries, some of which may not be circular, that will interface with the dropout 32b. As a further alternative, the stub 48 portion may be eliminated entirely and the control shaft 61 may instead serve to provide the radial locating interface with slot 36b.

While the handle 66b is shown to be foldable as described herein, it is understood that this folding is a convenience to provide a lower profile appearance after the hub assembly 30 is assembled to the dropouts 32a and 32b. The handle may alternatively be non-foldable. Further, while the handle 66 is shown to include two "wings" (similar to a wingnut) for additional manual leverage when tightening or loosening the threaded assembly between external threads 62 and internal threads 107, the handle may alternatively employ a wide range of shapes and geometries. For example, a hex socket (not shown) may be substituted for the handle, which could receive a hex key (not shown) for manual manipulation of the control shaft assembly 60. As another example, a knurled knob (not shown) may be substituted for the handle 66. It may be preferable that the handle include noncircular geometry (about the axial axis) to facilitate manual rotation of the control shaft assembly.

The combined assembly of the sleeve assembly 59 and axlecaps 42 and 44 serve as an outer axle assembly that is discreet from the control shaft assembly 60. This outer axle assembly is axially fixed relative to the hub shell 20, while the control shaft assembly may be axially shuttled within this outer axle assembly. Alternatively, the components of the outer axle assembly may be omitted and the control shaft assembly may be axially shuttled within the bearings 33a and 33b. In such an arrangement, it is preferable that the control shaft assembly include a spring-loaded detent system, an example of which is shown in FIGS. 3a-c. This spring-loaded detent system could then provide axial retaining engagement with the inner race of bearings 33a and/or 33b.

Figure 2J:
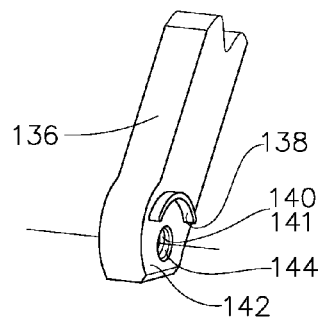
FIG. 2j is a perspective view corresponding to the view of FIG. 2a, where the adapter and nut are eliminated in favor of an alternate dropout configuration that includes geometry otherwise associated with the adapter, including the alignment surface and internally threaded hole.

As shown in FIG. 2a, dropout 32a is of a generally conventional "slotted" design and includes an open slot 36a to receive a conventional hub assembly (not shown). Adapter 100 and nut 110 are required to adapt dropout 32a to receive the hub assembly 30, as shown in FIG. 2c. Alternatively, dropout 136 may be substituted for the combined assembly of dropout 32a, adapter 100, and nut 110. As shown in FIG. 2j, dropout 136 is purpose-built to receive the hub assembly 30 and incorporates geometry and features otherwise included in the adapter 100. These geometries and features have similar functionality to the analogous geometries and features associated with the adapter 100 and as described herein. Dropout includes inboard face 142, which corresponds to inboard face 38a, and alignment surface 138, which corresponds to alignment surface 106, and hole 140 with internal threads 141 and counterbore 144, which corresponds to hole 104 with internal threads 107 and counterbore 109. Dropout 136 may thus be substituted for dropout 32 and adapter 100 and nut 110 to receive the hub assembly 30 as described in FIGS. 2c-i.

FIGS. 2a-i provide a background description and context of how the present invention may be utilized. The present invention relates to the control shaft assembly 60 and more specifically to details associated with the enlarged head portion 89 and the grip face 73. Generically, the present invention relates to a multi-piece assembly that corresponds to the head portion 89, including a clamping flange (i.e. head portion) and a grip washer (not shown in FIGS. 2a-i). The clamping flange corresponds to the head portion and includes a clamp face (corresponding to grip face 73) and a means for manual rotation thereof (corresponding to handle 45). The grip washer has an axially inward facing grip face, that is positioned axially inboard of the clamp face, to contact the outer face 40b of dropout 32b and an axially outward-facing pressure face to interface with the clamping flange. The grip washer 134 is also rotationally coupled to the clamping flange 133 such that, when the grip face 136 contacts the outer face 40b (as the hub assembly is assembled to the dropouts), this rotational coupling provides an anti-rotation bias therebetween and serves to restrict any inadvertent loosening or unthreading between the external threads 62 and the internal threads 107. In other words, this rotational coupling serves to rotationally couple the control shaft to the (rotationally fixed) dropout 32b.

In operation, the handle 45 is rotated in direction 122 to threadably tighten the threaded engagement between external threads 62 and internal threads 107 in the assembly sequence described in FIG. 2e. During the course of this operation, the grip face will contact the outer face 40b, causing the grip washer to rotationally stall due to friction therebetween, while the clamp flange will continue to rotate in direction 122 until the clamp face 126 is axially cinched against the pressure face 138 and the dropout 32b is axially clamped between the grip face 136 and the outer face 46b in the assembly sequence described in FIG. 2e. Since the grip face 136 now does not rotate relative to the outer face 40b as the clamp face is axially tightened and cinched, the grip face also does not rotationally scrape and scrub against the outer face 40b. As such, the outer face 40b is not excessively abraded by the rotation of the grip face 136 (and vice versa) and the rotational clamping and cinching may be achieved without excessive or unpredictable rotational friction at the interface between the grip washer 134 and the clamp flange 133. In contrast, the one-piece head portion 89 requires that the grip face 73 rotationally scrapes and scrubs against the outer face 40b as the grip face 73 is axially tightened and cinched as described in FIG. 2e. This scraping action serves to abrade the outer face 40b and/or the grip face 73 and also results in excessive and/or unpredictable rotational friction at the interface between the grip washer and the clamp flange.

Further, since the present invention provides a rotationally coupled interface between the grip washer 134 and the clamp flange 133, this rotational coupling may serve to provide a controlled and/or calibrated anti-rotation interface or bias therebetween. Thus, after the control shaft 125 assembly is threadably tightened and cinched, in the assembly sequence corresponding to FIG. 2e, this rotational coupling serves to rotationally couple the clamp flange 133 to the stationary dropout 32b to restrict the external threads 62 of the control shaft 125 from inadvertently unthreading or backing out of internal threads 107.

The grip washer 134 is also preferably axially retained to the clamp flange 133 and/or the control shaft 125 to provide a convenience to maintain the optimum axial position of the grip washer 134 relative to the clamp flange 133 and also to prevent the grip washer 134 from inadvertently becoming displaced relative to the clamp flange 133.

Further detailed description and explanation will be provided in the ensuing description of the embodiments of the present invention.

FIGS. 3a-i describe an embodiment where the rotational coupling between the grip washer and the clamp flange may be selectively engaged. This embodiment also provides a lockable rotational coupling where the grip washer may be rotationally locked to the clamp collar. Rotational coupling, as defined herein, refers to an anti-rotation bias between two rotating components. In the present invention the two rotating components are a grip washer and a clamping element (such as a control shaft). The anti-rotation bias serves to restrict inadvertent loosening and/or relative rotation between the grip washer and a clamping element.

Figure 3D:
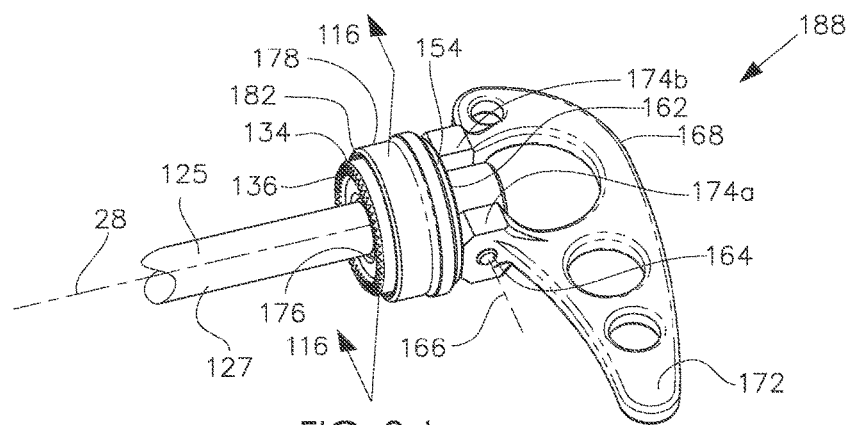
FIG. 3d is a partial perspective view of the embodiment of FIG. 3a, showing these components as assembled.

FIGS. 3a-i describes a mechanism that is substituted for the head portion 89 and handle 66 of FIGS. 2a-i. FIG. 3a is an exploded view showing the key components involved in the rotational coupling of this embodiment. Control shaft 125 is schematically similar to the control shaft 61 of FIGS.

2*a-i* in that it includes a threaded end (not shown) and functionally serves to secure the axle (not shown) of a hub assembly (not shown) to the dropouts (not shown). The embodiment of FIGS. 3*a-i* describes a mechanism that is substituted for the head portion 89 and handle 66 of FIGS. 2*a-i*. Control shaft 125 includes a shank portion 127 with a snapring groove 131; a radially extending clamp flange 133 with a clamp face 126 and a back face 128 and holes 129 therethrough; and an extension portion 130 with a cross hole 132 therethrough that is sized to receive pivot pin 164. Balls 144 are sized to fit within corresponding holes 129. Belleville washer 146 is of a conventional arrangement and includes a hole 147 therethrough, concave face 149, and an outer rim 148. Wave washer 150 is of a generally conventional arrangement and includes a hole 152 therethrough and is bent to include a series of circumferentially alternating and axially extending crests and valleys. Pressure washer 178 includes a hole 180 therethrough (visible in FIGS. 3*e*, 3*g*, and 3*h*), an axially inward collar 182, a back face 135, a front face 137, and an axially outward collar 184. Follower washer 154 includes a hole 156 therethrough, a an axially extending ridge 158 around its perimeter, a recess face 160, and a follower face 162. Handle 168 includes a lever extension 172, collinear holes 170*a* and 170*b* that are sized to receive pivot pin 164, and cam lobes 174*a* and 174*b*. Grip washer 134 includes a hole 140 therethrough, a grip face 136, and a pressure face 138 with a series of circumferentially arranged recesses 142. Grip washer 134 is also detailed in FIGS. 3*b* and 3*c* for clarity. Snapring 176 is of the conventional variety and is sized to be installed within snapring groove 131 in the conventional manner.

FIG. 3*d* shows the components of FIG. 3*a* as assembled to create head assembly 188. The extension portion 130 is threaded through holes 147, 180, 152, and 156, with balls 144 positioned within their respective holes 129. The balls 144, belleville washer 146, pressure washer 178, wave washer 150, follower washer 154, and handle 168 are all retained to the control shaft 125 by the pivot pin 164 that is positioned within holes 132, 170*a*, and 170*b*. Pivot pin 164 also serves as a pivot or clevis knuckle pin to allow the handle 168 to be pivoted about the pivot axis 166 relative to the control shaft 125. Shank portion 127 is threaded through hole 140 and is then retained to the control shaft 125 by means of the snapring 176 assembled to snapring groove 131. The snapring 176 serves to create a radially overlapping overlie engagement to axially retain the grip washer 134 to the control shaft 125. This head assembly 188 is further detailed in FIGS. 3*e* and 3*f*, which also shows the dropout 32*b* and axlecap 44, both of which are identical to those described in FIGS. 2*a-i*.

Figure 3E:
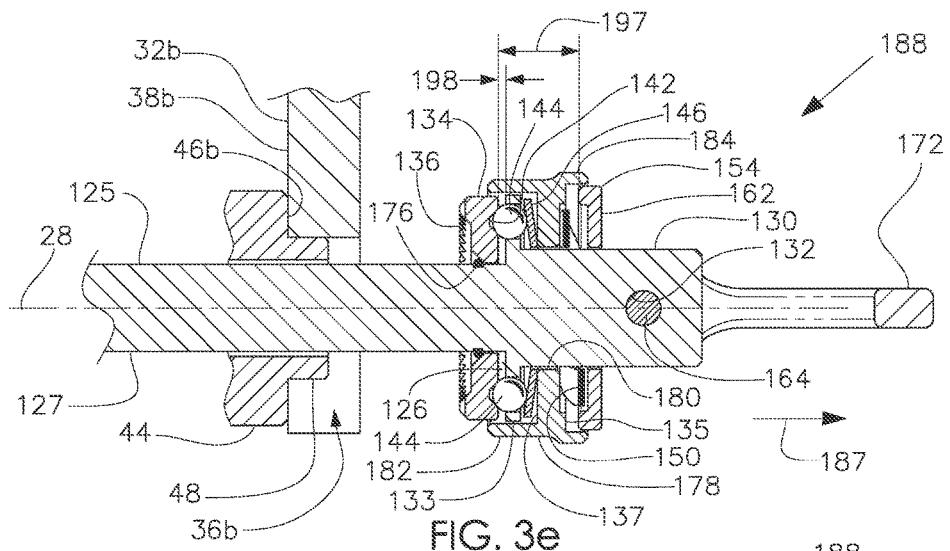
FIGS. 3e-i are axial views and axial cross-sectional views taken along 116-116 of the embodiment of FIG. 3a, showing the progressive sequential steps involved in assembling the hub assembly to the dropouts.
Figure 3F:
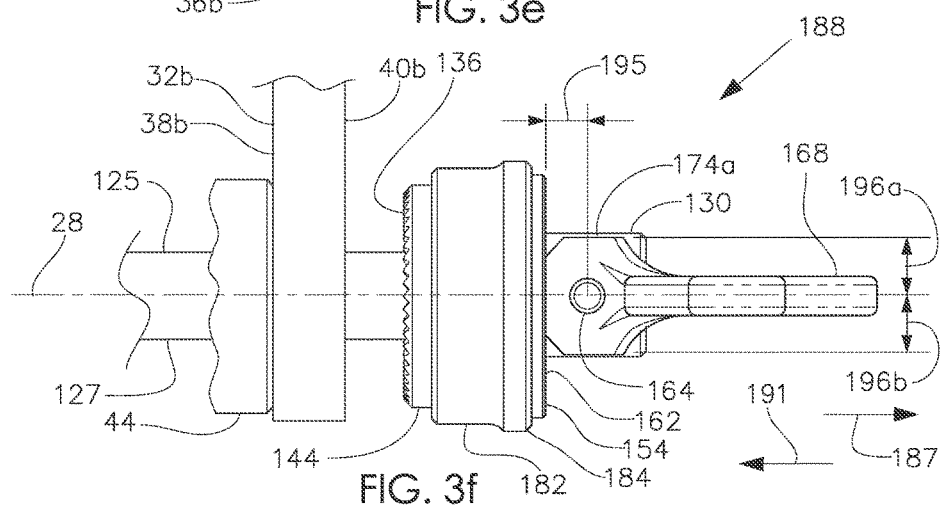

As particularly shown in FIG. 3*e*, balls 144 are positioned within their respective holes 129 of the clamp flange 133 and are radially retained therein. Balls 144 are also nested within corresponding recesses 142 of the grip washer 134. The concave face 140 of belleville washer is also contacting the axially outboard surface of balls 144. Concave face 140 and recesses 142 serve to retain the balls 144 to the clamp flange 133 in the axially outward and axially inward directions respectively. Cam lobes 174*a* and 174*b* are axially abutting the follower face 162, serving to press the recess face 160 axially inwardly to axially preload the wave washer 150 against the pressure washer 178. The axial spring pressure of the wave washer 150 serves to bias the pressure washer 178, belleville washer 146, and balls 144 in the axially inward direction, thereby serving to preload the balls 144 axially inwardly against their recesses 142. Thus, the balls 144 are axially sandwiched and trapped between the grip washer 134 and the belleville washer 146. The axially inward bias of the balls 144 presses against the pressure face 138 serves to also bias the grip washer 134 axially inwardly relative to the control shaft 125. The snapring 176 serves to limit this axially inward displacement of the grip washer 134. This axial spring preload provided by the wave washer 150 also serves to open an axial gap 197 between the pressure face 138 of the grip washer 134 and the ridge 58 of the follower washer 154. There is also an axial gap 198 between clamp face 128 and pressure face 138. FIGS. 3*e* and 3*f* show the head assembly 188, with control shaft 125, as withdrawn in direction 187 such that grip face 136 is axially spaced from outboard face 40*b* of dropout 32*b* in an assembly sequence corresponding to that described in FIGS. 2*d*, 2*g*, and 2*h*.

As shown in FIG. 3*f*, cam lobes 174*a* and 174*b* (obscured) are rotary cam surfaces that are rotatable about the pivot axis 166 such that distances 196*a* and 196*b* are greater than distance 195. As shown in FIG. 3*f*, the handle 160 is in the open position and the portion of cam lobes 174*a* and 174*b* that are contacting the follower face 162 have a peripheral distance 195 from the pivot axis 166.

Figure 3G:
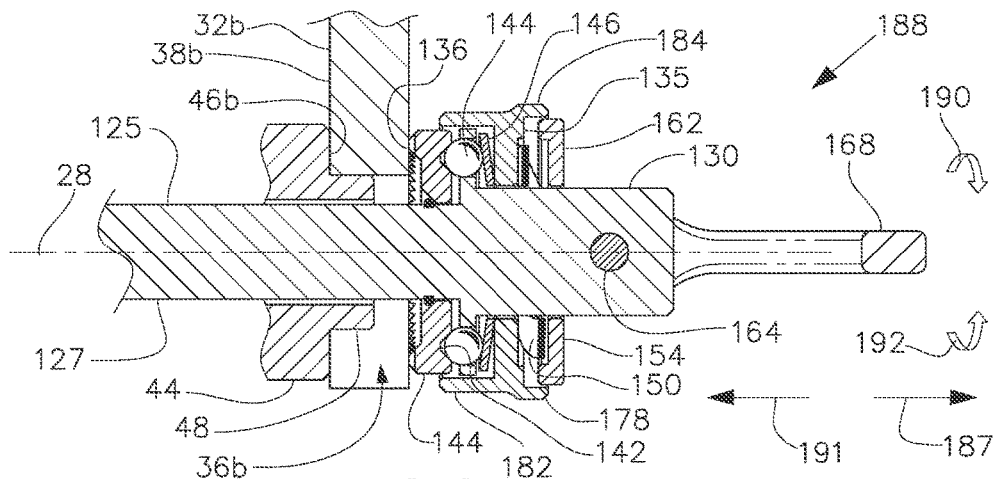

To assemble and secure the hub assembly (not shown) to the dropouts 32*a* and 32*b*, the control shaft 125 is rotated in direction 190 by means of manual manipulation of the handle 168, which serves to threadably tighten the control shaft 125 with the adapter 100 (not shown) in a manner described in FIGS. 2*e* and 2*i*. This threadable tightening serves to rotate and draw the control shaft 125 and head assembly 188 in direction 191 until the grip face 136 starts to contact and abut the outboard face 40*b*, as shown in FIG. 3*g*. Upon contact, the grip face 136 will lightly rotatably skid and then stall due to friction against the outboard face 40*b*, ceasing to rotate in direction 190. The grip washer 144 will also cease to move in direction 191. However, due to the axial gap 198 between the pressure face 138 and clamp face 126, the control shaft 125 and the remainder of the head assembly 188 will continue to rotate as the control shaft 125 is threadably tightened. This will cause the balls 144 to cam against their respective recesses 142, causing the balls to be correspondingly displaced axially outwardly and inwardly within holes 129 and pressing the belleville washer 146 and pressure washer 178 axially outwardly and inwardly to further axially preload the wave washer 150. As the control shaft 125 and head assembly 188 is further rotated, the grip washer 144 remains stationary and the balls 144 will circumferentially shift to axially nest in the adjacent recess, thereby relieving some of the preload of the wave washer 150.

The control shaft 125 is further rotated until the clamp face 126 further advances in direction 191 to axially abut the pressure face 138 and close the gap 198. The change in axial gap 198 and the axial preload provided by the wave washer 150 corresponds to an axial resilience between the clamp flange 133 and the grip washer 134. This axial resilience allows the grip washer 134 to be axially abutting and rotationally fixed to the dropout 32*b* while the control shaft 125 may continue to rotate and threadably advance in direction 191. The spring loaded balls 144 are axially biased to engage the notched camming surface provided by the recesses 142. Thus, the interaction of the balls 144 and recesses will create a spring-loaded rotational detent between the rotating components (including the control shaft 125) and the non-rotating grip washer 134. This rotational detent mechanism may be considered as coupling interface that serves to provide a rotational coupling between the control shaft 125 and the grip washer 134. This rotational coupling creates a resistance torque between the stationary grip washer 144 and the control shaft 125 to impede relative rotation therebetween and particularly to impede inadvertent threadable loosening of the control shaft 125. This may be considered to be a passive rotational detent arrangement, since the detent mechanism of the balls 144 are not actively controlled by the operator and instead are engaged in the normal rotation of the control shaft 125 during threadable tightening and/or loosening. Further, this rotational detent mechanism is considered to be a yieldable rotational coupling since this rotational coupling may be yielded and overridden by the operator. As shown in FIG. 3g, this rotational coupling is yieldable in both the threadable tightening and the threadable loosening rotational directions of the control shaft 125.

It is noted that the grip face 136 is shown to be a configured surface that is circumferentially serrated or knurled. This is a preferred arrangement, since this will provide good grip and friction with dropout 32b, both in the circumferential and radial directions. Thus, as the grip face 136 is axially pressed against the outboard face 40b, circumferential and radial movement therebetween is restrained.

The grip washer 134 will be sandwiched and solidly axially clamped between the clamp face 126 and the outboard face 40b to also sandwich and clamp the dropout 32b between the grip face 136 and the outer face 46b. The grip face 136 may also emboss the outer face 40b, serving to create a mechanical interlock to further restrain and/or prevent circumferential and radial movement therebetween. The hub assembly (not shown) is thus clamped, and installed to the dropouts 32a (not shown) and 32b in a manner similar to that described in FIGS. 2f and 2i. At this point, the passive detent mechanism between the balls 144 and the recesses 142 may serve to inhibit and/or prevent inadvertent reverse-rotation in direction 192 and the loosening of the threadable engagement between the control shaft 125 and the adapter 100, either due to flex, vibration or other inadvertent loosening of the system. Threadable loosening may preferably require that the operator apply sufficient torque to the handle 168 to override the detent mechanism when loosening in direction 192.

Figure 3H:
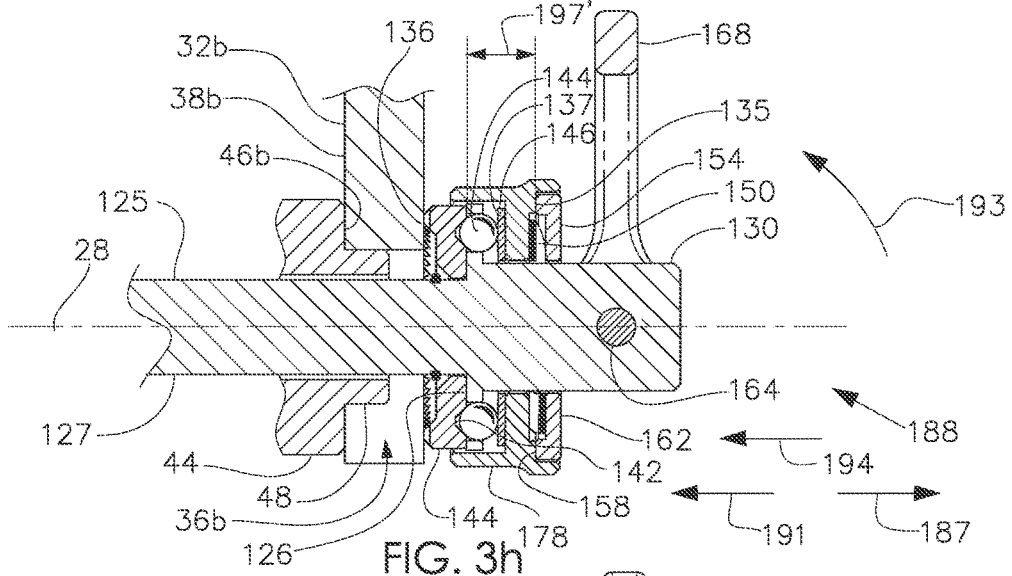
Figure 3I:
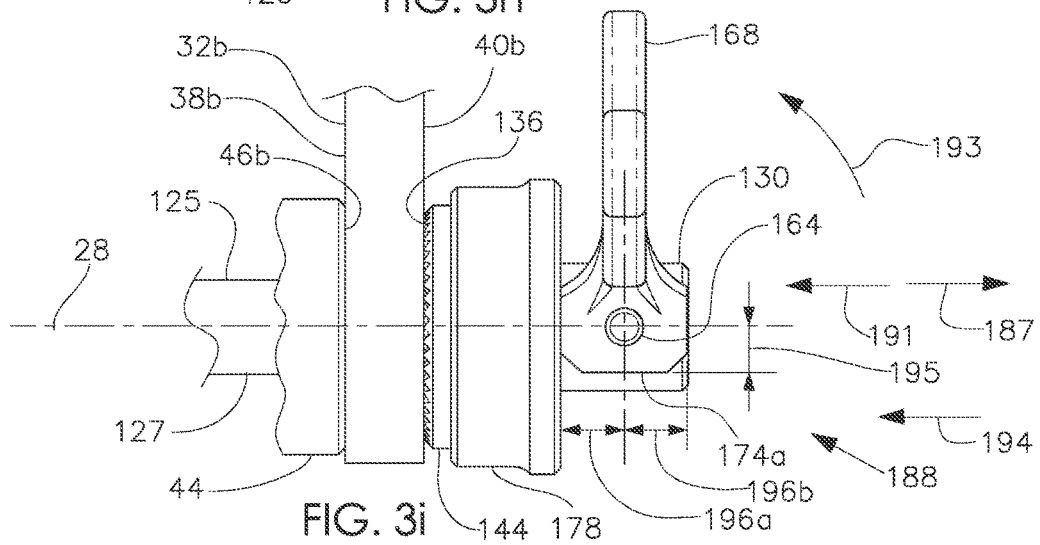

Next, as shown in FIGS. 3h and 3i, the handle 168 is folded and pivoted in direction 193 about pivot pin 164 and pivot axis 166 to a closed position, as initiated by the operator. This serves to rotate cam lobes 174a and 174b to cam against follower face 162 such that the working peripheral distance of cam lobes 174a and 174b transitions from distance 195 (as shown in FIG. 3f) to larger distance 196a (as shown in FIG. 3i). The camming interaction between cam lobes 174a and 174b and follower face 162 serves to drive the follower washer 154 in direction 194 relative to the control shaft 125 such that ridge 158 solidly contacts and displaces pressure washer 178 in direction 194 to compress and flatten the belleville washer 146 against the axial outboard periphery of balls 144. The axial gap 197 is now reduced to 197' and the ridge 158 axially abuts the back face 135 and the belleville washer 146 is generally flattened against front face 137. It is noted that the belleville washer 146 serves as an axial spring of a significantly greater spring constant (i.e. stiffness) than the wave washer 150. The balls 144 are now axially constrained and locked by the flattened belleville washer 146. This serves to maintain nested engagement of the balls 144 with their respective recesses 142 and are now prevented from being cammed axially. The balls 144 also remain circumferentially locked to and engaged to recesses 142, thereby serving to rotationally lock and engage the control shaft 125 and the grip washer 134.

The rotational coupling of the head assembly 188 has now been transitioned between the passive and rotationally yieldable coupling interface provided by the rotational detent described in FIGS. 3e-g to a rotationally locked coupling interface actuated by actively pivoting the handle in direction 193.

The pressure washer 178 and belleville washer 146 may be considered to be engagement elements that are axially displaceable between a released position (as shown and described in FIGS. 3d-g) and an engaged position (as shown in FIGS. 3h-i). The grip washer 144 is rotationally released and rotatable relative to the control shaft 125 in the released position and is rotationally locked relative to the control shaft 125 in the engaged position. The handle 168 with cam lobes 174a and 174b serve as an actuator element that is selectively activated to axially displace these engagement elements between the released and engaged positions.

The balls 144 serve as an intermediate coupling element where the control shaft 125 is rotationally coupled to the balls 144 via holes 129 and the balls 144 are rotationally coupled to the grip washer 134 via recesses 142. Since the grip washer 134 is rotationally gripping and coupled to the outer face 40b, and the control shaft 125 is rotationally engaged and locked to the grip washer 134, the control shaft 125 is now also rotationally engaged and locked to the outboard face 40b. The control shaft 125 may not rotate about axial axis 28 to become inadvertently unthreaded from the adapter (not shown). In addition to the rotational detent described hereinabove, this rotational engagement mechanism serves to provide a second rotational coupling between the control shaft 125 and the grip washer 134. The control shaft 125 is now rotationally coupled and effectively locked to the dropout 32b and may not threadably loosen therefrom. The hub assembly (not shown) remains solidly locked to the dropouts and may not become inadvertently disassembled.

The embodiment of FIGS. 3a-i describe a two-stage or dual-mode anti-rotation coupling between the control shaft 125 and the dropout 32b. The first stage or mode is the passive rotational detent mechanism or circumferentially yieldable interlock that is primarily energized by the wave washer 150, while the handle is in the open position as described hereinabove. Reverse rotation in this first stage may only be achieved by overriding this rotational detent mechanism. The second stage or mode is an actively locked anti-rotation where the handle is actively folded by the operator to actively control the axial position of balls 144 and to provide a positive circumferential mechanical interlock with a more positive locking anti-rotation between the control shaft 125 and the dropout 32b.

Further, the axial preload provided by the wave washer 150 and the belleville washer 146 serves to bias the control shaft 125 and grip washer 134 in direction 187 relative to the dropouts 32a (not shown) and 32b. This bias serves to press the flanks of the external thread (not shown) of the control shaft 125 against the mating flank of the internal thread (not shown) of the adapter (not shown), resulting in alignment and friction therebetween. Thus, this axial bias also provides additional anti-rotational friction between the control shaft 125 and the adapter (not shown) to further restrict inadvertent threadable loosening of the control shaft 125 from the adapter. In this respect, the wave washer 150 and the belleville washer 146 also may serve a similar function to a conventional elastic lock washer, such as a split washer or a belleville washer.

The disassembly or removal of the hub assembly from the dropouts is basically the reverse of the assembly and installation procedure just described. The operator must first unfold the handle 168 to the open position, then rotate the open handle 168 in direction 192 with sufficient torque to override the rotational detent mechanism until the grip face 136 is no longer pressed against the outboard face 40*b*, then unthreading the control shaft 125 from the adapter (not shown). The remainder of the disassembly and removal process is basically the reverse of the assembly and installation procedure outlined in FIGS. 2*a-i*.

Axial resiliency is defined herein as the elastic axial displacement of a first element (i.e. control shaft 125) with respect to a second element (i.e. grip washer 134). As shown in several of the embodiments of the present invention, axial residency also includes an elastic spring that serves to provide an axial preload force that serves to bias the first and second elements axially apart from each other. In the embodiment of FIGS. 3*a-i*, the elastic spring elements are the wave washer 150 and the belleville washer 146.

The helical thread engagement between the control shaft 125 and the adapter (not shown) dictates that the control shaft 125 and head assembly 188 must advance in direction 191 in conjunction with rotation in direction 190 during installation and assembly of the hub assembly. In order for rotational coupling to be effective, it is preferable to have some amount of axial resiliency in the system. In this way, the control shaft 125 may continue to threadably advance in direction 191 to take up this axial resiliency after the grip washer 134 has rotationally and axially stalled against the outboard face 40*b*. In other words, the control shaft 125 will continue to rotationally and axially advance (due to the helical thread engagement) after the grip washer 134 has first contacted and stalled against the outboard face 40*b*. This way there will also be some amount of continued rotation of the control shaft 125 relative to the stationary grip washer 134 before the control shaft 125 solidly abuts the grip washer 134 in a solid stack-up. This axial resiliency also serves to impede inadvertent threadable loosening of the control shaft 125. The axial resiliency serves to maintain contact and frictional circumferential engagement between the grip face 136 and the stationary outboard face 40*b* while the control shaft 125 is threadably loosened in direction 192 over an angular range of rotation. This means that the rotational coupling will be effective at impeding inadvertent unthreading of the control shaft 125 over this angular range of threadable loosening. Without this axial resiliency, the grip face 136 would become immediately lose contact with the outboard face upon initiation of even a slight amount of threadable loosening of the control shaft 125.

In the embodiment of FIGS. 3*a-i*, the axial gap 198 provides this axial resiliency. When the grip face 136 first contacts the outboard face 40*b*, the axial gap 198 is open and expanded as shown in FIG. 3*e*. The elastic wave washer 150 serves to axially bias the grip washer 134 axially inwardly relative to the control shaft 125. As the head assembly 188 and control shaft 125 are threadably advanced in direction 191, the axial gap 197 is reduced and the wave washer 150 is axially compressed until the clamp face 126 is axially abutting the pressure face 138. During this axially inward travel of the head assembly 188 the control shaft 125 and balls 144 will continue to rotate in direction 190, with the balls 144 camming axially inwardly and outwardly against recesses 142 to provide the rotational detent mechanism described herein.

This elastic axial resiliency may be provided in the head assembly as shown in FIGS. 3*a-i* and other embodiments of the present invention. Alternatively and/or additionally, a degree of axial resiliency may be provided in the axle assembly, the dropouts, and/or the control shaft assembly as well. For example, the axle may elastically compress axially inwardly due to threadable tightening of the control shaft. In another example, the dropouts may flex and/or compress due to threadable tightening of the control shaft. In a further example, the control shaft may axially stretch due to threadable tightening of the control shaft.

The embodiment of FIGS. 3*a-i* show the components of the head assembly 188 to be axially retained to each other into one unit. More generically, it is shown that the grip washer 134 is shown to be axially retained to the control shaft 125 (by snapring 176). This axial retention provides a convenience to the operator and prevents these components from becoming separated while also controlling the axial position of the grip washer 134 to a predictable axial location relative to the control shaft 125. While this axial retention is the preferable arrangement, alternatively the snapring 176 may be omitted, removing this axial retention feature and permitting the grip washer 134 to shift axially relative to the shank portion 127 of the control shaft 125. There is also a wide range of alternate retaining means that are known in industry that may be utilized to axially retain the grip washer to the control shaft.

The description of the embodiment of FIGS. 3*a-i* show the control shaft 125 and head assembly 188 as utilized to secure a vehicle wheel axle to a pair of axially spaced dropouts 32*a* (not shown) and 32*b*, primarily by axially clamping these dropouts. It is understood that the generic interpretation of the present invention provides an anti-rotation means to a threadable axle system, including an axle that is stationary (as described in FIGS. 2*a-i*) or an axle that is rotating (similar to a unicycle, for example). Further, this anti-rotation means may be applied to an arrangement where the wheel is secured between a pair of axially spaced mounting portions (i.e. dropouts 32*a* and 32*b* of FIGS. 2*a-i*) or to an arrangement where the axle is secured to only a single mounting portion and may be cantilevered therefrom (as shown in FIGS. 6*c-d*).

Figure 4A:
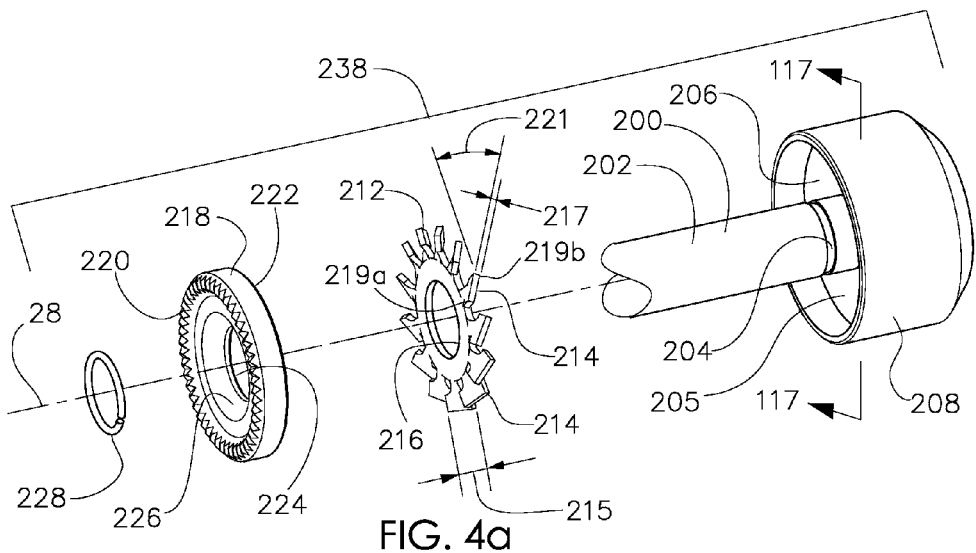
FIG. 4a is a partial exploded perspective view of a second embodiment of the present invention, including a grip washer and a rotatable clamping flange and including an axially resilient star washer axially positioned therebetween.
Figure 4B:
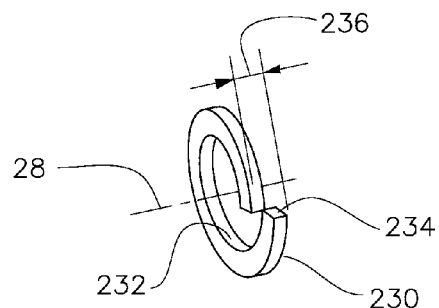
Figure 4C:
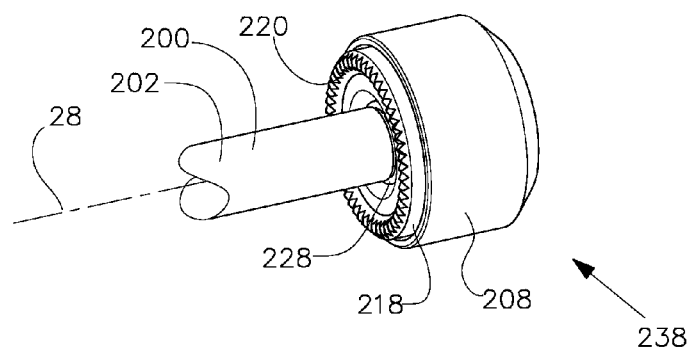
FIG. 4c is a partial perspective view of the embodiment of FIG. 4a, showing these components as assembled.
Figure 4D:
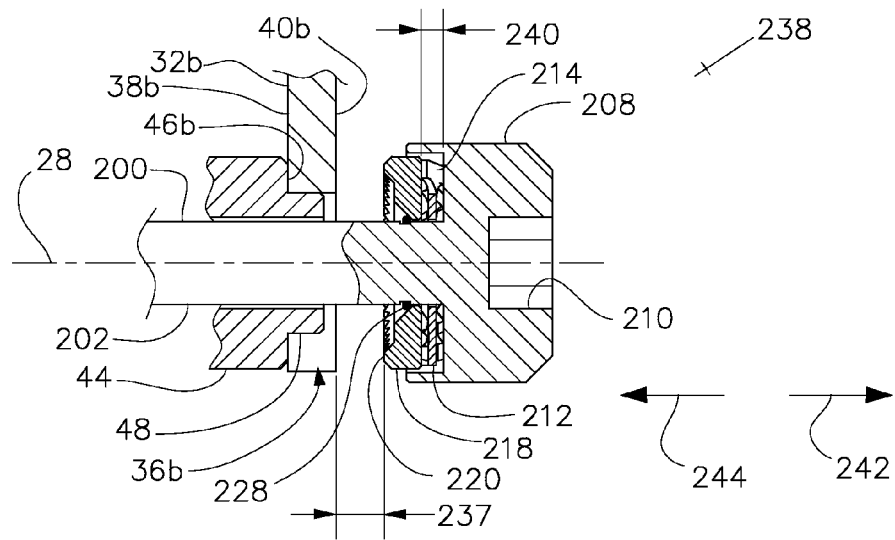
FIGS. 4d-f are axial cross-sectional views taken along 117-117 of the embodiment of FIG. 4a, showing the progressive sequential steps involved in assembling the hub assembly to the dropouts.
Figure 4E:
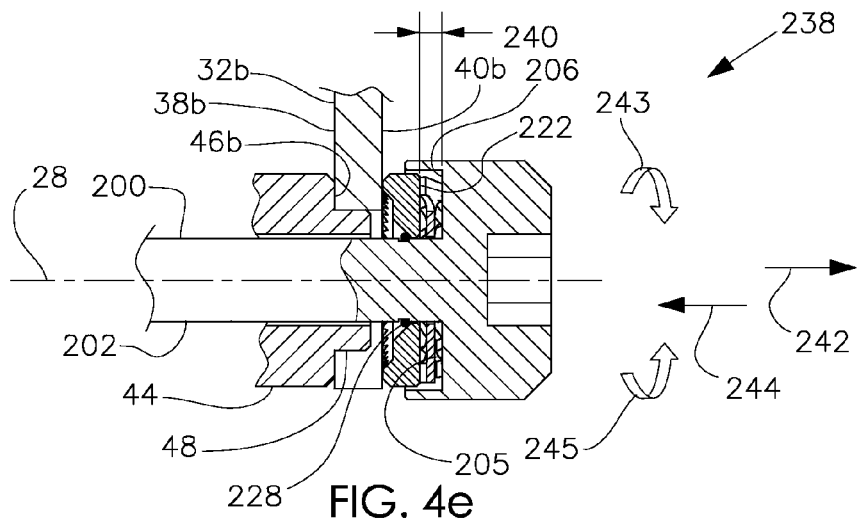
Figure 4F:
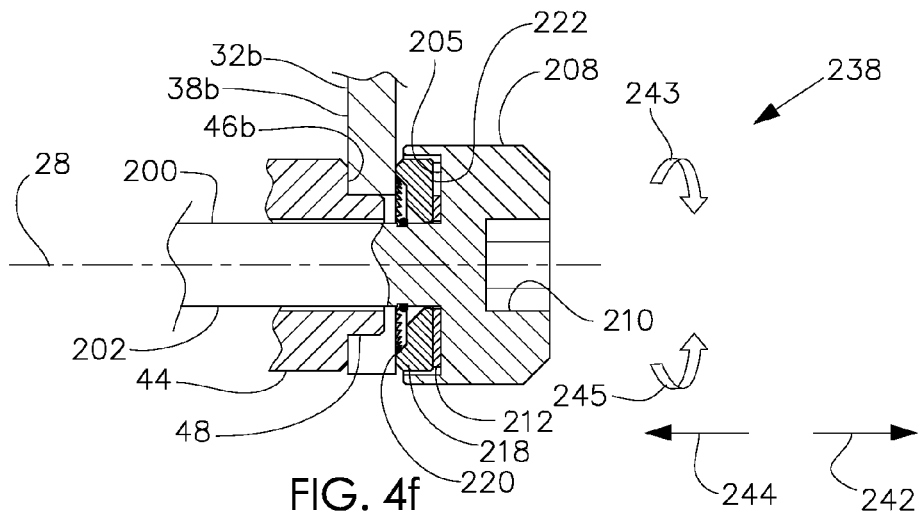

FIGS. 4*a-f* describes a mechanism that is substituted for the head portion 89 and handle 66 of FIGS. 2*a-i*. In FIGS. 4*a-f*, the rotational coupling between the grip washer 218 and the clamp face 206 is passively engaged. FIG. 4*a* is an exploded view showing the key components involved in the rotational coupling of this embodiment. Control shaft 200 is schematically similar to the control shaft 61 of FIGS. 2*a-i* in that it includes a threaded end (not shown) and functionally serves to secure the axle (not shown) of a hub assembly (not shown) to the dropouts (not shown). The embodiment of FIGS. 4*a-f* describes a mechanism that is substituted for the head portion 89 and handle 66 of FIGS. 2*a-i*. Control shaft 200 includes a shank portion 202 with a snapring groove 204, a radially extending clamp flange 205 with a clamp face 206; and a hex socket 210 as shown in FIGS. 4*d-f*. Star washer 212 includes a hole 216 therethrough and a series of circumferentially spaced tangs 214 around its radially outward periphery. Tangs 214 are twisted and canted as shown to achieve an axial width 215. Star washer 212 is very similar to external tooth lock washers known in industry. Grip washer 218 includes a hole 224 therethrough, a grip face 220, a countersink 226, and a pressure face 222. Snapring 228 is of a conventional variety, commonly termed a "wire snapring", and is sized to be installed and nested within snapring groove 204 in the conventional manner.

FIG. 4*b* shows a conventional split lockwasher 230 with a hole 232 therethrough and a split 234. The split lockwasher 230 is formed into a helical shape as shown such that it has an axial width 236 across the split 234. Split lockwasher 230 may be substituted for star washer 212 in FIG. 4*a* to provide similar function within the head assembly 238. The split lockwasher 230 is shown herein to provide an example of a wide range of alternate resilient spring elements that may be substituted for star washer 212.

FIG. 4c shows the components of FIG. 4a as assembled to create head assembly 238. The star washer 212 and grip washer 218 are assembled over shank portion 202 and then axially retained to the control shaft 200 by the snapring 228, which is assembled to snapring groove 204. This head assembly 238 is further detailed in FIGS. 4d-f, which also shows the dropout 32b and axlecap 44, both of which are identical to those described in FIGS. 2a-i.

Referring to FIG. 4a, star washer 212 is preferably stamped from sheet material of thickness 217 with a series of individual tangs 214 spaced circumferentially around its outer periphery. These tangs 214 are twisted out-of-plane as shown such that their axial width 215 at their radial outboard periphery is greater than the sheet thickness 217 of the star washer 212. The star washer 212 may serve as an axial spring such that, as axial load is applied across tangs 214, the tangs 214 will elastically un-twist and flatten. As shown in FIG. 4d, star washer 212 is axially sandwiched between the pressure face 222 of the grip washer 218 and the clamp face 206 of the clamp flange 205. The axially outward spring preload provided by the star washer 212 also serves to create an axial gap 240 between the pressure face 222 of the grip washer 134 and the clamp face 206 of the control shaft 200. The gap 240, as shown in FIG. 4d, corresponds to an axially inward position of the grip face 220 relative to the clamp flange 205. FIG. 4d shows the head assembly 238, with control shaft 200, as withdrawn in direction 242 to a retracted position such that grip face 220 is axially spaced from outboard face 40b of dropout 32b in an assembly sequence corresponding to that described in FIGS. 2d, 2g, and 2h.

Next, the control shaft 200 is rotated in direction 243 by means of manual manipulation of a hex key (not shown) engaged with hex socket 210, which serves to threadably tighten the control shaft 200 with the adapter 100 (not shown) in a manner described in FIGS. 2e and 2i. This threadable tightening serves to rotate and draw the control shaft 200 and head assembly 238 in the axially inward direction 244 until the grip face 220 contacts the outboard face 40b as shown in FIG. 4e. Upon contact, the grip face 220 will initially rotatably skid against the outboard face 40b and the grip washer 218 will then rotatably stall and cease to rotate in direction 243 due to increasing friction therebetween. However, the control shaft 200 and the remainder of the head assembly 238 will continue to rotate as the control shaft 200 is further threadably tightened. Since the grip washer 218 is axially abutting and pressed against outboard face 40b, it cannot move further axially inward, while the control shaft 200 continues to threadably advance in direction 244. The star washer 212 is thereby axially squeezed, causing the tangs 214 to elastically distort and flatten and as the axial gap 240 is reduced. This distortion also serves to increase the axial preload provided by the star washer 212.

As shown in FIG. 4f, the control shaft 200 is further threadably advanced in direction 244 such that tangs 214 are fully flattened to their solid axial thickness 217. As such, the tangs 214 are axially resilient spring elements that provide an axially inward preload to the grip washer 218 relative to the clamp face 206. Axial gap 240 has been reduced and is now close to thickness 217. The star washer 212 serves as an intermediate abutting element where the clamp face 206 axially abuts the star washer 212 and the star washer 212 axially abuts the pressure face 222. The grip washer 218 and star washer 212 will be sandwiched and solidly axially clamped between the clamp face 206 and the outboard face 40b to also sandwich and clamp the dropout 32b between the grip face 220 and the outer face 46b. This corresponds to an axially outward position of the grip face 220 relative to the clamp flange 205. The grip face 220 may also slightly emboss the outer face 40b, serving to create a mechanical interlock to further restrain and/or prevent circumferential and radial movement therebetween. The hub assembly (not shown) is thus clamped and installed to the dropouts 32a (not shown) and 32b in a manner similar to FIGS. 2f and 2i. The disassembly or removal of the hub assembly from the dropouts is basically the reverse of the assembly and installation procedure just described.

With the control shaft 200 threadably tightened, the flattened tangs 214 apply an axial preload to bias the clamp face 206 axially outwardly relative to the grip washer 218. These tangs 214 have been passively flexed, since the operator has simply threadably tightened the control shaft 200 without selectively operating the tangs 214 themselves. This axial preload may serve to prevent inadvertent reverse-rotation in direction 192 and the loosening of the threadable engagement between the control shaft 125 and the adapter 100, either due to flex or vibration of the system. Further, the axial preload provided by the star washer 212 serves to bias the control shaft 200 in direction 242 relative to the dropouts 32a (not shown) and 32b. This bias serves to press the flanks of the external thread (not shown) of the control shaft 200 against the mating flanks of the internal thread (not shown) of the adapter (not shown), resulting in alignment and contact friction therebetween. Thus, this axial bias provides anti-rotational friction between the control shaft 200 and the adapter (not shown) to restrict inadvertent threadable loosening of the control shaft 200 from the adapter. In this respect, the star washer 212 may serve a similar function to a conventional elastic lock washer, such as a split washer or a belleville washer. A split washer or belleville washer or other elastic spring element may be inserted in the head assembly 238 as a substitute for the star washer 212 to achieve a similar preload effect. The star washer 214 serves as an elastically resilient element to apply an axial separation bias between the grip washer 218 and the clamp flange 205 of the control shaft 200.

Additionally, the axial preload provided by the flexed tangs 214 serves to provide a frictional rotational coupling between the pressure face 222 and clamp face 206. This frictional rotational coupling further serves to provide a resistance torque to impeded rotation of the control shaft 200 and to restrict inadvertent loosening of the threadable engagement. The star washer 214 serves as an intermediate coupling element, where the control shaft 200 is rotationally coupled to the star washer 214 and the star washer 214 is rotationally coupled to the grip washer 218.

Each tang 214 includes an axially inboard edge 219a and an axially outboard edge 219b. Also, tangs 214 are each twisted and raked at a rake angle 221 as shown. As the control shaft 200 is threadably tightened, pressure face 222 and clamp face 206 press axially against and drag circumferentially against edges 219a and 219b respectively. Since the tangs 214 are raked as shown, when the control shaft 200 is rotated clockwise in direction 243 relative to the grip washer 218, pressure face 222 and clamp face 206 will circumferentially swipe past edges 219a and 219b respectively in a glancing coupling engagement. However, as the control shaft 200 is unthreaded and rotated counter clockwise in direction 245 relative to the grip washer 218, the rake angle 221 of tangs 214 will tend to cause edges 219a and 219b to bite into and grab pressure face 222 and clamp face 206 respectively in a grabbing coupling engagement. This grabbing interface further fortifies the rotational coupling interface between the control shaft 200 and the grip washer 218 in direction 245 to further restrict inadvertent loosening of the threadable engagement. Thus, while the rotational coupling between the control shaft 200 and the grip washer 218 is bi-directional to provide resistance torque therebetween in both directions 245 and 245, the rake angle 221 creates a higher resistance torque in the threadable loosening direction 245 than the threadable tightening direction 243.

It is noted that the grip face 220 is shown to be circumferentially serrated or knurled. This is a preferred arrangement, since this will provide good grip with the outboard face 40b, both in the circumferential and radial directions. Thus, as the grip face 136 is axially pressed against the outboard face 40b, circumferential and radial movement therebetween is restrained.

The rotationally coupling described in FIG. 4f is a yieldable coupling and the threadable loosening and disassembly of the control shaft 200 is simply the reverse of the sequence described hereinabove. Such manual loosening may require a higher initial torque than the manual tightening torque due to the rotational coupling and rake angle 221 between the star washer 212 and both the clamp face 206 and pressure face 222 as described above. The rake angle 221 is oriented to provide a glancing interface in the clockwise tightening direction 243 of rotation and biting or snagging interface in the counterclockwise loosening direction 245. As shown in FIG. 4f, the grip washer 218 is rotationally fixed to the stationary dropout 32b due to the frictional interface between the grip face 220 and the outboard face 40b. The star washer 212 serves as an axially resilient element to rotationally couple the control shaft 200 to the dropout 32b and serves to inhibit threadable loosening of the control shaft 200. The embodiment of FIGS. 4a-f describes a passive rotational coupling mechanism that is primarily energized by the star washer 212. After assembly as shown in FIG. 4f, threadable loosening may only be achieved by overriding this rotational coupling mechanism. Even if threadable loosening of the control shaft 200 were initiated, the axial resilience of this mechanism insures that this rotational coupling is maintained over an angular rotation range of the control shaft 200 to continue to inhibit further threadable loosening.

Figures 5A, 5B:
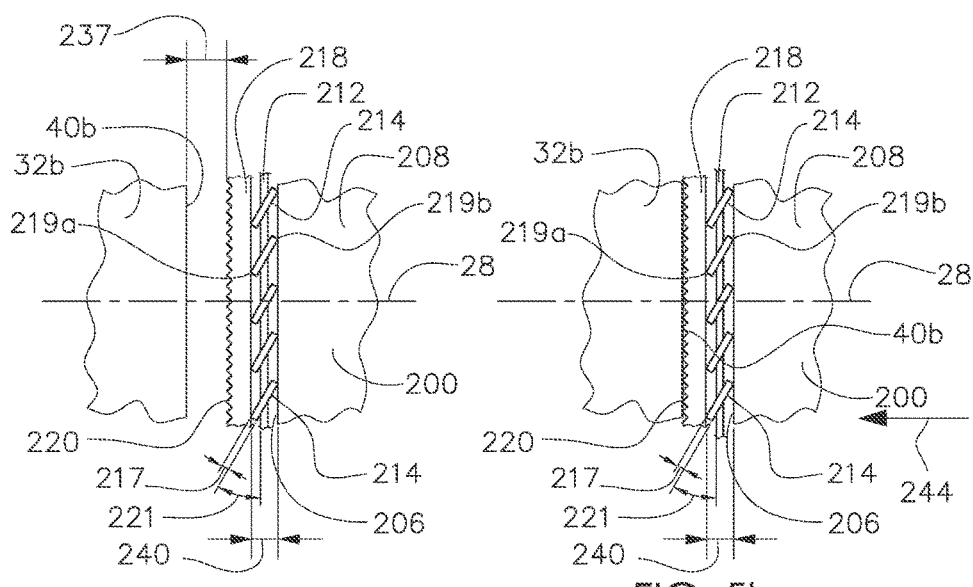
FIGS. 5a-d are circumferential detail views of the embodiment of FIG. 4a, with the collar, grip washer, and star washer as circumferentially "unrolled" for clarity, showing the progressive sequential steps involved in assembling the hub assembly to the dropouts.
Figures 5C, 5D:
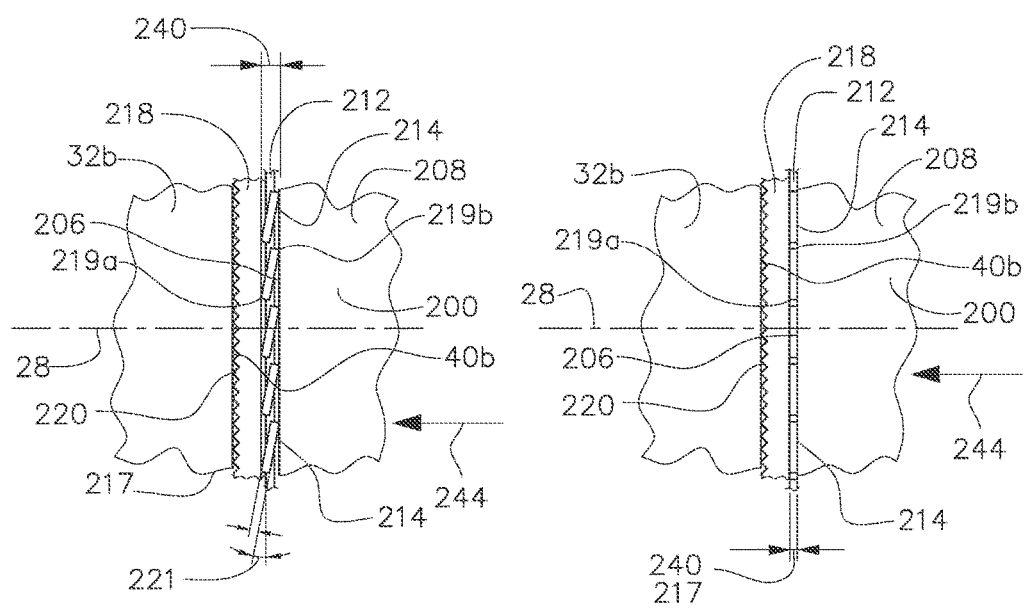

FIGS. 5a-d describe the interaction between the components of FIGS. 4a-f in greater detail, showing these components as circumferentially "unrolled" and in linear form for enhanced visualization. FIG. 5a corresponds to the assembly sequence of FIG. 4d where the control shaft 200 is in the retracted position. Tangs 214 are shown to be twisted with an un-flexed rake angle 221 and edges 219a are contacting pressure face 222 while edges 219b are contacting clamp face 206. Pressure face 222 and clamp face 206 are separated by axial gap 240 and grip face 220 is axially spaced from outboard face 40b by gap 237. FIG. 5b corresponds to the assembly sequence of FIG. 4e with the control shaft 200 threadably advanced in direction 244 until the grip face 220 begins to contact the outboard face 40b. FIG. 5c corresponds to the transition between the assembly sequence of FIGS. 4e and 4f. The control shaft 200 is now further threadably advanced in direction 244, as shown in FIG. 5c, which corresponds to the transition between the assembly sequence of FIG. 4e and FIG. 4f. The star washer 212 axially pressed and squeezed between pressure face 222 and clamp face 206 to axially flex the star washer 212 by slightly untwisting and flattening the tangs as shown to reduce rake angle 221 and correspondingly reduce axial gap 240. As the star washer 212 is elastically compressed and flexed as shown it will become preloaded to press against the pressure face 222 and clamp face 206 to provide an axial separation bias between pressure face 222 and clamp face 206. FIG. 5d corresponds to the subsequent assembly sequence of FIG. 4f, where the control shaft 200 is next further threadably advanced in direction 244, further sandwiching the star washer 212 until the tangs 214 are fully untwisted and flattened close to their solid height. The control shaft 200 now is in the engaged position as previously described herein. The axial gap 240 is now close to the sheet thickness 217 of the star washer 212. The head assembly 238 now has a generally solid axial stack of axial gap 240 and the dropout 32b is firmly clamped between grip faces 220 and outer face 46b.

FIGS. 5e-g describe a variation on the embodiment of FIGS. 4a-f and 5a-d where the clamp face and pressure face are configured to include a series of notches to create circumferentially serrated surfaces arranged to engage the edges 219a and 219b. As defined herein, a circumferentially serrated surface includes a series of circumferentially spaced projections that extend axially outwardly from the base surface with in a corresponding series of reliefs circumferentially positioned between adjacent projections. These projections are arranged to have a generally constant circumferential pitch. The grip face 220 illustrated in FIG. 4a is an example of a circumferentially serrated surface.

FIGS. 5e-g describe the interaction between the components in greater detail, showing these components as circumferentially "unrolled" and in linear form for enhanced visualization. Star washer 212 is identical to that described in FIGS. 4a-f and 5a-d. Grip washer 248 is similar to grip washer 218 described in FIGS. 4a-f and 5a-d, and includes knurled or serrated grip face 250. Unlike grip washer 218, pressure face 252 is configured to include a series of circumferentially spaced notches 254 or axial reliefs that extend generally radially and are circumferentially aligned with corresponding edges 219a. Control shaft 256 is similar to control shaft 200 described in FIGS. 4a-f and 5a-d, and includes clamp flange 258 and clamp face 260. Unlike control shaft 200, clamp face 260 is configured to include a series of circumferentially spaced notches 262 or axial reliefs that extend generally radially and are circumferentially aligned with corresponding edges 219b. Since axial notches 254 and 262 are axially relieved contours, the circumferential gaps between adjacent notches 254 and 262 may be considered as respective axial projections relative to these notches 254 and 262 respectively. The circumferential pitches of notches 254 and 262 are preferably matched to the circumferential pitch of edges 219a and 219b.

FIG. 5e corresponds to the assembly sequence of FIG. 5a. Tangs 214 have an un-flexed rake angle 221 and edges 219a are axially adjacent pressure face 252 and are circumferentially aligned with respective notches 254 while edges 219b are adjacent clamp face 260 and circumferentially aligned with respective notches 262. Pressure face 252 and clamp face 260 are separated by axial gap 266 and grip face 250 is axially spaced from outboard face 40b by gap 264. Edges 219a and 219b are not necessarily nested or axially engaged with notches 254 and 262 respectively and the grip washer 248 may be rotatable relative to the control shaft 256 about axial axis 28. The control shaft 256 is shown to be in the retracted position.

FIG. 5f corresponds to the assembly sequence of FIG. 5b with the control shaft 256 threadably advanced in direction 267 until the grip face 250 contacts the outboard face 40b, which causes grip washer 248 to rotationally stall as described hereinabove. As the control shaft 256 is then further threadably advanced in axial direction 267 and rotational direction 268, clamp face 260 continues to rotate about axial axis 28 and edges 219a and/or 219b are cammed axially inwardly and outwardly against notches 254 and 262 respectively, causing tangs 214 to elastically flex and thus create a rotational detent similar to the rotational detent described in FIGS. 3a-i. Gap 266 may be reduced relative to that shown in FIG. 5e.

FIG. 5g corresponds to the assembly sequence of FIG. 5d where the control shaft 256 has next been further threadably advanced in direction 267, to further axially sandwich the star washer 212 as tangs 214 are further elastically flattened to reduce their rake angle 221 with edges 219a axially nested and circumferentially engaged with notches 262 and edges 219b axially nested and circumferentially engaged with notches 254. The control shaft 256 is in the engaged position and the star washer 212 is solidly sandwiched between clamp face 260 and pressure face 252. The axial gap 266 is now further reduced and generally corresponds to the sheet thickness 217 of the star washer 212. The head assembly 265 now has a solid axial stack of minimum axial gap 266 and the dropout 32b is firmly clamped between grip faces 250 and outer face 46b. The notches 254 and 262 serve to create a cammed detent mechanism to provide a more positive rotational coupling and anti-rotation means (as compared to the embodiment of FIGS. 5a-d) to further impede rotation and to prevent inadvertent threadable loosening of the control shaft 256 relative to dropout 32b.

Figure 6A:
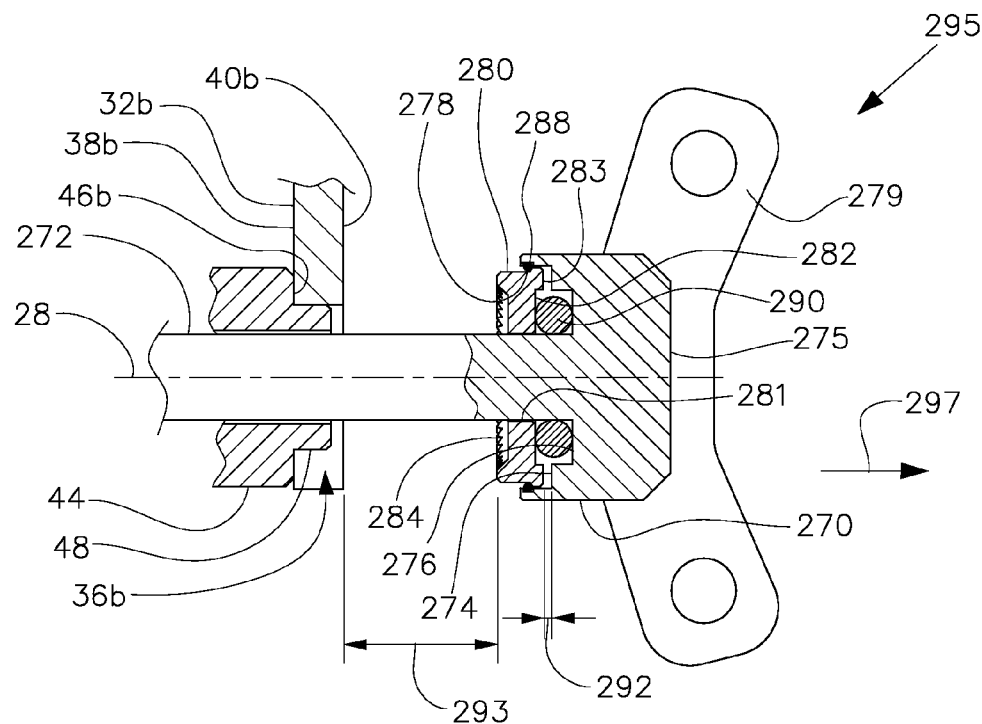
FIG. 6a is a partial cross section view of a third embodiment of the present invention, including a grip washer and a rotatable clamping flange and including an axially resilient elastomer washer axially positioned therebetween, shown in the assembly sequence corresponding to FIG. 4d.
Figure 6B:
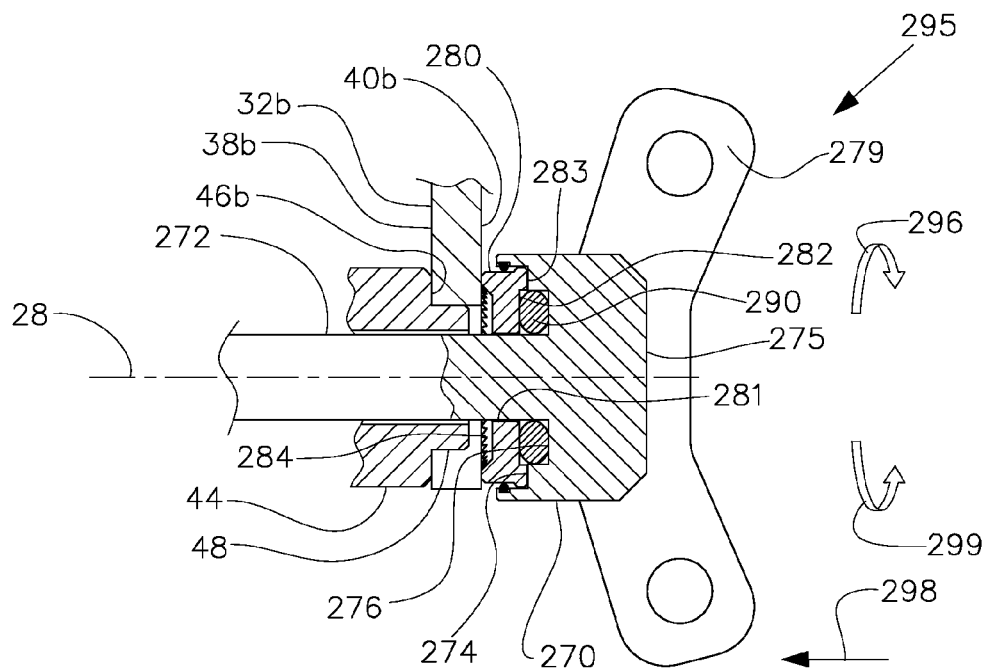
FIG. 6b is a partial cross section view of the embodiment of FIG. 6a, next shown in the assembly sequence corresponding to FIG. 4f, with the elastomer washer axially compressed to create a rotational coupling between the grip washer and the control shaft and to axially clamp the dropout.
Figure 6C:
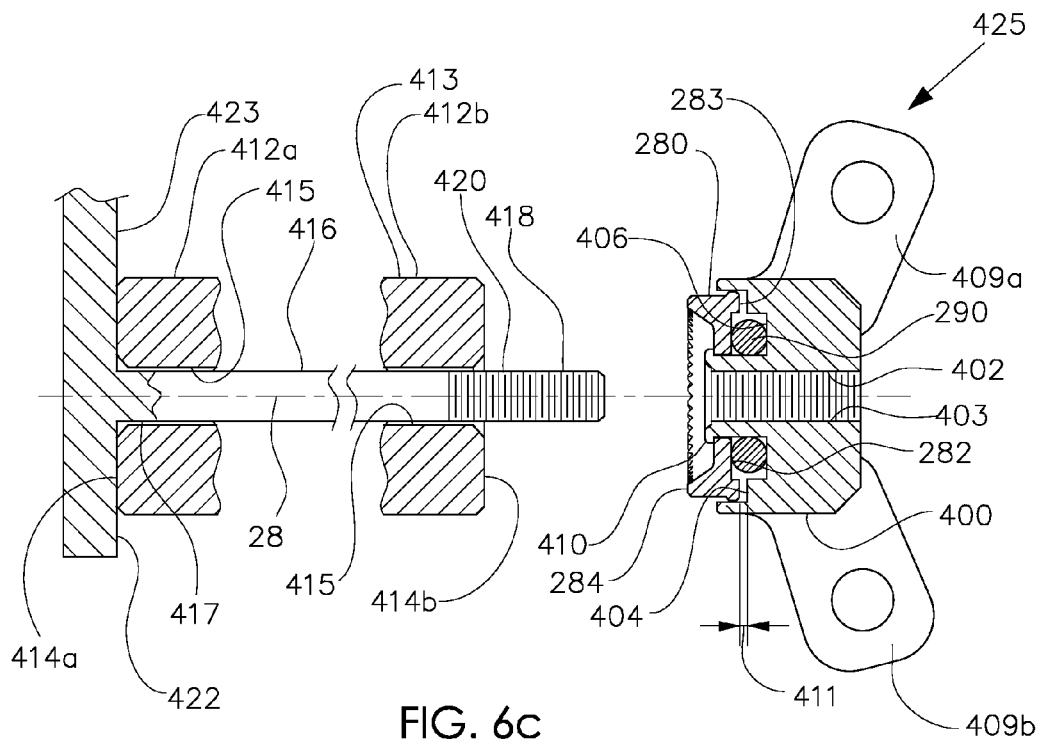
FIG. 6c is a partial cross section exploded view of a fourth embodiment of the present invention, where the head assembly includes internal threads to mate with external threads of a central shaft, including a grip washer and a rotatable clamping flange and including an axially resilient elastomer washer axially positioned therebetween.
Figure 6D:
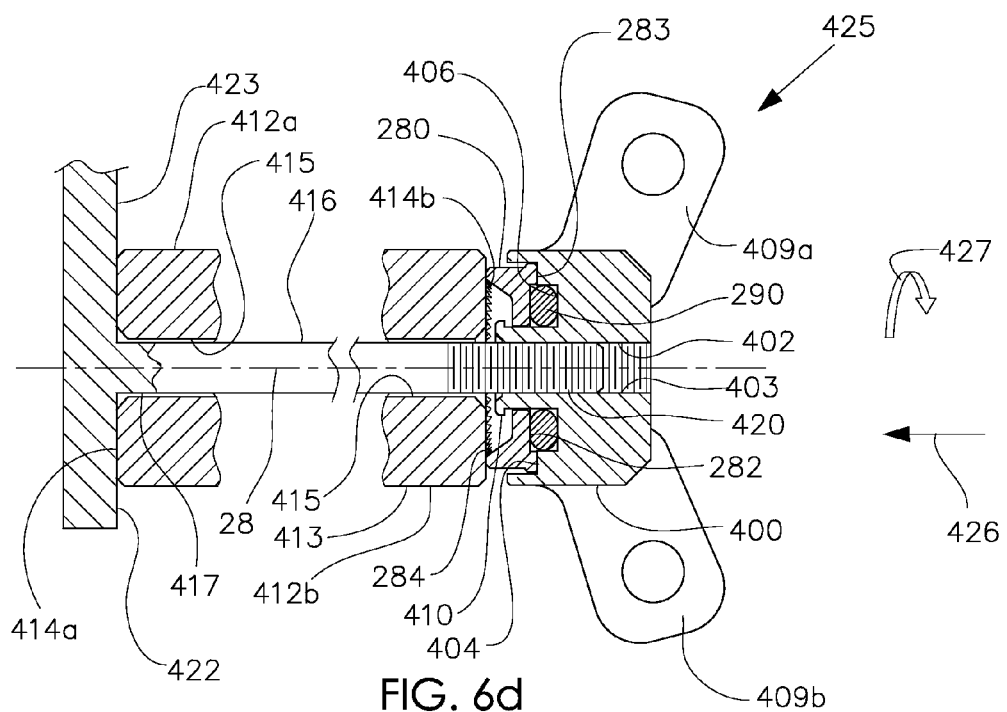
FIG. 6d is a partial cross section view of the embodiment of FIG. 6c, next shown in the assembly sequence corresponding to FIG. 4f, with the elastomer washer axially compressed to create a rotational coupling between the grip washer and the control shaft and to axially clamp the dropout.

FIGS. 6a-b describes a mechanism that is substituted for the head portion 89 and handle 66 of FIGS. 2a-i and includes a passive engagement of a rotational coupling between the grip washer and the clamp face. FIG. 6a corresponds to the assembly sequence of FIG. 4d, where the control shaft 270 is in the retracted position. Control shaft 270 is schematically similar to the control shaft 200 of FIGS. 4a-f and 5a-d in that it includes a threaded end (not shown) and functionally serves to secure the axle (not shown) of a hub assembly (not shown) to the dropouts 32a (not shown) and/or 32b. The embodiment of FIGS. 6a-b describes a mechanism that is substituted for the head portion 89 and handle 66 of FIGS. 2a-i. Control shaft 270 includes a shank portion 272, a head portion 275 with a clamp face 274, internal snapring groove 278, and recess face 276; and a handle 279. Handle 279 is provided to facilitate manual manipulation of the control shaft 270. Grip washer 280 includes a hole 281 therethrough, a grip face 284, a back face 283, and a pressure face 282. O-ring 290 is an annular element made of elastically resilient elastomer material and circumferentially surrounds the shank portion 272 and is axially positioned between the pressure face 282 and the recess face 276. Snapring 288 is of the conventional internal snapring variety and is installed and nested within internal snapring groove 278 in the conventional manner, serving to limit the axially inward movement of grip washer 280 relative to head portion 275 and serving to retain the grip washer 280 to the control shaft 270. These components are combined to create head assembly 295. Also shown are dropout 32b and axlecap 44, both of which are identical to those described in FIGS. 2a-i.

The o-ring 290 may serve as an axial spring such that, as the grip washer 280 is pressed axially outwardly relative to the head portion 275, the cross section of o-ring 290 will elastically distort and flatten. O-ring 290 is axially sandwiched between the pressure face 282 of the grip washer 280 and the recess face 276 of the head portion 275. The axially outward elastic preload provided by the o-ring 290 also serves to create an axial gap 292 between the back face 283 and the clamp face 274. FIG. 6a shows the head assembly 295, with control shaft 270, as withdrawn and retracted in direction 297 such that grip face 284 is axially spaced from outboard face 40b of dropout 32b by gap 293 in an assembly sequence corresponding to that described in FIGS. 2d, 2g, and 2h.

Next, the control shaft 270 is rotated in direction 296 and advanced in direction 298 by means of manual manipulation of handle 279, which serves to threadably tighten the control shaft 270 with the adapter 100 (not shown) in a manner described in FIGS. 2e and 2i. This threadable tightening serves to rotate and draw the control shaft 270 and head assembly 295 in the axially inward direction 298 until the grip face 284 first abuts and contacts the outboard face 40b as shown in FIG. 6b. Upon contact, the grip face 284 will initially rotatably skid against the outboard face 40b. Further threadable tightening will increase the circumferential friction force between the grip face 284 and outboard face 40b, causing the grip washer 280 to rotatably stall and to cease rotation in direction 296. However, the control shaft 270 and head assembly 295 will continue to rotate as the control shaft 270 is further threadably tightened. Since the grip washer 280 is axially abutting and pressed against outboard face 40b, it cannot move further axially inward, while the control shaft 270 continues to threadably advance in direction 298. The o-ring 290 is thereby axially squeezed, with its surface pressed between recess face 276 and pressure face 282, also reducing axial gap 292.

As shown in FIG. 6b the control shaft 270 is further threadably advanced in direction 298 such that clamp face 274 contacts and axially abuts back face 283 and o-ring 290 is further elastically distorted. This serves to increase the axial preload and resulting friction at the interfaces between the o-ring 290 and the recess face 276 and between the o-ring 290 and the pressure face 282. The o-ring 290 serves as an axially resilient spring element that provides an axially inward bias of the grip washer 280 relative to the recess face 276. FIG. 6b corresponds to the assembly sequence of FIG. 4f where axial gap 278 has closed and clamp face 274 is axially abutting back face 283. The grip washer 280 is now sandwiched and solidly axially clamped between the clamp face 274 and the outboard face 40b to also sandwich and clamp the dropout 32b between the grip face 220 and the outer face 46b. The grip face 280 may also emboss the outer face 40b, serving to create a mechanical interlock to further restrain and/or prevent circumferential and radial movement therebetween. The control shaft 270 is in the engaged position and the hub assembly (not shown) is thus clamped and installed to the dropouts 32a (not shown) and 32b in a manner similar to FIGS. 2f and 2i. The disassembly or removal of the hub assembly from the dropouts is basically the reverse of the assembly and installation procedure just described.

With the control shaft 270 threadably tightened as shown in FIG. 6b, the distorted o-ring 290 applies an axially outwardly preload to the recess face 276. The o-ring 290 has been passively flexed, since the operator has simply threadably tightened the control shaft 270 without selectively operating on the o-ring 290 itself. The elastic qualities of the o-ring provide an axially outwardly preload and bias that is similar to the axially outward preload provided by the star washer 212 of FIGS. 4a-f and provides similar thread locking and other beneficial means to prevent inadvertent reverse-rotation and threadable loosening in direction 299. Further, the softer and grippy elastomer material of the o-ring may have high grip and friction with the pressure face 282 and the recess face 276 to provide further frictional coupling and anti-rotation between the pressure face 282 and the recess face 276. The o-ring 290 serves to provide a high-friction coupling interface to create resistance torque between the stationary grip washer 280 and the rotatable control shaft 270, which is particularly useful in resisting inadvertent threadable loosening of the control shaft 270 relative to dropout 32b. The o-ring 290 also serves as an elastically resilient element to apply an axial separation bias between the grip washer 280 and the head portion 275 of the control shaft 270. Grip face 220 is shown to be serrated or knurled as also discussed in FIGS. 4a-f. The o-ring 290 serves as an intermediate coupling element, where the control shaft 270 is rotationally coupled to the o-ring 290 and the o-ring 290 is rotationally coupled to the grip washer 280.

The rotationally coupling described in FIG. 6b is a yieldable coupling and the threadable loosening and disassembly of the control shaft 270 is simply the reverse of the sequence described hereinabove. As shown in FIG. 6b, the grip washer 280 is rotationally fixed to the stationary dropout 32b due to the high-friction coupling interface between the grip face 284 and the outboard face 40b. The o-ring 290 serves as an axially resilient high-friction element to rotationally couple the control shaft 275 to the dropout 32b and serves to inhibit threadable loosening of the control shaft 275. The embodiment of FIGS. 6a-b describes a passive rotational coupling mechanism that is primarily energized by the o-ring 290. After assembly as shown in FIG. 6b, threadable loosening may only be achieved by overriding this rotational coupling mechanism. Even if threadable loosening of the control shaft 275 were initiated, the axial resilience of this mechanism insures that this rotational coupling is maintained over an angular rotation range of the control shaft 200 to continue to inhibit further threadable loosening.

The embodiments of FIGS. 3a-i, 4a-f, and 6a-b all include an axial extending shank portion that is axially fixed to a head portion. Further, with reference to FIGS. 2a-i, these embodiments include external threads (not shown) of the control shaft threadably engaged to internal threads of an adapter (not shown), in a general arrangement as described in FIGS. 2a-i. Still further, these embodiments describe a grip face that is axially clamping and gripping a dropout or mounting portion of the frame. In contrast, the embodiment of FIGS. 6c-d describes a an internally threaded nut assembly 425 that eliminates a shank portion in favor of an axially extending hole 402 with internal threads 403. Further, the grip face 284 serves to axially grip directly against the axlecap 412b of an axle assembly 413 instead of a dropout. The nut assembly 425 is otherwise very similar to the head assembly 295 of FIGS. 6a-b.

FIG. 6c is an exploded view, showing the nut assembly 425 prior to threadable assembly with the central shaft 416 to secure the axle assembly 413 thereto. Nut 400 corresponds roughly to head portion 275 of FIGS. 6a-b and includes: an axially extending through hole 402 with internal threads 403; a pair of handles 409a and 409b to facilitate manual manipulation of the nut assembly 425 in a manner similar to a wingnut; a recess face 406, and a clamp face 404 that are functionally identical to identically named features of FIGS. 6a-b; and a flared portion 410 that is deformably flared radially outwardly to axially retain the grip washer 280 as shown. In contrast to the snapring 176 of FIGS. 3a-i, which is a discreet retaining element, the flared portion 410 may be considered a means to retain the grip washer 280 to the nut 400 that is integral and unitary with the nut 400. Grip washer 280 and o-ring 290 are identical to those described in FIGS. 6a-b. The axially outward elastic preload provided by the o-ring 290 also serves to create an axial gap 411 between the back face 282 and the clamp face 406. Axlecaps 412a and 412b include outer faces 414a and 414b respectively and serve as axial end portions of an axle assembly 413 with an axially extending central opening 415 therethrough. Axlecap 412b is functionally similar to axlecap 44 of FIGS. 2a-i (with the exception of stub 48) and constitutes a portion of an axle assembly 413 of a hub assembly (not shown). Central shaft 416 includes a first end portion 417 fixed to a dropout 423 and a second end portion 418 extending to a point axially outboard of outer face 414b that includes external threads 420. Axle assembly 413 is first assembled to dropout 423, with central shaft 416 extending through opening 415 as shown and with outer face 414a axially abutting inboard face 422 of dropout 423. The central shaft 416 may be considered as an extension of the dropout 423 that axially overlaps the axle assembly 413. In contrast to the embodiment of FIGS. 2a-i where the axle assembly 24 is secured between two axially spaced dropouts 32a and 32b, FIGS. 6c-d describe an axle assembly 413 that is axially cantilevered off of a single mounting portion or dropout 423.

As shown in FIG. 6d, the nut assembly 425 has next been assembled to the central shaft 416, with internal threads 403 threadably engaged to external threads 420. FIG. 6d corresponds to the assembly sequence of FIG. 6b. As nut 400 is rotated in direction 427, the nut assembly 425 is threadably advanced in direction 426 until the grip face 284 contacts outer face 414b and the o-ring 290 is elastically deformed and compressed as shown in FIG. 6d.

The o-ring 290 and grip washer 280 function in the identical manner to that described in FIGS. 6a-b. Next, the nut assembly 425 is further rotated in direction 296 by means of manual manipulation of handles 409a and 409b, which serves to further threadably tighten the nut assembly 425 with the central shaft 416. This threadable tightening serves to rotate and further draw the nut assembly 425 in the axially inward direction 426 until the clamp face 404 contacts and abuts the back face 283 and the axle assembly 413 is axially clamped and sandwiched between grip face 284 and inboard face 422, as shown in FIG. 6d. The o-ring 290 provides a frictional coupling and an axially distal preload and bias between the recess face 406 and the pressure face 282 as described in the embodiment of FIGS. 6a-b. The axial distal preload serves to insure that the mating thread flanks of the threadable engagement remain in contact with sufficient friction and preload therebetween to impede inadvertent threadable loosening as also described hereinabove.

The rotationally coupling described in FIG. 6d is a yieldable coupling and the threadable loosening and disassembly of the nut assembly 425 is simply the reverse of the sequence described hereinabove. As shown in FIG. 6d, the grip washer 280 is rotationally fixed to the stationary axle assembly 413 due to the frictional interface between the grip face 284 and the outer face 414b and between the outer face 414b and the inboard face 422. The o-ring 290 serves as an axially resilient element to rotationally couple the nut assembly 425 to the dropout 423 and serves to inhibit threadable loosening of the nut assembly 425. The embodiment of FIGS. 6c-d describes a passive rotational coupling mechanism that is primarily energized by the o-ring 290. After assembly as shown in FIG. 6d, threadable loosening may only be achieved by overriding this rotational coupling mechanism. Even if threadable loosening of the nut assembly 425 were initiated, the axial resilience of this mechanism insures that this rotational coupling is maintained over an angular rotation range of the nut assembly 425 to continue to inhibit further threadable loosening.

Figures 7A, 7B, 7C:
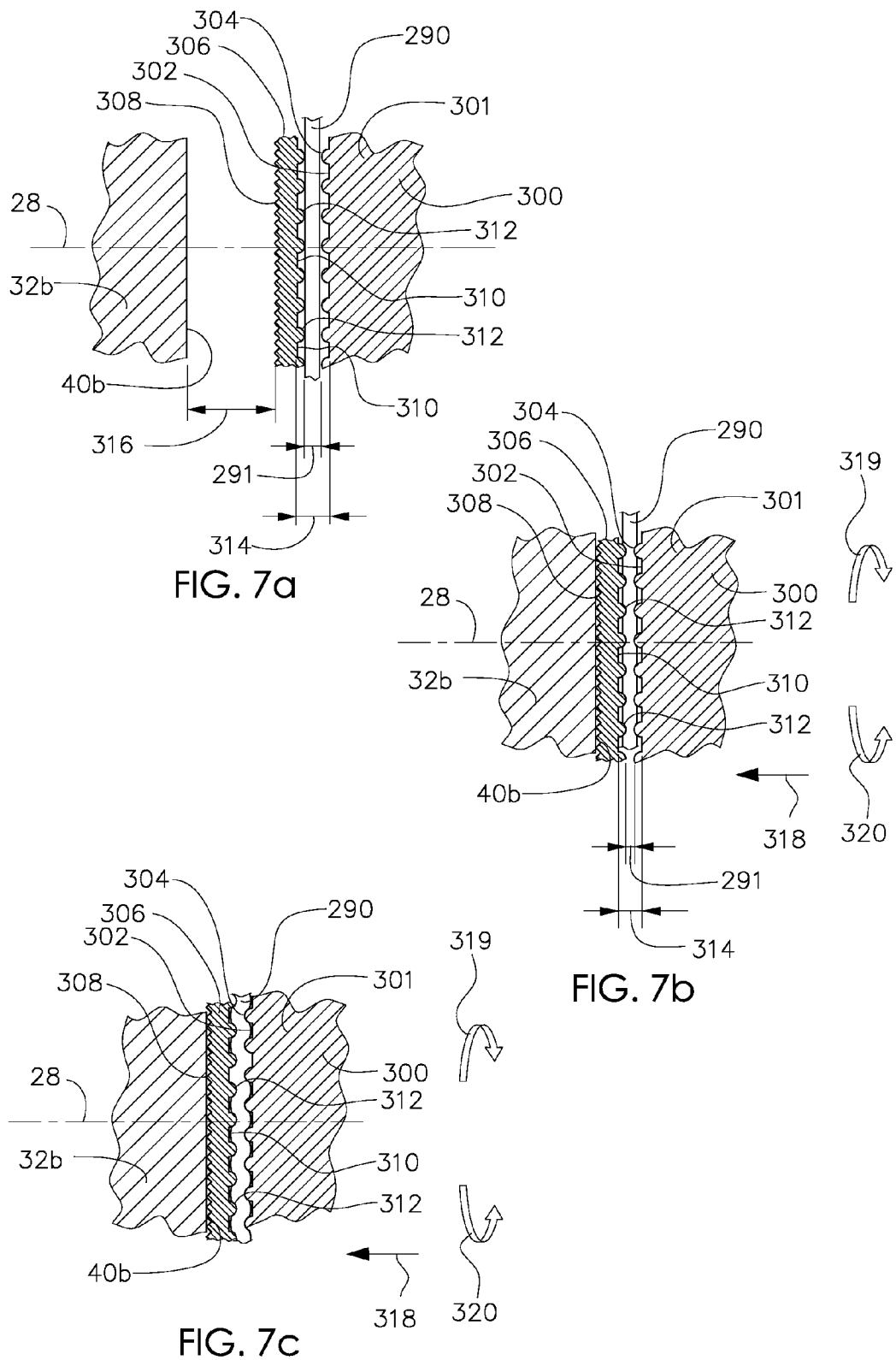
FIGS. 7a-c are circumferential detail views of an alternate version to the embodiment of FIG. 6a where the clamp face and pressure face include notches to engage and deform the elastomer washer, with the head portion, grip washer, and elastomer washer as circumferentially "unrolled" for clarity, showing the progressive sequential steps involved in assembling the hub assembly to the dropouts.

FIGS. 7*a-c* describe a variation on the embodiment of FIGS. 6*a-b* where the clamp face and pressure face include radial ridges or serrations to interact with the o-ring 290. FIGS. 7*a-c* describe the interaction between the components in detail, showing these components as circumferentially "unrolled" and in linear form for enhanced visualization. O-ring 290 is identical to that described in FIGS. 6*a-b*. Grip washer 306 is similar to grip washer 280 described in FIGS. 6*a-b*, and includes knurled or serrated grip face 308 and pressure face 310. Unlike the circumferentially smooth pressure face 282 of FIGS. 6*a-b*, pressure face 310 is configured to include a series of circumferentially spaced axial projections or ridges 312 that project axially outwardly to create a circumferentially serrated face. Control shaft 300 is similar to control shaft 270 described in FIGS. 6*a-b*, and includes head portion 301 with recess face 302. Unlike the circumferentially smooth recess face 276, recess face 302 is configured to include a series of circumferentially spaced axial projections or ridges 304 that project axially inwardly to create a circumferentially serrated face. As shown in FIGS. 7*a-c*, it is preferable that the circumferential pitch of ridges 312 and 304 are generally matched to each other.

FIG. 7*a* corresponds to the assembly sequence of FIG. 6*a*. Pressure face 310 and recess face 302 are separated by axial gap 314, and grip face 308 is axially spaced from outboard face 40*b* by gap 316. The axial width between the peaks of ridges 304 and 312 roughly corresponds to the axial thickness 291 of the relaxed and un-deformed o-ring 290. The control shaft 300 is shown in a retracted position. Control shaft 300 is also includes external threads (not shown) to threadably mate with an adapter (not shown) or directly with a corresponding dropout (not shown) in a manner identical with that described in FIGS. 2*a-i*. Next, the control shaft 300 is manually rotated in direction 319 about axial axis 28 to threadably advance the control shaft 300 in direction 318. FIG. 7*b* corresponds to the transition between the assembly sequence of FIG. 6*a* and the assembly sequence of FIG. 6*b* with the control shaft 300 threadably advanced in direction 318 until the grip face 308 begins to contact the outboard face 40*b* and grip washer 306 rotationally stalls as described hereinabove. As the control shaft 300 is then further threadably advanced in axial direction 318 and rotational direction 319, recess face 302 continues to rotate about axial axis 28 and ridges 304 are circumferentially swiped past ridges 312. FIG. 7*b* shows the position of rotation (in direction 319) where ridges 304 and 312 are circumferentially aligned to axially impinge and deform o-ring 290 and to locally reduce its thickness 291. This position of rotation corresponds to a larger deformation and greater axial preload of o-ring 290 and larger axial separation bias between control shaft 300 and grip washer 306. This angular position of rotation also corresponds to a position of larger resistance to rotation of the control shaft 300, both in direction 319 or in reverse-rotation direction 320.

Next, FIG. 7*c* corresponds to the assembly sequence of FIG. 6*b*, where the control shaft 300 is in the engaged position. The control shaft 300 has been further threadably tightened in directions 318 and 319 slightly past the rotational position of FIG. 7*b* until ridges 304 are each circumferentially aligned with the recess between two adjacent ridges 312. The localized impingement of o-ring 290 is now relaxed and the o-ring has a serpentine configuration as it weaves past ridges 304 and 312. The rotational position of FIG. 7*c* corresponds to a reduced axial preload as compared with the rotational position of FIG. 7*b*. Thus, as ridges 304 and 312 are circumferentially swiped past each other the result will be a rotational detent with a clicking or "notchiness" of rotation as the axial preload is varied. This rotational detent may be viewed as a mechanical interlock that is circumferentially yieldable. In comparison with the embodiment of FIGS. 6*a-b*, which utilizes the surface friction between o-ring 290 and the pressure face 282 and recess face 276 to provide anti-rotation therebetween, the embodiment of FIGS. 7*a-c* provides an additional anti-rotation effect due to the impingement of o-ring described in FIG. 7*b*. The ridges 304 and 312 serve to create a rotary detent mechanism to provide a more positive anti-rotation coupling means with greater resistance torque to impede and/or prevent inadvertent threadable loosening of the control shaft 300 in direction 320 between the grip washer 306 and the control shaft 300.

Figure 8A:
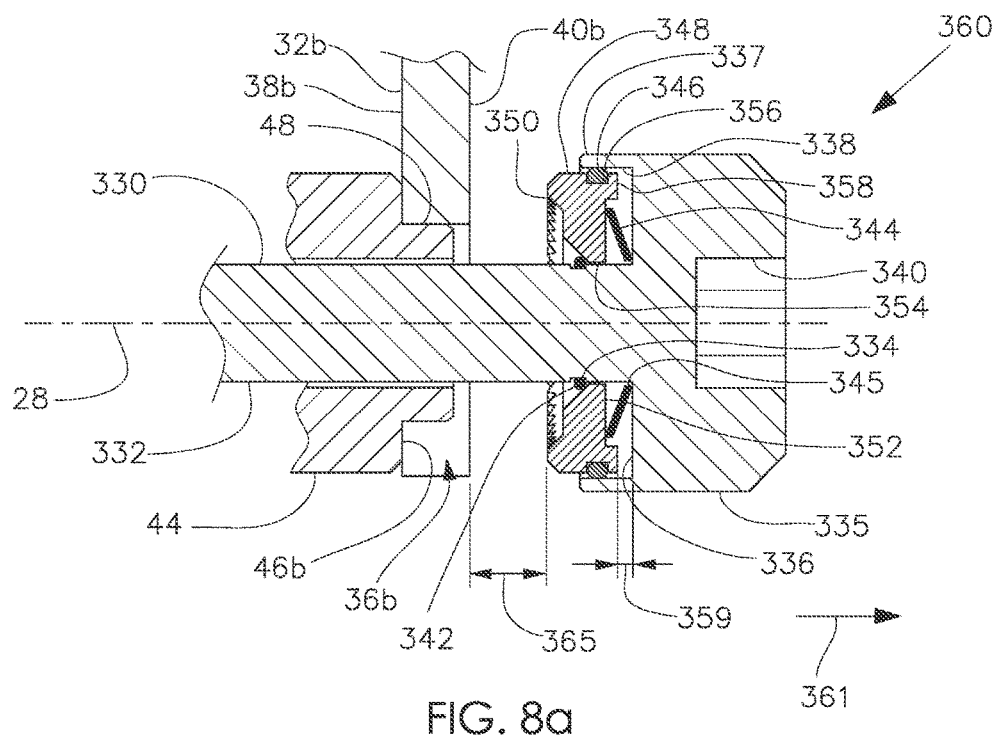
FIG. 8a is a partial cross section view of a fifth embodiment of the present invention, including a grip washer and a rotatable head portion, and a belleville washer axially positioned therebetween, shown in an assembly sequence corresponding to FIG. 4d.
Figure 8B:
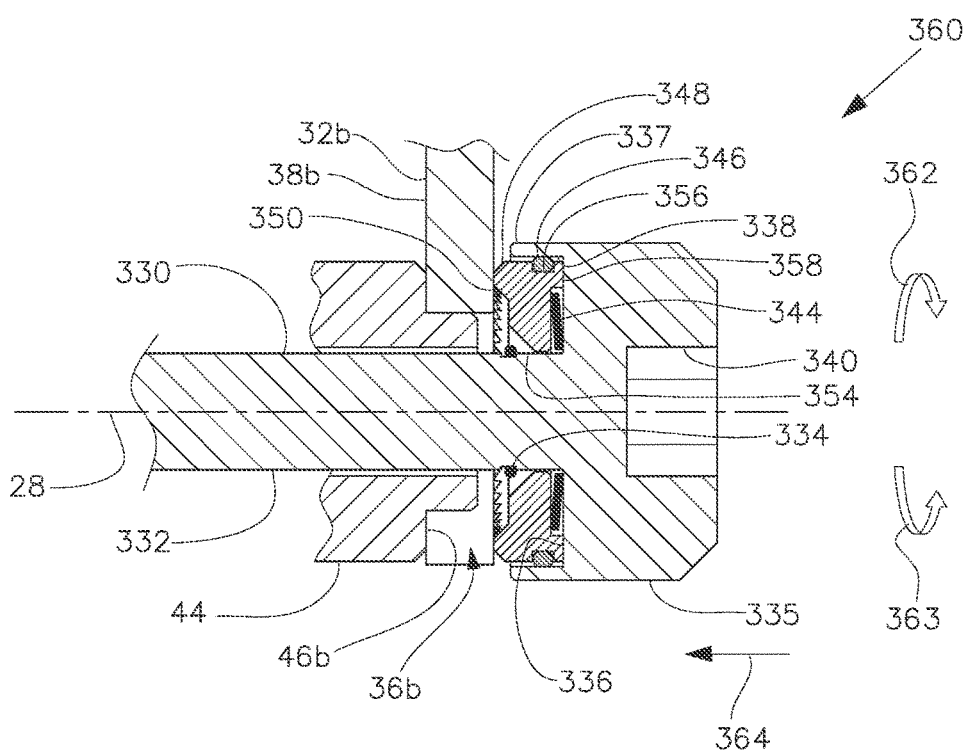
FIG. 8b is a partial cross section view of the embodiment of FIG. 8a, shown in the assembly sequence corresponding to FIG. 4f, with the axial belleville washer axially compressed and the o-ring providing a rotational coupling between the grip washer and the head portion.

FIGS. 8*a-b* describe an embodiment where the rotational coupling between the grip washer and the clamp face is passively engaged. FIG. 8*a* corresponds to the assembly sequence of FIG. 6*a*. Control shaft 330 is schematically similar to the control shaft 270 of FIGS. 6*a-b* in that it includes a threaded end (not shown) and functionally serves to secure the axle (not shown) of a hub assembly (not shown) to the dropouts 32*a* (not shown) and/or 32*b*. The embodiment of FIGS. 8*a-b* describes a mechanism that is substituted for the head portion 89 and handle 66 of FIGS. 2*a-i*. Control shaft 330 includes a shank portion 332 with snapring groove 334 and a head portion 335 with a clamp face 336, collar 337 with internal collar surface 338, and a hex socket 340. Grip washer 348 includes a hole 354 therethrough, a grip face 350, a back face 358, a pressure face 352, and a circumferential o-ring groove 356. O-ring 346 is an annular element made of elastically resilient elastomer material and is positioned within groove 356. Belleville washer 344 is of conventional configuration, with hole 345 therein and shank portion 332 extending therethrough. Snapring 342 is of the conventional external snapring variety and is installed within snapring groove 334 in the conventional manner, serving to retain the axially inward movement of grip washer 348 relative to head portion 335. These components are combined to create head assembly 360. Also shown are dropout 32*b* and axlecap 44, both of which are identical to those described in FIGS. 2*a-i*.

The belleville washer 344 serves to provide axial resiliency to the head assembly 360 and to serve as an axial spring such that, as the grip washer 348 is pressed axially outwardly relative to the head portion 335 while the control shaft 330 is advanced in direction 364, the belleville washer 344 will elastically distort and flatten. The elastic preload provided by the belleville washer 344 also serves to create an axial gap 359 between the back face 358 and the clamp face 336 as shown in FIG. 8*a*. O-ring 346 is radially sandwiched and squeezed between the collar surface 338 and groove 356. The elastomer material of the o-ring 346 has high grip and friction with the collar surface 338 and groove 356 to provide a high-friction rotational coupling and anti-rotation between the grip washer 348 and head portion 335. In contrast to the embodiment of FIG. 6*a-b*, where the o-ring 290 provides both an axial preload and a rotational coupling between the grip washer 280 and control shaft 270, the embodiment of FIGS. 8*a-b* utilize two elements to perform these two functions separately: the axially resilient belleville washer 344 provides axial preload and the o-ring 346 provides rotational coupling between the grip washer 280 and control shaft 270. FIG. 8*a* shows the head assembly 360, with control shaft 330, as withdrawn and retracted in direction 361 such that grip face 350 is axially spaced from outboard face 40b of dropout 32b by gap 365 in an assembly sequence corresponding to that described in FIGS. 2d, 2g, and 2h. The o-ring 346 serves as an intermediate coupling element, where the control shaft 330 is rotationally coupled to the o-ring 346 and the o-ring 346 is rotationally coupled to the grip washer 348.

Next, the control shaft 330 is rotated in direction 362 by means of manual manipulation of a hex key (not shown) engaged with the hex socket 340, which serves to threadably tighten the control shaft 330 with the adapter 100 (not shown) in a manner described in FIGS. 2e and 2i. This threadable tightening serves to rotate and draw the control shaft 330 and head assembly 360 in the axially inward direction 364 until the grip face 350 contacts the outboard face 40b as shown in FIG. 8b. Upon contact, the grip face 350 will initially rotatably skid against the outboard face 40b and then grip washer 348 will rotatably stall and cease to rotate in direction 362 due to friction. However, the control shaft 330 and head assembly 360 will continue to rotate in direction 362 as the control shaft 330 is further threadably tightened. Since the grip washer 348 is pressed against outboard face 40b, it cannot move further axially inward, while the control shaft 330 continues to threadably advance in direction 364. The belleville washer 344 is thereby axially squeezed between recess face 336 and pressure face 352, also reducing axial gap 359.

As also shown in FIG. 8b, which corresponds to the engaged position of the control shaft 330, the control shaft 330 has been further threadably advanced in direction 364 such that clamp face 336 contacts and axially abuts back face 358 and belleville washer 244 is further elastically distorted and flattened and creating an axial preload between pressure face 352 and clamp face 336. FIG. 8b corresponds to the assembly sequence of FIG. 6b where axial gap 359 has closed and clamp face 336 is axially abutting back face 358. The grip washer 348 is now sandwiched and solidly axially clamped between the clamp face 336 and the outboard face 40b to also sandwich and clamp the dropout 32b between the grip face 350 and the outer face 46b. The hub assembly (not shown) is thus clamped and installed to the dropouts 32a (not shown) and 32b in a manner similar to FIGS. 2f and 2i. The disassembly or removal of the hub assembly from the dropouts is basically the reverse of the assembly and installation procedure just described.

As shown in FIGS. 6a-b, the o-ring 290 is sandwiched and preloaded in an axial direction to create the rotational coupling between the recess face 276 of the control shaft 270 and the pressure face 282 of the grip washer 280. In contrast, FIGS. 8a-b show the o-ring 346 as being squeezed in a radial direction to create rotational coupling between the inside diameter of the collar 337 and the groove 356. It is understood that the rotational couplings described herein a are merely exemplary permutations that are representative of a wide range of possible arrangements, including an axially preloaded coupling interface and a radially preloaded coupling interface. It is noted that the belleville washer 344 of FIGS. 8a-b also provides rotational coupling between the pressure face 352 and the clamp face 336, which further augments the rotational coupling provided by the o-ring 346.

Figure 9A:
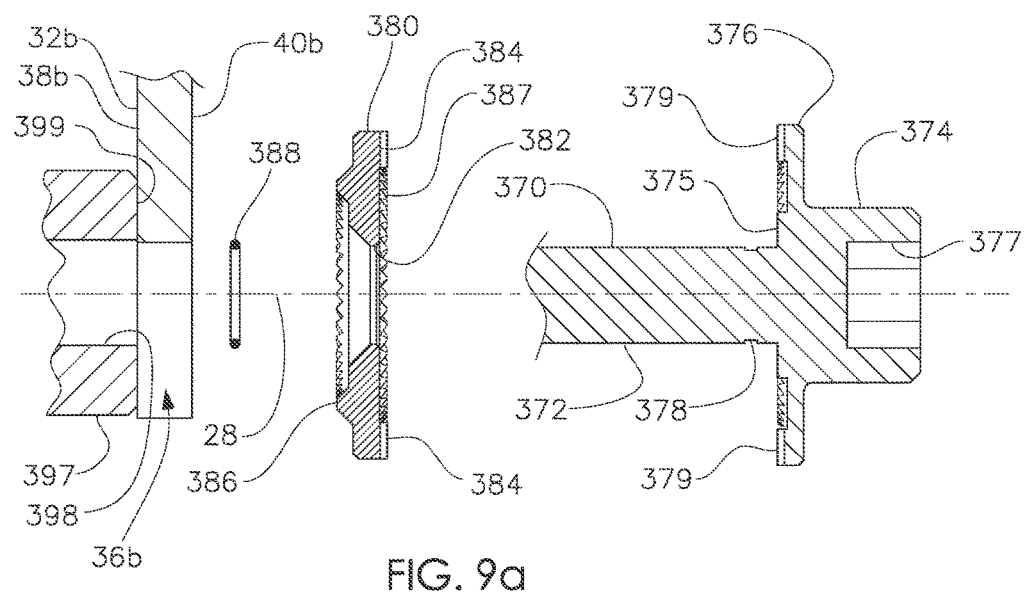
FIG. 9a is an exploded partial cross section view of a sixth embodiment of the present invention, including a circumferentially serrated mechanical coupling between the clamp face and the pressure face with a flexure of the clamp flange and a circumferential detent at the serrated coupling.
Figure 9B:
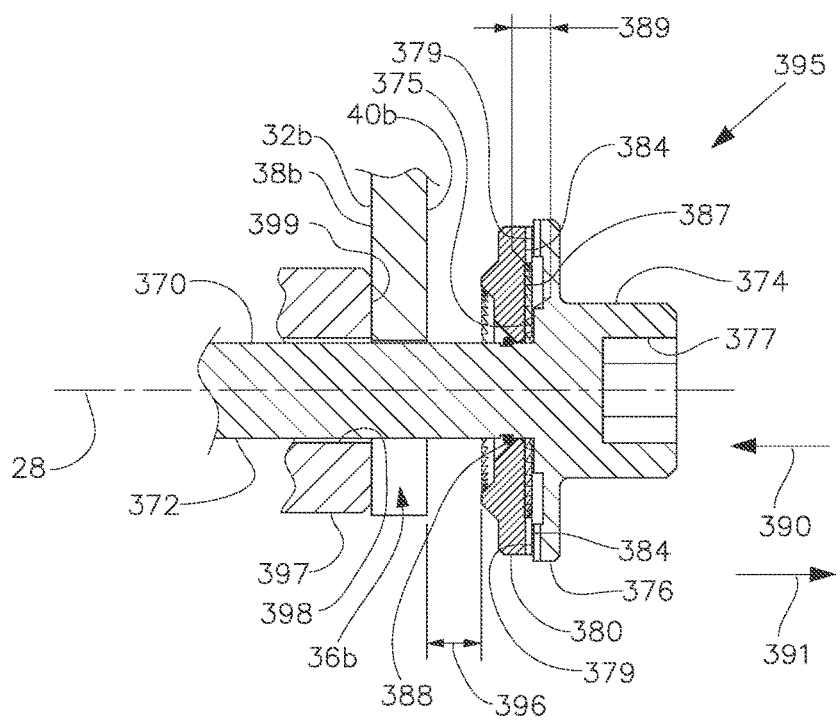
FIG. 9b is a partial cross section view of the embodiment of FIG. 9a, showing these components as assembled and corresponding to the assembly sequence of FIG. 4d.
Figure 9C:
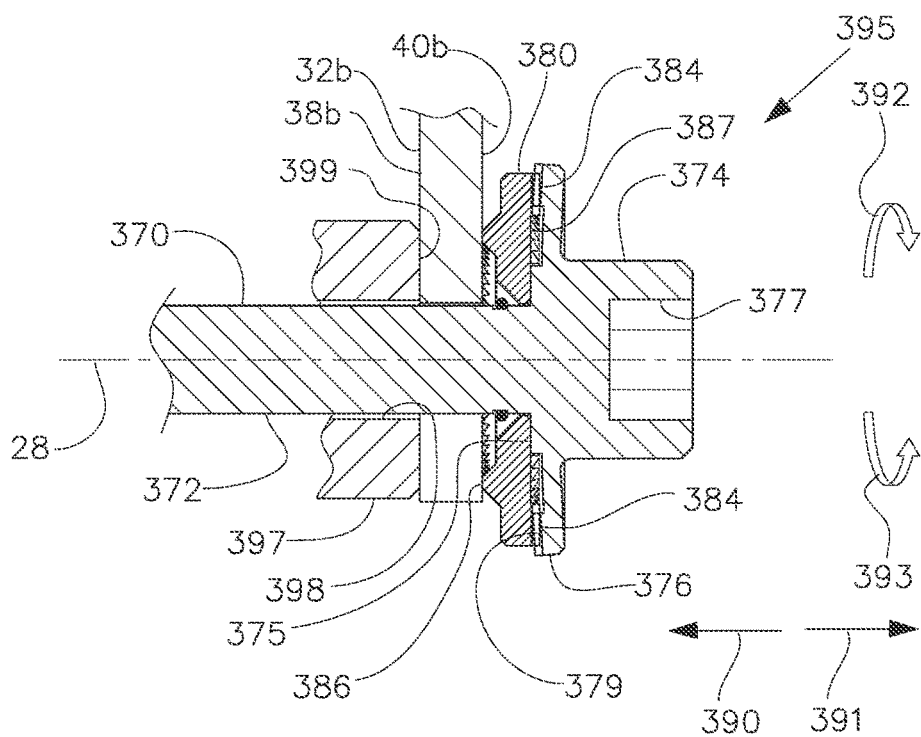
FIG. 9c is a partial cross section view of the embodiment of FIG. 9a, showing these components as assembled and corresponding to the assembly sequence of FIG. 4f, showing the face teeth of the clamp flange circumferentially engaged to the face teeth of the grip washer to create a rotational coupling therebetween, and including an axially abutting hard stop between the clamp flange and the grip washer.

FIGS. 9a-c describes a mechanism that is substituted for the head portion 89 and handle 66 of FIGS. 2a-i and where the rotational coupling between the grip washer and the clamp face is passively engaged. FIG. 9a is an exploded view showing the key components involved in the rotational coupling of this embodiment. Control shaft 370 is schematically similar to the control shaft 61 of FIGS. 2a-i in that it includes a threaded end (not shown) and functionally serves to secure the axle (not shown) of a hub assembly (not shown) to the dropouts (not shown). The embodiment of FIGS. 9a-c describes a mechanism that is substituted for the head portion 89 and handle 66 of FIGS. 2a-i. Control shaft 370 includes a shank portion 372 with a snapring groove 378, a head portion 374 with a clamp face 375, a flange 376 with axially inwardly facing face teeth 379 arranged circumferentially around its periphery, and a hex socket 377. Grip washer 380 includes a hole 382 therethrough, a grip face 386, a pressure face 387 with a series of axially outwardly facing face teeth 384 arranged circumferentially around its periphery as shown. Snapring 176 is of the conventional external variety and is sized to be installed within snapring groove 378 in the conventional manner. These components are combined to create head assembly 395. Also shown is dropout 32b which is identical to that described in FIGS. 2a-i. Axlecap 397 includes outer face 399 and axial opening 398 and is similar to axlecap 44 of FIGS. 2a-i with the exception that it does not include a stub 48. Without the stub, the radial locating alignment of the hub assembly (not shown) is instead provided by the shank portion 372 of the control shaft 370 (as shown in FIGS. 9b-c).

FIG. 9b corresponds to the assembly sequence of FIG. 6a. Control shaft 370 includes a threaded end (not shown) and functionally serves to secure the axle (not shown) of a hub assembly (not shown) to the dropouts 32a (not shown) and/or 32b. The grip washer 280 is axially retained to control shaft 370 by snapring 388. FIG. 9b shows the head assembly 395, with axial gap 389 between clamp face 375 and pressure face 387, and with control shaft 370 retracted and withdrawn in direction 391 such that grip face 386 is axially spaced from outboard face 40b of dropout 32b by gap 396 in an assembly sequence corresponding to that described in FIGS. 2d, 2g, and 2h.

The flange 376 is flexible and serves as an axial spring to provide axial resiliency such that, as the clamp face 375 is pressed axially inwardly relative to the grip washer 380, the flange 376 will elastically distort like a diaphragm to cup slightly with its periphery flexing axially outwardly. In contrast to the embodiment of FIG. 8a-b, where the belleville washer 344 provides axial resiliency to bias the grip washer 348 axially inboard relative to clamp face 336, the flange 376 may serve as an integral axial spring to provide a similar axial resiliency.

Next, the control shaft 370 is rotated in direction 392 by means of manual manipulation of a hex key (not shown) engaged with the hex socket 377, which serves to threadably tighten the control shaft 370 with the adapter 100 (not shown) in a manner similar to that described in FIGS. 2e and 2i. This threadable tightening serves to rotate and draw the control shaft 370 and head assembly 395 in the axially inward direction 390 until the grip face 386 contacts the outboard face 40b as shown in FIG. 9c. Upon contact, the grip face 386 will initially circumferentially skid against the outboard face 40b and, as friction between grip face 36 and outboard face 40b increases, the grip washer 380 will rotatably stall and cease to rotate in direction 392. However, the control shaft 370 will continue to rotate as the control shaft 370 is further threadably tightened. Since the grip washer 380 is pressed against outboard face 40b, it cannot move further axially inward and is also impeded from rotating, while the control shaft 370 continues to threadably advance in direction 390. The face teeth 379 will circumferentially swipe past face teeth 384, camming against each other, in and out of mesh, with passive axial movement provided by axial flexing of the flange 376 as described. Thus, as face teeth 376 are circumferentially swiped past face teeth 384, the result will be a rotational detent with a clicking or "notchiness" of rotation as the axial preload is varied. This rotational detent provides a rotational coupling between the rotatable control shaft 370 and the stationary grip washer 380 at a coupling interface between face teeth 379 and 384. When the control shaft 370 is finally threadably tightened such that face teeth 376 and 384 are circumferentially nested, their engagement results in a circumferential mechanical interlock that is also yieldable to permit further tightening and loosening of the control shaft 370. The flex of the flange 376 also serves to provide an axial resiliency to the head assembly 395 and to axially bias the grip washer 380 toward an axially distal orientation from the head portion 374.

As also shown in FIG. 9c the control shaft 370 has been further threadably advanced in direction 390 such that clamp face 375 contacts and axially abuts pressure face 387. FIG. 9c corresponds to the assembly sequence of FIG. 8b where axial gap 389 has closed and clamp face 375 is axially abutting pressure face 387. The grip washer 380 is now sandwiched and solidly axially clamped between the clamp face 375 and the outboard face 40b to also sandwich and clamp the dropout 32b between the grip face 386 and the outer face 399. The hub assembly (not shown) is thus clamped and installed to the dropouts 32a (not shown) and 32b in a manner similar to FIGS. 2f and 2i. The disassembly or removal of the hub assembly from the dropouts is basically the reverse of the assembly and installation procedure just described. The rotational coupling between face teeth 384 and 379 provides a resistance torque to impede and/or prevent inadvertent threadable loosening of the control shaft 370 relative to the dropouts 32b and 32a (not shown). In contrast to several of the other embodiments described herein, which utilize an intermediate coupling element to rotationally couple the control shaft with the grip washer, FIGS. 9a-c describe an arrangement where the rotational coupling interface is directly between the control shaft 370 and the grip washer 380.

The embodiment of FIGS. 9a-c shows a head assembly 395 that provides a solid axial stack between clamp face 375 and pressure face 387 upon threadable tightening and axial clamping as described in FIG. 9c. The flange 376 serves as an elastic axial spring that is integral with the head portion 374, with face teeth 379 as integral camming surfaces. Alternatively, these components may be designed such that the grip washer may simply be axially preloaded and biased axially inwardly against the dropout 32b by the control shaft, without having the hard stop therebetween provided by the axially abutting interface between clamp face 375 and pressure face 387. An example of such an arrangement is shown in FIG. 9d, which describes an embodiment very similar to the embodiment of FIGS. 9a-c.

Figure 9D:
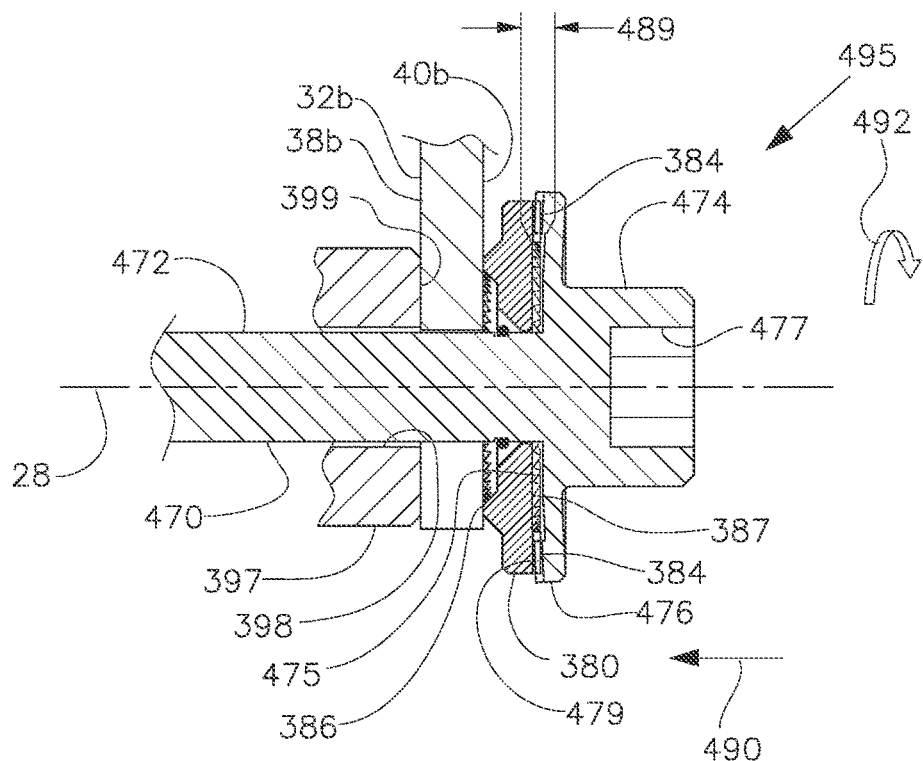
FIG. 9d is a partial cross section view of an alternate design similar to the embodiment of FIGS. 9a-c, corresponding to the assembly sequence of FIG. 9c, including an axially flexible stop instead of the axially abutting hard stop of FIGS. 9a-c.

In FIG. 9d, the control shaft 470 is schematically similar to the control shaft 61 of FIGS. 2a-i in that it includes a threaded end (not shown) and functionally serves to secure the axle (not shown) of a hub assembly (not shown) to the dropouts (not shown). The embodiment of FIG. 9d describes a mechanism that is substituted for the head portion 89 and handle 66 of FIGS. 2a-i. Control shaft 470 includes a shank portion 472 with a snapring groove 478, a head portion 474 with a clamp face 475, a flange 476 with face teeth 479 arranged circumferentially around its periphery, and a hex socket 477. Unlike the control shaft 370 of FIGS. 9a-c, the control shaft 470 does not include a clamp face 375. Grip washer 380, snapring 388, dropout 32b, and axlecap 397 are identical to those shown in FIGS. 9a-c. The control shaft 470, grip washer 380, and snapring 388 are assembled as previously described in FIGS. 9a-c to create head assembly 495.

The flange 476 is flexible and serves as an axial spring to provide axial resiliency such that, as the inboard face 475 is pressed axially inwardly relative to the grip washer 380, the flange 476 will elastically distort like a diaphragm to cup slightly with its periphery flexing axially outwardly in a manner identical to that described in FIGS. 9a-c. FIG. 9d describes an assembly sequence identical to FIG. 9c, where the control shaft 470 is rotated in direction 492 by means of manual manipulation of a hex key (not shown) engaged with the hex socket 477, which serves to threadably tighten the control shaft 470 with the adapter 100 (not shown) in a manner described in FIGS. 2e and 2i. This threadable tightening serves to rotate and draw the control shaft 470 and head assembly 495 in the axially inward direction 490 until the grip face 386 contacts the outboard face 40b as shown in FIG. 9d. Upon contact, the grip face 386 will initially rotatably skid against the outboard face 40b and the grip washer 380 will then rotatably stall due to friction and cease to rotate in direction 492. However, the control shaft 470 will continue to rotate as the control shaft 470 is further threadably tightened. Since the grip washer 380 is pressed against outboard face 40b, it cannot move further axially inward, while the control shaft 470 continues to threadably advance in direction 490. The face teeth 479 will then cam and detent against face teeth 384 as described in FIGS. 9a-c. As the control shaft 470 is threadably advanced in direction 490, axial gap 489 is reduced and the flange 476 is further axially flexed and preloaded. However, the inboard face 475 does not contact pressure face 387 and a gap 489 is maintained. The axial preload provided by flexure of the flange 476 serves to bias the grip washer 380 axially inwardly to provide the axial clamping of the dropout 32b between the outer face 399 and the grip face 386 and to secure the hub assembly (not shown) to the dropout 32b. In contrast to the embodiment of FIGS. 9a-c, which utilizes two modes of axial clamping: (i) a hard stop or solid axially abutting stack between the clamp face 375 and the pressure face 387; and (ii) an axial preload provided by flexure of the flange 376, the embodiment of FIG. 9d utilizes only the axial preload provided by flexure of the flange 476 to provide a "soft" resilient stop without a solid axially abutting stack between the control shaft 470 and the grip washer 380. The embodiment of FIG. 9d otherwise functions in a manner similar to that of FIGS. 9a-c.

Figure 10A:
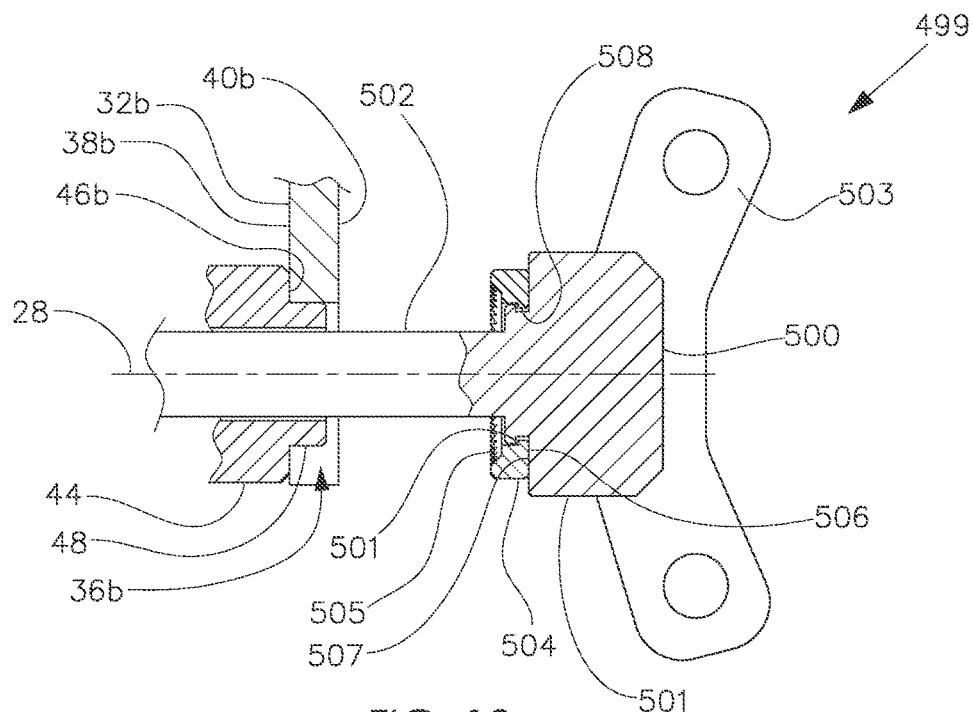
FIG. 10a is a partial cross section view of a prior art through-axle design, including a grip washer, shown without an axially resilient element or rotational coupling between the grip washer and the control shaft, shown in the assembly sequence corresponding to FIG. 4d.
Figure 10B:
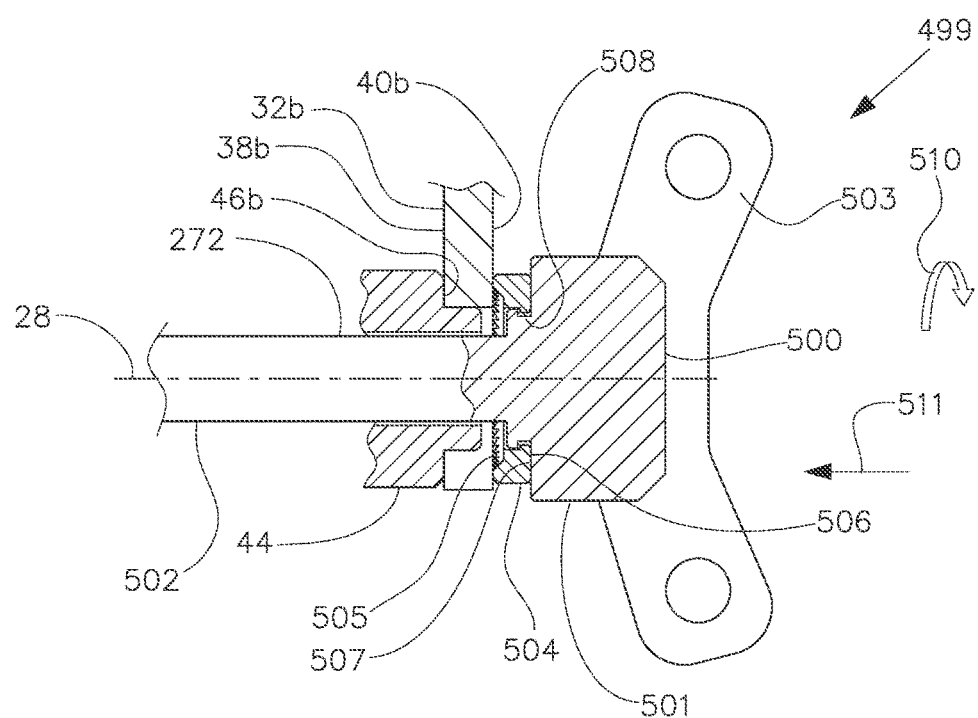
FIG. 10b is a partial cross section view of the prior art configuration of FIG. 10a, next shown in the assembly sequence corresponding to FIG. 4f to axially clamp the dropout.

FIGS. 10a-b describes a mechanism that is substituted for the head portion 89 and handle 66 of FIGS. 2a-i and shows a prior art through-axle design with a head assembly 499 that includes a through axle (i.e. control shaft 500) and a grip washer 504. The control shaft 500 includes a head portion 501 with a lever 503 fixed thereto, a shank portion 502, and a clamp face 507. Grip washer 504 includes a grip face 505, a pressure face 506, and an inside diameter 508. The dropout 32b is identical to the dropout 32b of FIGS. 2a-i. The grip washer 504 is freely rotatable about axial axis 28 relative to the control shaft 500 and is also axially retained to the control shaft 500 by means of an undercut engagement 501 at the inside diameter 508. FIG. 10a corresponds to the assembly sequence of FIG. 4d, where the control shaft 500 is in the retracted position. Control shaft 500 is schematically similar to the control shaft 200 of FIGS. 4a-f and 5a-d in that it includes a threaded end (not shown) and functionally serves to secure the axle (not shown) of a hub assembly (not shown) to the dropouts 32a (not shown) and/or 32b.

Next, as shown in FIG. 10b, the control shaft 500 is rotated in direction 510 and advanced in direction 511 by means of manual manipulation of lever 503, which serves to threadably tighten the control shaft 500 with the adapter 100 (not shown) in a manner described in FIGS. 2e and 2i. This threadable tightening serves to rotate and draw the control shaft 500 and head assembly 499 in the axially inward direction 511 until the grip face 505 contacts the outboard face 40b as shown in FIG. 10b. It is noted that the control shaft 500 and grip washer 504 are both hard metallic elements without any axial resiliency therebetween and without any circumferential mechanical interlock or significant rotational coupling therebetween.

In the absence of axial resilience in the head assembly 499, the grip washer 504 and dropout 32b become immediately and simultaneously sandwiched and clamped between the clamp face 507 and outer face 46b. There is little, if any, rotational wind-up of the lever 503 after the grip face 505 has contacted the outboard face 40b. Similarly, upon initiating the threadable loosening of the control shaft 500 (in the removal procedure to disassemble the hub assembly from the dropouts), the grip washer 504 and dropout 32b become immediately released and unclamped between the clamp face 507 and outer face 46b. Again, there is little, if any, rotational wind-up of the lever 503 after the pressure face 506 has been unclamped from the clamp face 507. As such, if the control shaft 500 is inadvertently threadably loosened, even by a small amount, control shaft 500 becomes rotationally un-coupled from the dropout 32b and there is negligible resistance to further threadable loosening due to vibration or other means. Inadvertent threadable loosening of the control shaft 500 may permit the wheel (not shown) to become loose in the dropouts and, especially with further loosening, may permit the wheel to become unattached from the dropouts.

Further, the frictional interface between the hard metallic surfaces of pressure face 506 and clamp face 507 is very low and does not provide for significant rotational coupling between the control shaft 500 and grip washer 504. As such, there is very low resistance to inadvertent threadable loosening of the control shaft 500. In contrast, the embodiments of the present invention, as described herein, are purposely designed with a coupling interface to increase and/or maximize the rotational coupling between the grip washer and control shaft. These coupling interfaces serve to impede or eliminate the possibility of inadvertent threadable loosening and thereby provide a significant safety feature.

While my above description contains many specificities, these should not be construed as limitations on the scope of the invention, but rather as exemplifications of embodiments thereof. For example:

Most embodiments describe the hub assembly being connected to the frame between two mounting portions (i.e. dropouts) as described in detail in FIGS. 2a-i. Alternatively, the present invention may be utilized to secure a hub assembly to a single mounting portion of the frame as shown in the embodiment of FIG. 6c-d.

While most embodiments describe the grip face as contacting a stationary surface of the dropout, alternatively the grip face may contact the axle assembly as shown in FIGS. 6c-d.

The embodiments show an axle (or axle assembly) and a control shaft (or central shaft) as two separate coaxial elements, that may be displaced axially and/or rotationally relative to each other. Alternatively, the control shaft and axle may be combined into a single unitary element. As a further alternative, the control shaft may be rotationally keyed to the axle.

The embodiments herein show the grip washer as axially retained to the head portion or to the nut. The retaining means shown herein are merely representative of a wide range of retaining means known in industry, including a snapring, a grip ring, a cross-pin, a weldment, a threaded assembly, a flared or deformed retaining means and others.

The retaining means is the preferred arrangement since it provides the convenience of maintaining the proper orientation and proximity between the grip washer and the head portion. This retaining means also prevents the grip washer from becoming inadvertently separated from the head portion. However, in the absence of such a retaining means, the present invention will still be functional to provide a rotational coupling and/or axial preload.

Most of the embodiments described herein show the grip face to be contacting a smooth and flat outboard face of the dropout, without any circumferential or rotational keyed engagement therebetween. Alternatively, the outboard face may include protrusions and/or recesses to circumferentially engage the grip washer. In such a case, the grip washer may have a circumferential or rotational keyed engagement with the outboard face that controls the circumferential alignment of the grip washer relative to the outboard face (or whichever element that the grip face abuts). For example, the outboard face may include a series of circumferential serrations that engage a knurled or serrated grip face. As a further alternate example, the grip washer may include a projection that has a rotationally keyed engagement with the open slot of the dropout.

The embodiments of FIGS. 2a-i and 3a-i show the axle assembly including a stub 48 that coaxially surrounds the shank portion (88, 127) to provide a convenient shielding external surface to provide the radial locating interface with slot 36b. Alternatively, such a stub or collar may be eliminated and the shank portion (88, 127) may instead serve to provide the radial locating interface directly with slot 36b, as shown in FIGS. 9a-d.

Most of the embodiments described herein include a control shaft where the shank portion is integral and unitary with the clamp flange or head portion of the control shaft. Alternatively, the control shaft may be made up of discreet components. For example, the shank portion (with threaded portion) may be a separate element connected to a clamp flange or head portion.

FIGS. 2a-i describe how the control shaft may be axially retained to the axle assembly. Alternatively, the control shaft need not be axially retained to the axle assembly and instead may be withdrawn from the axle assembly in a manner similar to a standard through-axle. Also, while several of the embodiments herein utilize an open or slotted dropout adjacent the grip washer, this dropout may alternatively be a closed dropout, similar to a standard through-axle arrangement.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel axle assembly, comprising:
   an axle element including an axial axis and a first outer face and a second outer face axially spaced and opposed to said first outer face;
   a clamping assembly including:
   (i) a clamping element including an axially inwardly facing clamping face and a helical threaded portion;
   (ii) a gripping element including an axially inwardly facing grip face and an axially outwardly facing pressure face;
   (iii) an elastically resilient element to bias said grip face in an axially inward orientation relative to said clamp face;
   wherein said gripping element is rotatable about said axial axis relative to said clamping element;
   wherein said threaded portion comprises at least one of external helical threads and internal helical threads;
   including a rotational coupling means between said clamping element and said gripping element to provide a resistance torque to impede rotation therebetween about said axial axis; and
   wherein said rotational coupling means occurs at a coupling interface to provide said resistance torque.

2. A vehicle wheel axle assembly according to claim 1, wherein said clamp face is axially opposed and axially outboard relative to said pressure face.

3. A vehicle wheel axle assembly according to claim 1, wherein said gripping element is axially displaceable between an axially inward position and an axially outward position relative to said clamping element.

4. A vehicle wheel axle assembly according to claim 3, wherein said coupling interface occurs over the axial range between said axially inward position and said axially outward position.

5. A vehicle wheel axle assembly according to claim 1, including a frame element that includes a first mounting portion thereof for mounting of said axle element, and wherein said clamping assembly serves to secure said axle element to said first mounting portion.

6. A vehicle wheel axle assembly according to claim 5, wherein said threaded portion is functional to threadably connect said clamping element to said first mounting portion and to secure said axle element to said frame element.

7. A vehicle wheel axle assembly according to claim 5, wherein said clamping element is axially displaceable between an axially inward position and an axially outward position relative to said gripping element, wherein said elastically resilient element serves to bias said clamping element toward said axially outward position, and wherein said grip face maintains abutting contact with said frame element as said clamping element is axially displaced between said axially inward position and said axially outward position.

8. A vehicle wheel axle assembly according to claim 7, wherein said elastically resilient element serves to bias said clamping element toward said axially outward position relative to said gripping element over the axial range between said axially inward position and said axially outward position.

9. A vehicle wheel axle assembly according to claim 5, wherein said frame element includes a second mounting portion thereof axially spaced from said first mounting portion, wherein said axle assembly is axially positioned between said first mounting portion and said second mounting portion, and wherein said threaded portion is threadably engaged with said first mounting portion, and wherein said second mounting portion includes an axially extending second opening threrethrough to receive at least one of said clamping assembly and said axle assembly.

10. A vehicle wheel axle assembly according to claim 9, wherein said second opening is an open slot, and wherein said open slot is functional to receive at least one of said axle element and said clamping assembly in a generally radial direction.

11. A vehicle wheel axle assembly according to claim 9, wherein said second mounting portion is axially positioned between said grip face and said second outer face, and wherein said clamping assembly is operative to axially clamp said second mounting portion between said grip face and said second outer face.

12. A vehicle wheel axle assembly according to claim 1, including a retaining element to axially retain said gripping element to said clamping element and to limit axially inward displacement of said gripping element relative to said clamping element.

13. A vehicle wheel axle assembly according to claim 12, wherein said retaining element is a discreet component from both said clamping element and said gripping element.

14. A vehicle wheel axle assembly according to claim 12, wherein said retaining element is integral and unitary with said clamping element.

15. A vehicle wheel axle assembly according to claim 1, wherein said coupling interface occurs between said elastically resilient element and at least one of said gripping element and said clamping element.

16. A vehicle wheel axle assembly according to claim 1, wherein said rotational coupling means is a passive rotational coupling means.

17. A vehicle wheel axle assembly according to claim 1, wherein said coupling interface is a high-frictional interface.

18. A vehicle wheel axle assembly according to claim 1, wherein said coupling interface includes a rotational detent interface.

19. A vehicle wheel axle assembly according to claim 1, wherein said coupling interface is a rotationally locked interface.

20. A vehicle wheel axle assembly according to claim 1, wherein said coupling interface is directly between said gripping element and said clamping element.

21. A vehicle wheel axle assembly according to claim 1, including an intermediate coupling element, wherein said gripping element is rotationally coupled to said intermediate coupling element and wherein said intermediate coupling element is rotationally coupled to said clamping element.

22. A vehicle wheel axle assembly according to claim 21, wherein said intermediate coupling element includes said elastically resilient element.

23. A vehicle wheel axle assembly according to claim 1, wherein the rotation of said clamping element relative to said gripping element is bi-directional, including a threadable tightening direction of rotation corresponding to threadable tightening of said threaded portion, and a threadable loosening direction of rotation opposed to said tightening direction, wherein said resistance torque in said threadable loosening direction is greater than said resistance torque in said threadable tightening direction.

24. A vehicle wheel axle assembly according to claim 1, wherein said elastically resilient element may be axially compressed to create a generally solid axial stack between said clamping element and said gripping element.

25. A vehicle wheel axle assembly according to claim 24, wherein said clamping element directly axially abuts said gripping element.

26. A vehicle wheel axle assembly according to claim 24, including an intermediate abutting element axially positioned between said clamping element and said gripping element, wherein said solid axial stack includes said intermediate abutting element.

27. A vehicle wheel axle assembly according to claim 24, wherein at least one of: (i) said gripping element includes an offset surface axially outboard of said pressure face, wherein said solid axial stack includes an axially abutting interface between said offset surface of said gripping element and said clamping element; and (ii) said clamping element includes an offset surface axially inboard of said clamp face, wherein said solid axial stack includes an axially abutting interface between said offset surface and the other of said clamping element and said gripping element.

28. A vehicle wheel axle assembly according to claim 1, wherein said elastically resilient element may be deflected to maintain an axial gap between said clamping element and said gripping element without a hard stop between said clamping element and said gripping element.

29. A vehicle wheel axle assembly according to claim 1, wherein said elastically resilient element is discreet from both said gripping element and said clamping element.

30. A vehicle wheel axle assembly according to claim 29, wherein said elastically resilient element is axially sandwiched between said clamping face and said pressure face.

31. A vehicle wheel axle assembly according to claim 1, wherein said elastically resilient element is integral and unitary with said clamping element.

32. A vehicle wheel axle assembly according to claim 1, wherein said elastically resilient element is an elastomeric element, wherein the cross section of said elastomeric element is deformed to provide said axial bias.

33. A vehicle wheel axle assembly according to claim 1, wherein said elastically resilient element is a spring element, wherein said spring element is flexed to provide said axial bias.

34. A vehicle wheel axle assembly according to claim 1, wherein said elastically resilient element is a circumferential annular element that circumscribes said axial axis.

35. A vehicle wheel axle assembly according to claim 1, wherein at least one of said clamp face and said pressure face is a configured surface including an axially extending projection to interface with said elastically resilient element at said coupling interface.

36. A vehicle wheel axle assembly according to claim 35, wherein said configured surface includes a circumferentially serrated surface.

37. A vehicle wheel axle assembly according to claim 36, wherein said clamp face includes a first circumferentially serrated surface and said pressure face includes a second circumferentially serrated surface, and wherein the circumferential pitch of said first circumferentially serrated surface is generally matched to the circumferential pitch of said second circumferentially serrated surface.

38. A vehicle wheel axle assembly according to claim 1, wherein at least one of said clamp face and said pressure face is a smooth circumferential surface to interface with said elastically resilient element at said coupling interface.

39. A vehicle wheel axle assembly according to claim 1, wherein said grip face includes a configured surface.

40. A vehicle wheel axle assembly according to claim 1, wherein at least one of said clamping element and an element connected thereto includes noncircular geometry to facilitate manual manipulation of said clamping element.

41. A vehicle wheel axle assembly according to claim 1, wherein said clamping element includes a shank portion that extends axially inwardly from said grip face and wherein said threaded portion includes external helical threads of said shank portion.

42. A vehicle wheel axle assembly according to claim 1, wherein said clamping element is axially retained to said axle element.

43. A vehicle wheel axle assembly according to claim 1, wherein said clamping element includes an axial hole therein and wherein said threaded portion includes internal helical threads of said hole.

44. A vehicle wheel axle assembly according to claim 43, wherein said clamping assembly may be actively controlled between said released orientation and said engaged orientation.

45. A vehicle wheel axle assembly according to claim 44, wherein said clamping assembly includes an engagement element that is displaceable between a released position corresponding to said released orientation and an engaged position corresponding to said engaged orientation.

46. A vehicle wheel axle assembly according to claim 45, wherein said engagement element is displaced in a generally axial direction between said released position and said engaged position.

47. A vehicle wheel axle assembly according to claim 45, wherein the means for said active control is a cam-and-follower mechanism operative to displace said engagement element.

48. A vehicle wheel axle assembly according to claim 45, including an elastically resilient element to bias said engagement element toward said released position.

49. A vehicle wheel axle assembly according to claim 43, wherein, in said engaged orientation, said gripping element is a rotationally locked to said clamping element about said axial axis.

50. A vehicle wheel axle assembly according to claim 1, wherein clamping assembly may be manipulated between: (i) a released orientation wherein said gripping element is rotatable about said axial axis relative to said clamping element, and (ii) an engaged orientation wherein said clamping element is rotationally coupled to said gripping element by said rotational coupling means; and
wherein said resistance torque in said engaged orientation is greater than any resistance torque in said released orientation.

* * * * *